US011915703B2

(12) United States Patent
Mano

(10) Patent No.: US 11,915,703 B2
(45) Date of Patent: *Feb. 27, 2024

(54) APPARATUS, SYSTEM, AND METHOD OF DISPLAY CONTROL, AND RECORDING MEDIUM

(71) Applicant: Takuro Mano, Kanagawa (JP)

(72) Inventor: Takuro Mano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 95 days.

This patent is subject to a terminal disclaimer.

(21) Appl. No.: 17/693,448

(22) Filed: Mar. 14, 2022

(65) Prior Publication Data
US 2022/0199089 A1 Jun. 23, 2022

Related U.S. Application Data

(63) Continuation of application No. 16/697,190, filed on Nov. 27, 2019, now Pat. No. 11,289,093.

(30) Foreign Application Priority Data

Nov. 29, 2018 (JP) .................................. 2018-223360
Sep. 30, 2019 (JP) .................................. 2019-178481

(51) Int. Cl.
G10L 15/26 (2006.01)
G06F 3/16 (2006.01)
G06T 11/60 (2006.01)

(52) U.S. Cl.
CPC .............. *G10L 15/26* (2013.01); *G06F 3/167* (2013.01); *G06T 11/60* (2013.01)

(58) Field of Classification Search
CPC .... A63F 13/352; G06F 3/04883; G06F 3/167; G06F 15/0291; G06F 16/433;
(Continued)

(56) References Cited

U.S. PATENT DOCUMENTS 6,664,990 B1 * 12/2003 Bates .................. G06F 3/04812
715/857
6,883,146 B2 4/2005 Prabhu et al.
(Continued)

FOREIGN PATENT DOCUMENTS

EP 3197139 A1 7/2017
JP 2014-222290 A 11/2014
(Continued)

OTHER PUBLICATIONS

Office Action dated Apr. 4, 2023 in Japanese Patent Application No. 2019-178481, 7 pages.
(Continued)

*Primary Examiner* — Gerald Gauthier
(74) *Attorney, Agent, or Firm* — XSENSUS LLP

(57) ABSTRACT

A system includes: a server including first circuitry and a memory that stores, for each event, voice data recorded during the event, text data converted from the voice data, and time information indicating a time when the text data was generated; and a display control apparatus communicably connected with the server, including second circuitry to based on information on the event stored in the memory, control a display to display text data in an order according to the time when the text data was generated, and a graphical control region that sets playback position in a total playback time of the voice data, and in response to selection of particular text data from the text data being displayed, control the display to display the graphical control region at a location determined based on a time when the particular text data was generated.

20 Claims, 53 Drawing Sheets

(58) Field of Classification Search
CPC .. G06F 16/7844; G06F 40/174; G06F 3/0414; G06F 3/0482; G06F 3/04842; G06F 3/04845; G06F 3/0485; G06F 3/0486; G06F 3/165; G06F 9/452; G06F 15/16; G06F 16/25; G06F 16/29; G06T 11/60; G06T 11/206; G10L 15/08; G10L 15/26; G10L 15/30; G10L 21/043; G11B 27/031; G11B 27/10; G11B 27/28; G11B 27/34; G11B 27/102; G11B 27/11; H04L 12/1822; H04L 51/046; H04N 5/781; H04N 21/21805; H04N 21/4622; H04N 21/47217; A61B 5/291; A61C 19/00; A61N 1/36185; G01R 33/546; G06Q 10/0635; G06Q 10/109; G06Q 30/06; G06Q 30/0643; G08B 13/19608; G09G 3/20; G09G 5/14; G16B 40/00; G16H 50/20; G16H 50/30; H04M 3/567; H04R 5/02; H04S 7/305

See application file for complete search history.

(56) References Cited

U.S. PATENT DOCUMENTS

| | | | | |
|---|---|---|---|---|
| 7,010,744 | B1* | 3/2006 | Torgerson | G06F 3/0481 715/255 |
| 7,237,207 | B2* | 6/2007 | Panditharadhya | G06F 40/143 717/109 |
| 7,389,268 | B1* | 6/2008 | Kemp, II | G06Q 30/08 705/37 |
| 7,610,079 | B2 | 10/2009 | Schwarze et al. | |
| 7,676,756 | B2* | 3/2010 | Vedula | G06F 8/34 717/109 |
| 8,050,586 | B2 | 11/2011 | Hoshino et al. | |
| 8,428,421 | B2* | 4/2013 | Bhogal | H04N 21/4622 386/201 |
| 9,053,222 | B2* | 6/2015 | Lynn | G16H 50/20 |
| 9,201,558 | B1* | 12/2015 | Dingman | G06F 15/16 |
| 9,430,114 | B1* | 8/2016 | Dingman | G06F 16/25 |
| 9,794,710 | B1* | 10/2017 | Sheen | H04S 7/305 |
| 9,860,670 | B1* | 1/2018 | Sheen | H04R 5/02 |
| 10,048,854 | B2* | 8/2018 | Zhang | G06F 3/0486 |
| 10,296,188 | B2* | 5/2019 | Kodisoja | G06F 3/04842 |
| 10,325,394 | B2* | 6/2019 | Wang | G06F 3/04883 |
| 10,347,296 | B2* | 7/2019 | An | G10L 15/08 |
| 10,404,923 | B1* | 9/2019 | Pena | G06F 3/0485 |
| 10,732,244 | B2* | 8/2020 | Rasche | G01R 33/546 |
| 10,742,939 | B1 | 8/2020 | Sommerlatt | |
| 11,289,093 | B2* | 3/2022 | Mano | G11B 27/10 |
| 11,651,149 | B1* | 5/2023 | Miller | G06F 40/174 715/823 |
| 2002/0163547 | A1 | 11/2002 | Abramson et al. | |
| 2003/0046080 | A1* | 3/2003 | Hejna, Jr. | G10L 21/043 704/E15.045 |
| 2004/0030249 | A1* | 2/2004 | Willis | G01S 11/14 600/437 |
| 2005/0060175 | A1 | 3/2005 | Farber et al. | |
| 2005/0108775 | A1 | 5/2005 | Bachar et al. | |
| 2005/0252296 | A1* | 11/2005 | Hock | G01N 29/225 73/623 |
| 2007/0196075 | A1* | 8/2007 | Yanagita | H04N 5/781 348/E5.022 |
| 2009/0140855 | A1 | 6/2009 | Shemesh et al. | |
| 2009/0216531 | A1* | 8/2009 | Yanagihara | G10L 15/30 704/235 |
| 2012/0310649 | A1 | 12/2012 | Cannistraro et al. | |
| 2013/0086051 | A1 | 4/2013 | Brahms et al. | |
| 2014/0109016 | A1 | 4/2014 | Ouyang et al. | |
| 2014/0282004 | A1* | 9/2014 | Birmingham | G11B 27/031 715/727 |
| 2014/0324426 | A1 | 10/2014 | Lu et al. | |
| 2015/0019969 | A1* | 1/2015 | Lee | G06F 16/7844 715/719 |
| 2015/0039991 | A1* | 2/2015 | Cameron | G11B 27/34 715/230 |
| 2015/0058007 | A1 | 2/2015 | Kim et al. | |
| 2015/0169279 | A1 | 6/2015 | Duga | |
| 2016/0019894 | A1 | 1/2016 | Tsujikawa et al. | |
| 2016/0070533 | A1 | 3/2016 | Foster | |
| 2017/0249294 | A1 | 8/2017 | Emori | |
| 2017/0300291 | A1* | 10/2017 | Lee | G06F 16/433 |
| 2017/0301073 | A1 | 10/2017 | Gao | |
| 2018/0032305 | A1 | 2/2018 | Cameron et al. | |
| 2018/0239822 | A1 | 8/2018 | Reshef et al. | |
| 2018/0268822 | A1 | 9/2018 | Mano | |
| 2019/0026260 | A1* | 1/2019 | Schubert | G06F 40/174 |
| 2019/0114477 | A1 | 4/2019 | Mano | |
| 2019/0132372 | A1 | 5/2019 | Litsyn et al. | |
| 2019/0341050 | A1 | 11/2019 | Diamant et al. | |
| 2020/0138320 | A1* | 5/2020 | Parvizi | A61B 5/291 |
| 2020/0159549 | A1* | 5/2020 | Chen | G06F 3/04842 |
| 2020/0175991 | A1* | 6/2020 | Mano | G11B 27/34 |
| 2020/0183971 | A1 | 6/2020 | Klein et al. | |
| 2020/0186728 | A1* | 6/2020 | Pena | G06F 3/04845 |
| 2020/0294487 | A1 | 9/2020 | Donohoe et al. | |
| 2020/0348903 | A1* | 11/2020 | Kotelly | G06F 3/165 |
| 2020/0356722 | A1* | 11/2020 | Mano | H04L 12/1822 |
| 2020/0409548 | A1* | 12/2020 | Irvine | G06F 3/0414 |
| 2021/0104082 | A1 | 4/2021 | Brochier et al. | |
| 2021/0160435 | A1* | 5/2021 | Pena | G06F 3/04883 |
| 2021/0204012 | A1* | 7/2021 | Ng | H04N 21/47217 |
| 2022/0199089 | A1* | 6/2022 | Mano | G11B 27/34 |

FOREIGN PATENT DOCUMENTS

| | | |
|---|---|---|
| JP | 2015-028625 A | 2/2015 |
| JP | 2016-105241 A | 6/2016 |
| JP | 2017-129720 A | 7/2017 |
| JP | 2017-173768 A | 9/2017 |
| WO | 2017/157428 A1 | 9/2017 |

OTHER PUBLICATIONS

Extended European Search Report dated Apr. 29, 2020, issued in corresponding European Patent Application No. 19211463.5, 7 pages.

* cited by examiner

FIG. 9A

USER AUTHENTICATION MANAGEMENT TABLE

| USER ID | USER NAME | ORGANIZATION ID | PASSWORD |
|---|---|---|---|
| u0001 | Taro Ricoh | o1001 | p9991 |
| u0002 | Goro Kondo | o1002 | p9992 |
| ... | ... | ... | ... |

FIG. 9B

ACCESS MANAGEMENT TABLE

| ORGANIZATION ID | ACCESS ID | ACCESS PASSWORD |
|---|---|---|
| o1001 | a1001 | p1001 |
| ... | ... | ... |

FIG. 9C

SCHEDULE MANAGEMENT TABLE

SCHEDULED EVENT ID: pe0001, CONDUCTED EVENT ID: ee0001

| ORGAN-IZATION ID | USER ID OF RESER-VATION HOLDER | PAR-TICIPA-TION | NAME OF RESER-VATION HOLDER | SCHED-ULED START TIME | SCHED-ULED END TIME | EVENT NAME | USER ID OF OTHER PARTIC-IPANT | PAR-TICIPA-TION | USER NAME OF OTHER PARTICIPANT | DATA FILE |
|---|---|---|---|---|---|---|---|---|---|---|
| o1001 | u0001 | ✓ | Taro Ricoh | 9:00 | 10:00 | Meeting on strategic plan | u0000 | ✓ | Electronic Whiteboard | *XXX.ppt *YYY.xsl |
| | | | | | | | u0002 | ✓ | Goro Kondo | |
| | | | | | | | u0003 | ✓ | Yoshio Yamashita | |

FIG. 10A
CONDUCTED EVENT MANAGEMENT TABLE

| PROJECT ID | CONDUCTED EVENT ID |
|---|---|
| p0001 | ee0001, ee0011, ee0021 |
| p0002 | ee0002, ee0012 |
| ... | ... |

FIG. 10B
CONTENT MANAGEMENT TABLE

CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Recording | ・Voice data URL; c://··· | 2018/1/15  9:00:00 | 2018/1/15  9:00:30 |
| c0002 | Screenshot | ・Image data URL; c://··· | 2018/1/15  9:00:30 | 2018/1/15  9:00:30 |
| c0003 | Voice text conversion | ・Text data URL; c://··· | 2018/1/15  9:00:00 | 2018/1/15  9:00:30 |
| ... | ... | ... | ... | ... |
| c0201 | Action item | ・User ID of owner of action item; u0003<br>・Due: 2018/1/30<br>・Image data URL; c://··· | 2018/1/15  9:44:47 | 2018/1/15  9:44:47 |
| c0202 | Recording | ・Voice data URL; c://··· | 2018/1/15  9:45:00 | 2018/1/15  9:45:30 |
| c0203 | Screenshot | ・Image data URL; c://··· | 2018/1/15  9:45:30 | 2018/1/15  9:45:30 |
| c0204 | Voice text conversion | ・Text data URL; c://··· | 2018/1/15  9:45:00 | 2018/1/15  9:45:30 |
| ... | ... | ... | ... | ... |
| c0301 | File transmission | ・Data file URL; c://··· | 2018/1/15  10:00:00 | 2018/1/15  10:00:00 |

FIG. 11A USER AUTHENTICATION MANAGEMENT TABLE

| USER ID | ORGANIZATION ID | PASSWORD |
|---------|-----------------|----------|
| u0001   | o1001           | p9991    |
| u0002   | o1002           | p9992    |
| ...     | ...             | ...      |

FIG. 11B USER MANAGEMENT TABLE

ORIGINATION ID: o1001

| USER ID | USER NAME |
|---------|-----------|
| u0001   | Taro Ricoh |
| u0002   | Goro Kondo |
| u0003   | Yoshio Yamashita |
| u0004   | Jim Berger |
| ...     | ... |

FIG. 11C RESOURCE MANAGEMENT TABLE

ORIGINATION ID: o1001

| RESOURCE ID | RESOURCE NAME |
|-------------|---------------|
| s1001       | Conference room X |
| s1002       | Conference room Y |
| ...         | ... |

FIG. 12A
RESOURCE RESERVATION MANAGEMENT TABLE

ORIGINATION ID: o1001

| RE-SOURCE ID | RESOURCE NAME | USER ID OF COMMUNI-CATION TERMINAL | USER ID OF RESER-VATION HOLDER | SCHEDULED EVENT START DATE/TIME | SCHEDULED EVENT END DATE/TIME | EVENT NAME |
|---|---|---|---|---|---|---|
| s1001 | Conference room X | u0000 | u0001 | 2018/1/15 9:00 | 2018/1/15 10:00 | Meeting on strategic plan |
| s1001 | Conference room X | u0000 | u0004 | 2018/1/15 10:00 | 2018/1/15 11:00 | Regular meeting |
| s1001 | Conference room X | u0000 | u0002 | 2018/1/15 10:11 | 2018/1/15 15:00 | Management meeting |
| s1002 | Conference room Y | u1000 | u0005 | 2018/1/15 9:00 | 2018/1/15 10:00 | Meeting on new product development |
| ... | ... | ... | ... | ... | ... | ... |

FIG. 12B
EVENT MANAGEMENT TABLE

SCHEDULED EVENT ID: pe0001

| ORGAN-IZATION ID | USER ID | USER NAME | SCHEDULED EVENT START DATE/TIME | SCHEDULED EVENT END DATE/TIME | EVENT NAME | MEMO | DATA FILE |
|---|---|---|---|---|---|---|---|
| o1001 | u0000 | Electronic Whiteboard | 2018/1/15 9:00 | 2018/1/15 10:00 | Meeting on strategic plan | ... | |
| o1001 | u0001 | Taro Ricoh | 2018/1/15 9:00 | 2018/1/15 10:00 | Meeting on strategic plan | ... | •XXX.ppt |
| o1001 | u0002 | Goro Kondo | 2018/1/15 9:00 | 2018/1/15 10:00 | Meeting on strategic plan | ... | •YYY.xsl |
| o1001 | u0003 | Yoshio Yamashita | 2018/1/15 9:00 | 2018/1/15 10:00 | Meeting on strategic plan | ... | : |

FIG. 13A

SERVER AUTHENTICATION MANAGEMENT TABLE

| ACCESS ID | ACCESS PASSWORD |
|---|---|
| a1001 | p1001 |
| a1002 | p1002 |
| ... | ... |

FIG. 13B

PROJECT MEMBER MANAGEMENT TABLE

ORGANIZATION ID: o1001

| PROJECT ID | PROJECT NAME | USER ID OF PROJECT MEMBER |
|---|---|---|
| p0001 | Plan for next year | u0000, u0001, u0002, u0003 |
| p0002 | R&D project | u0000, u0004, u0005 |
| p0003 | New product development | u0000, u0005, u0006, u0007 |
| ... | ... | ... |

FIG. 14A

CONDUCTED EVENT RECORD MANAGEMENT TABLE

PROJECT ID: p0001, CONDUCTED EVENT ID: ee0001

| CONTENT PROCESSING ID | CONTENT PROCESSING TYPE | CONTENT DATA | START DATE/TIME | END DATE/TIME |
|---|---|---|---|---|
| c0001 | Recording | ·Voice data URL: http://··· | 2018/1/15 9:00:00 | 2018/1/15 9:00:30 |
| c0002 | Voice text conversion | ·Image data URL: http://··· | 2018/1/15 9:00:30 | 2018/1/15 9:00:30 |
| c0003 | Screenshot | ·Text data URL: http://··· | 2018/1/15 9:00:00 | 2018/1/15 9:00:30 |
| ··· | ··· | ··· | ··· | ··· |
| c0201 | Action item | ·User ID of owner of action item: u0003<br>·Due: 2018/1/30<br>·Image data URL: http://··· | 2018/1/15 9:44:47 | 2018/1/15 9:44:47 |
| c0202 | Recording | ·Voice data URL: http://··· | 2018/1/15 9:45:00 | 2018/1/15 9:45:30 |
| c0203 | Voice text conversion | ·Image data URL: http://··· | 2018/1/15 9:45:30 | 2018/1/15 9:45:30 |
| c0204 | Screenshot | ·Text data URL: http://··· | 2018/1/15 9:45:00 | 2018/1/15 9:45:30 |
| ··· | ··· | ··· | ··· | ··· |
| c0301 | File transmission | ·Data file URL: http://··· | 2018/1/15 10:00:00 | 2018/1/15 10:00:00 |

FIG. 14B

CONDUCTED EVENT MANAGEMENT TABLE

| CONDUCTED EVENT ID | EVENT NAME | START DATE/TIME | END DATE/TIME |
|---|---|---|---|
| ee0001 | Meeting on strategic plan | 2018/1/15 9:00 | 2018/1/15 10:00 |
| ee0002 | Regular meeting | 2018/1/15 10:00 | 2018/1/15 11:00 |
| ··· | ··· | ··· | ··· |

FIG. 15

RELATED INFORMATION MANAGEMENT TABLE

PROJECT ID: p0001, CONDUCTED EVENT ID: ee0001

| CONTENT GENERA-TION TIME | VOICE DATA ||| VOICE TEXT DATA ||| IMAGE DATA |||
|---|---|---|---|---|---|---|---|---|---|
| | CONTENT PROCESS-ING ID | CONTENT PROCESS-ING TYPE | CONTENT ID | CONTENT PROCESSING TYPE | SEQUENCE NO. | CONTENT PROCESS-ING ID | CONTENT PROCESSING TYPE | SEQUENCE NO. |
| 00:00 | c0001 | Recording | c0002 | Voice text conversion | 1 | — | — | — |
| 00:30 | c0004 | Recording | c0005 | Voice text conversion | 2 | c0003 | Screenshot | 1 |
| 01:00 | c0007 | Recording | c0008 | Voice text conversion | 3 | c0006 | Screenshot | 2 |
| ... | ... | ... | ... | ... | ... | ... | ... | ... |
| 24:30 | c0202 | Recording | c0203 | Voice text conversion | 61 | c0199 | Screenshot | 60 |
| ... | ... | ... | ... | ... | ... | ... | ... | ... |
| 59:30 | c0298 | Recording | c0299 | Voice text conversion | 93 | c0297 | Screenshot | 92 |

FIG. 28C

```
▼object {1}
   ▼transcript {10}
      ▶ 0 {5}
      ▶ 1 {5}
      ▶ 2 {5}
      ▶ 3 {5}
      ▶ 4 {5}
      ▶ 5 {5}
      ▼ 6 {5}
           seq_num : 88
           text : In this fiscal year, more than twice
                  the results of last year.
           start time : 2018/1/15 9:54:40
           end time : 2018/1/15 9:54:58
           id : c0267
      ▶ 7 {5}
      ▶ 8 {5}
      ▶ 9 {5}
``` d1

APPARATUS, SYSTEM, AND METHOD OF DISPLAY CONTROL, AND RECORDING MEDIUM

CROSS-REFERENCE TO RELATED APPLICATIONS

This patent application is a continuation of U.S. application Ser. No. 16/697,190, filed Nov. 27, 2019, which is based on and claims priority pursuant to 35 U.S.C. § 119 (a) to Japanese Patent Application No. 2018-223360, filed on Nov. 29, 2018, and 2019-178481, filed on Sep. 30, 2019, in the Japan Patent Office, the entire contents of each are incorporated herein by reference.

BACKGROUND

Technical Field

The present disclosure relates to an apparatus, system, and method of display control, and a recording medium.

Description of the Related Art

In recent years, a meeting minutes generating system is provided, which converts voice recorded during the meeting into text data to be displayed for a later time. The text data, converted from the recorded voice, can be displayed, while reproducing the recorded voice data.

In some cases, the user may want to start playing the recorded voice data not from the beginning of the meeting, but from a middle of the meeting. In such case, it has been cumbersome for the user to select a specific point of time, even when the text data can be displayed.

SUMMARY

Example embodiments include a display control apparatus, including circuitry to: receive voice data, text data converted from the voice data, and time information indicating a time when the text data was generated, from a server that manages content data generated during an event; control a display to display the text data in an order according to the time when the text data was generated, and a graphical control region that sets playback position in a total playback time of the voice data; receive selection of particular text data, from the text data being displayed; and control the display to display the graphical control region at a location determined based on a time when the particular text data was generated.

Example embodiments include a system including: a server including: first circuitry; and a memory that stores, for each event, voice data recorded during the event, text data converted from the voice data, and time information indicating a time when the text data was generated; and a display control apparatus communicably connected with the server, including second circuitry to: based on information on the event stored in the memory, control a display to display text data in an order according to the time when the text data was generated, and a graphical control region that sets playback position in a total playback time of the voice data; and in response to selection of particular text data from the text data being displayed, control the display to display the graphical control region at a location determined based on a time when the particular text data was generated.

Example embodiments include a display control method including: receiving voice data, text data converted from the voice data, and time information indicating a time when the text data was generated, from a server that manages content data generated during an event; displaying, on a display, the text data in an order according to the time when the text data was generated, and a graphical control region that sets playback position in a total playback time of the voice data; receiving selection of particular text data, from the text data being displayed; and controlling the display to display the graphical control region at a location determined based on a time when the particular text data was generated.

Example embodiments include a recording medium storing a control program for causing a computer system to carry out the display control method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9A is a conceptual diagram illustrating a user authentication management table, according to an embodiment; FIG. 9B is a conceptual diagram illustrating an access management table, according to an embodiment; FIG. 9C is a conceptual diagram illustrating a schedule management table, according to an embodiment;

FIG. 10A is a conceptual diagram illustrating a conducted event management table, according to an embodiment;

FIG. 10B is a conceptual diagram illustrating a content management table, according to an embodiment;

FIG. 11A is a conceptual diagram illustrating a user authentication management table, according to an embodiment;

FIG. 11B is a conceptual diagram illustrating a user management table, according to an embodiment;

FIG. 11C is a conceptual diagram illustrating a resource management table, according to an embodiment;

FIG. 12A is a conceptual diagram illustrating a resource reservation management table, according to an embodiment;

FIG. 12B is a conceptual diagram illustrating an event management table, according to an embodiment;

FIG. 13A is a conceptual diagram illustrating a server authentication management table, according to an embodiment;

FIG. 13B is a conceptual diagram illustrating a project member management table, according to an embodiment;

FIG. 14A is a conceptual diagram of a conducted event record management table, according to an embodiment;

FIG. 14B is a conceptual diagram of a conducted event management table, according to an embodiment;

FIG. 15 is a conceptual diagram of a related information management table, according to an embodiment;

FIG. 28C is an illustration of an example data file including text data;

Figure 1:
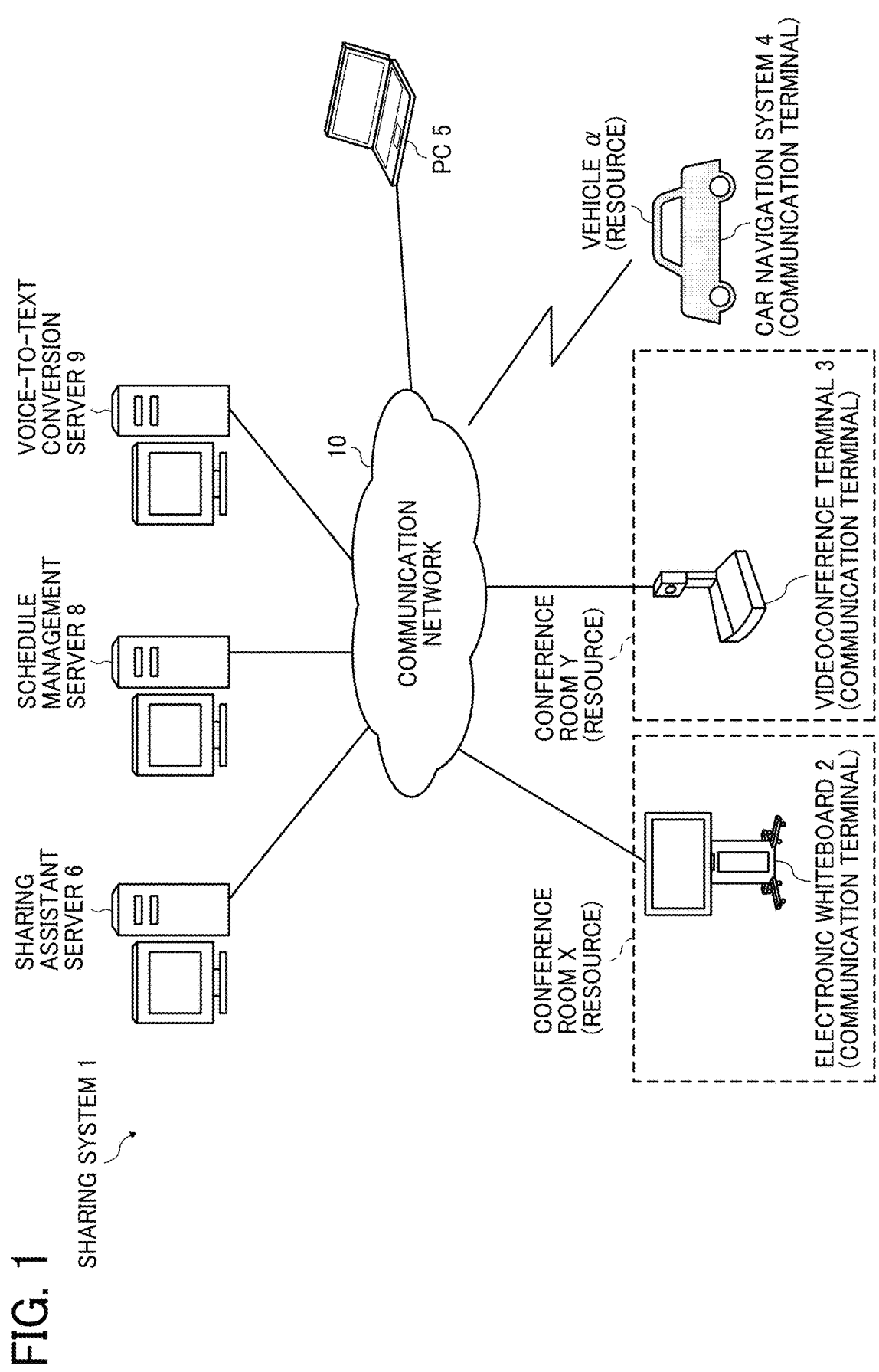
FIG. 1 is a schematic diagram illustrating an overview of a sharing system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview

As described above, using the system that provides a meeting minutes based on voice data recorded during a meeting, the user can playback the recorded voice data while checking the text data displayed on a screen. However, it has been cumbersome for the user to start playing the recorded voice data from a specific point of time that the user desires. The user usually selects a playback start time using, for example, a slider that moves from side to side. Unless the user has some idea of when a specific content that the user desires has been recorded, finding a right time to start could be difficult.

In view of the above, an apparatus, system, and method of display control are provided, each of which assists the user in finding a playback start time of voice data recorded during an event. Examples of the event include, but not limited to, a meeting, presentation, lecture, musical, drama, and ceremony.

In one embodiment, text data converted from voice data is displayed with a graphical control region that sets playback position in a total playback time of the voice data. The user can use the text data being displayed, to select particular text data. In response to selection of the particular text data, the apparatus moves the graphical control region to a location determined based on a time when the particular text data was generated. The graphical control region may have any desired graphical representation, as long as it can be selectable by the user to set playback position.

Using the text data being displayed, the user can easily find a specific point of time that the user wants to start playing. Further, the user does not have to manually move the graphical control region to the location that the user desires to start playing.

In addition to the text data, in one or more embodiments, the apparatus may display screenshot image data, which was captured during the event. For example, when the event is a meeting, presentation, or lecture, some materials, like presentation slides or video, may be displayed on a screen. In such case, the presentation slides or video on the screen may be captured as screenshot image data to be displayed with the text data converted from the voice data. Using the screenshot image data being displayed, the user can find a specific point of time that the user wants to start playing, even more easily than the case in which the text data is used. Such materials to be captured as screenshot image data may be a part of the presentation slides or video, which may be selected by any user during the event, for example.

For the descriptive purposes, the following describes the case where a system for sharing one or more resources is used to implement the above-described apparatus, system, and method of display control.

Referring to the drawings, a system for sharing one or more resources ("sharing system") is described according to one or more embodiments.

<Overview of System Configuration>

First, an overview of a configuration of a sharing system 1 is described. FIG. 1 is a schematic diagram illustrating an overview of the sharing system 1 according to one or more embodiments.

As illustrated in FIG. 1, the sharing system 1 of the embodiment includes an electronic whiteboard 2, a videoconference terminal 3, a car navigation system 4, a personal computer (PC) 5, a sharing assistant server 6, a schedule management server 8, and a voice-to-text conversion server (conversion server) 9.

The electronic whiteboard 2, videoconference terminal 3, car navigation system 4, PC 5, sharing assistant server 6, schedule management server 8, and conversion server 9 are communicable with one another via a communication network 10. The communication network 10 is implemented by the Internet, mobile communication network, local area network (LAN), etc. The communication network 10 may include, in addition to a wired network, a wireless network in compliance with such as 3rd Generation (3G), Worldwide Interoperability for Microwave Access (WiMAX), Long Term Evolution (LTE), etc.

In this example, the electronic whiteboard 2 is provided in a conference room X. The videoconference terminal 3 is provided in a conference room Y. Further, in this disclosure, a resource may be shared among a plurality of users, such that any user is able to reserve any resource. Accordingly, the resource can be a target for reservation by each user. The car navigation system 4 is provided in a vehicle α. In this case, the vehicle α is a vehicle shared among a plurality of users, such as a vehicle used for car sharing. Further, the vehicle could be any means capable of transporting the human-being from one location to another location. Examples of vehicle include, but not limited to, cars, motorcycles, bicycles, and wheelchairs.

Examples of the resource include, but not limited to, any object, service, space or place (room, or a part of room), information (data), which can be shared among a plurality of users. Further, the user may be an individual person, a group of persons, or an organization such as a company. In the sharing system 1 illustrated in FIG. 1, the conference room X, the conference room Y, and the vehicle α are examples of a resource shared among a plurality of users. Examples of information as a resource include, but not limited to, information on an account assigned to the user, with the user being more than one individual person. For example, the organization may only be assigned with one account that allows any user in the organization to use a specific service provided on the Internet. In such case, information on such account, such as a user name and a password, is assumed to be a resource that can be shared among a plurality of users in that organization. In one example, the teleconference or videoconference service may be provided via the Internet, which may be provided to a user who has logged in with a specific account.

The electronic whiteboard 2, videoconference terminal 3, and car navigation system 4, are each an example of a communication terminal. The communication terminal is any device capable of communicating with such as the sharing assistant server 6 and the schedule management server 8, and providing information obtained from the server to the user of the resource. For example, as described below referring to S32 of FIG. 20, the communication terminal is any terminal that the user uses to sign in to use services provided by the sharing system 1. Further, in case the resource is any conference room, the communication terminal may be any device provided in the conference room, such that information on the communication terminal may be associated with the conference room as a resource. Examples of the communication terminal provided in the vehicle α may not only include the car navigation system 4, but also a smart phone or a smart watch installed with such as a car navigation application.

The PC 5 is an example of an information processing terminal. Specifically, the PC 5 registers, to the schedule management server 8, reservations made by each user to use each resource, or any event scheduled by each user. Examples of the event include, but not limited to, a conference, meeting, gathering, counseling, lecture, and presentation. The event may took place while the user is driving, or having ride, or being transported.

The sharing assistant server 6, which is implemented by one or more computers, assists in sharing of a resource among the users, for example, via the communication terminal.

The schedule management server 8, which is implemented by one or more computers, manages reservations for using each resource and schedules of each user.

The voice-to-text conversion server 9, which is implemented by one or more computers, converts voice data (example of audio data) received from an external computer (for example, the sharing assistant server 6), into text data.

The sharing assistant server 6, schedule management server 8, and conversion server 9 may be collectively referred to as a control system. Any function provided by the sharing assistant server 6, schedule management server 8, and conversion server 9, in the control system, may be performed by any desired number of server apparatuses, which may reside in any environment. The sharing assistant server 6, schedule management server 8, and conversion server 9 may each, or partly, be provided on a cloud environment. Alternatively, the sharing assistant server 6, schedule management server 8, and conversion server 9 may each, or partly, be provided on an on-premise environment such as on a local network.

<Hardware Configuration>

Referring to FIGS. 2 to 5, a hardware configuration of the apparatus or terminal in the sharing system 1 is described according to the embodiment.

<Hardware Configuration of Electronic Whiteboard>

Figure 2:
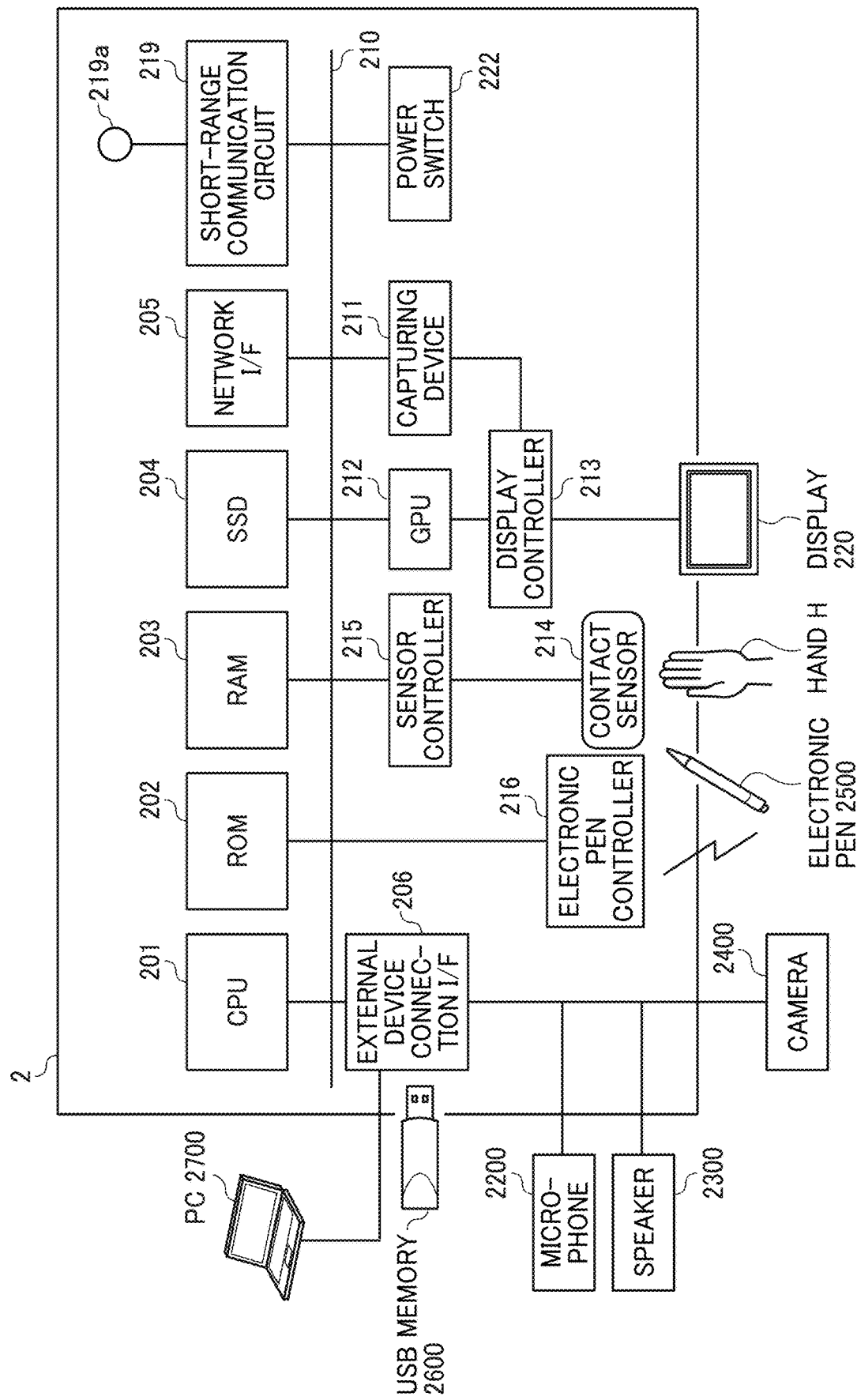
FIG. 2 is a schematic block diagram illustrating a hardware configuration of an electronic whiteboard, according to an embodiment.

FIG. 2 is a schematic block diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 2. The ROM 202 stores a control program for operating the CPU 201 such as an Initial Program Loader (IPL). The RAM 203 is used as a work area for the CPU 201. The SSD 204 stores various data such as the control program for the electronic whiteboard 2. The network I/F 205 controls communication with an external device through the communication network 10. The external device connection I/F 206 controls communication with a USB (Universal Serial Bus) memory 2600, a PC 2700, and external devices (a microphone 2200, a speaker 2300, and a camera 2400).

The electronic whiteboard 2 further includes a capturing device 211, a graphics processing unit (GPU) 212, a display controller 213, a contact sensor 214, a sensor controller 215, an electronic pen controller 216, a short-range communication circuit 219, an antenna 219a for the short-range communication circuit 219, and a power switch 222.

The capturing device 211 acquires image data of an image displayed on a display 220 under control of the display controller 213, and stores the image data in the RAM 203 or the like. The GPU 212 is a semiconductor chip dedicated to processing of a graphical image. The display controller 213 controls display of an image processed at the capturing device 211 or the GPU 212 for output through the display 220 provided with the electronic whiteboard 2. The contact sensor 214 detects a touch onto the display 220 with an electronic pen (stylus pen) 2500 or a user's hand H. The sensor controller 215 controls operation of the contact sensor 214. The contact sensor 214 senses a touch input to a specific coordinate on the display 220 using the infrared blocking system. More specifically, the display 220 is provided with two light receiving elements disposed on both upper side ends of the display 220, and a reflector frame surrounding the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the electronic pen 2500 to the display 220. The short-range communication circuit 219 is a communication circuit that communicates in compliance with the near field communication (NFC) (Registered Trademark), the Bluetooth (Registered Trademark), and the like. The power switch 222 turns on or off the power of the electronic whiteboard 2.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 2500, the electronic pen controller 216 may also detect a touch by another part of the electronic pen 2500, such as a part held by a hand of the user.

<Hardware Configuration of Video Conference Terminal>

Figure 3:
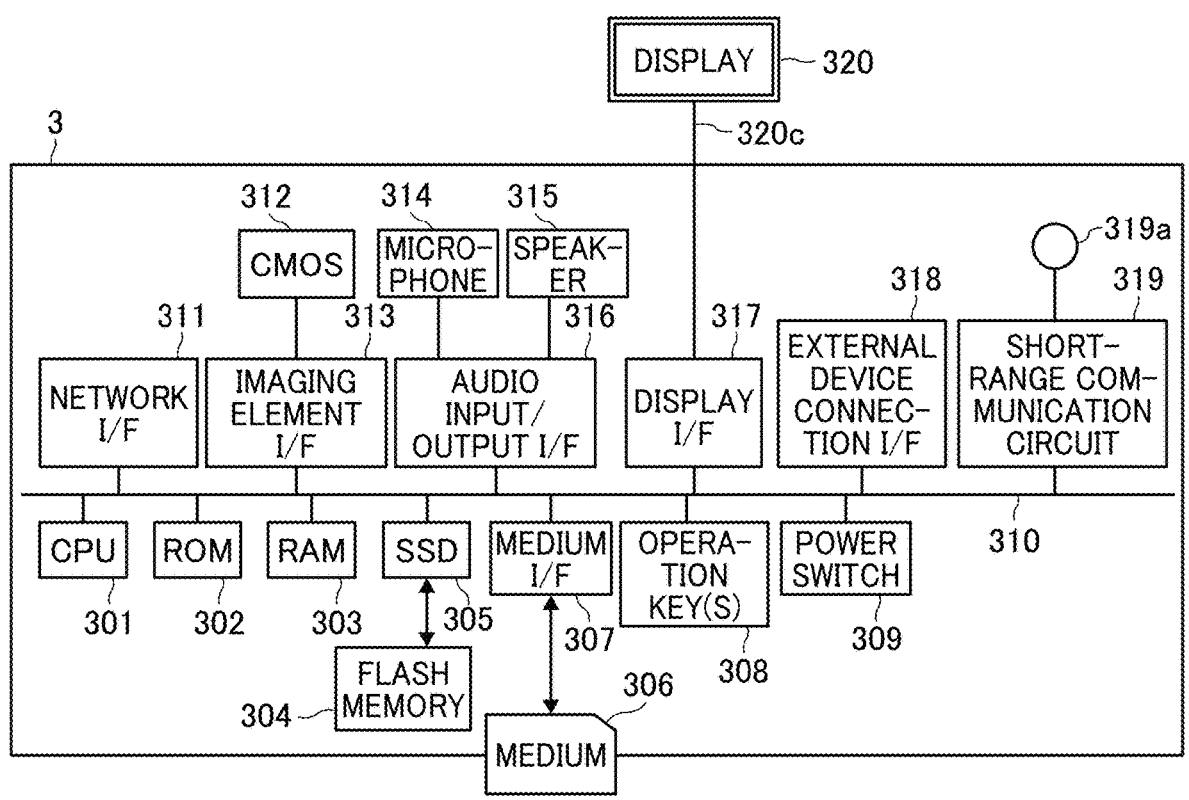
FIG. 3 is a schematic block diagram illustrating a hardware configuration of a videoconference terminal, according to an embodiment.

FIG. 3 is a diagram illustrating a hardware configuration of the videoconference terminal 3. As illustrated in FIG. 3, the videoconference terminal 3 includes a CPU 301, a ROM 302, a RAM 303, a flash memory 304, a SSD 305, a medium I/F 307, an operation key 308, a power switch 309, a bus line 310, a network I/F 311, a CMOS sensor 312, an imaging element I/F 313, a microphone 314, a speaker 315, an audio input/output (I/O) I/F 316, a display I/F 317, an external device connection I/F 318, a short-range communication circuit 319, and an antenna 319a for the short-range communication circuit 319. The CPU 301 controls entire operation of the videoconference terminal 3. The ROM 302 stores a control program for operating the CPU 301. The RAM 303 is used as a work area for the CPU 301. The flash memory 304 stores various data such as a communication control program, image data, and audio data. The SSD 305 controls reading or writing of various data with respect to the flash memory 304 under control of the CPU 301. In alternative to the SSD, a hard disk drive (HDD) may be used. The medium I/F 307 controls reading or writing of data with respect to a recording medium 306 such as a flash memory. The operation key (keys) 308 is operated by a user to input a user instruction such as a user selection of a communication destination of the videoconference terminal 3. The power switch 309 is a switch that receives an instruction to turn on or off the power of the videoconference terminal 3.

The network I/F 311 allows communication of data with an external device through the communication network 10 such as the Internet. The CMOS sensor 312 is an example of a built-in imaging device capable of capturing a subject under control of the CPU 301. The imaging element I/F 313 is a circuit that controls driving of the CMOS sensor 312. The microphone 314 is an example of built-in audio collecting device capable of inputting audio under control of the CPU 301. The audio I/O I/F 316 is a circuit for inputting or outputting an audio signal to the microphone 314 or from the speaker 315 under control of the CPU 301. The display I/F 317 is a circuit for transmitting display data to an external display 320 under control of the CPU 301. The external device connection I/F 318 is an interface circuit that connects the videoconference terminal 3 to various external devices. The short-range communication circuit 319 is a communication circuit that communicates in compliance with the NFC, the Bluetooth, and the like.

The bus line 310 is an address bus or a data bus, which electrically connects the elements in FIG. 3 such as the CPU 301.

The display 320 may be a liquid crystal or organic electroluminescence (EL) display that displays an image of a subject, an operation icon, or the like. The display 320 is connected to the display I/F 317 by a cable 320c. The cable 320c may be an analog red green blue (RGB) (video graphic array (VGA)) signal cable, a component video cable, a high-definition multimedia interface (HDMI) (Registered Trademark) signal cable, or a digital video interactive (DVI) signal cable.

In alternative to the CMOS sensor 312, an imaging element such as a CCD (Charge Coupled Device) sensor may be used. The external device connection I/F 318 is capable of connecting an external device such as an external camera, an external microphone, or an external speaker through a USB cable or the like. In the case where an external camera is connected, the external camera is driven in preference to the built-in camera under control of the CPU 301. Similarly, in the case where an external microphone is connected or an external speaker is connected, the external microphone or the external speaker is driven in preference to the built-in microphone 314 or the built-in speaker 315 under control of the CPU 301.

The recording medium 306 is removable from the videoconference terminal 3. The recording medium 306 can be any non-volatile memory that reads or writes data under control of the CPU 301, such that any memory such as an EEPROM may be used instead of the flash memory 304.

<Hardware Configuration of Car Navigation System>

Figure 4:
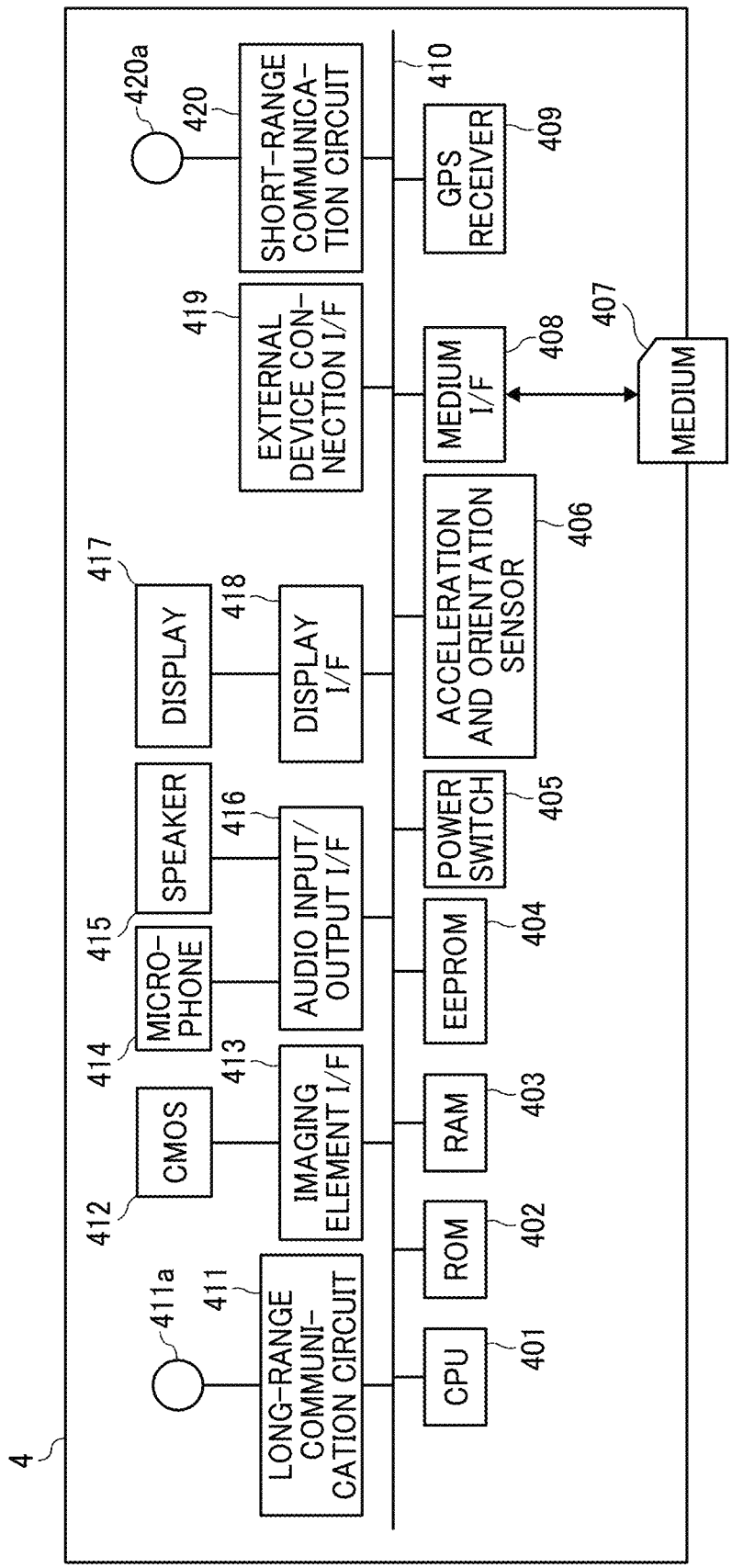
FIG. 4 is a schematic block diagram illustrating a hardware configuration of a car navigation system, according to an embodiment.

FIG. 4 is a schematic block diagram illustrating a hardware configuration of the car navigation system 4, according to the embodiment. As illustrated in FIG. 4, the car navigation system 4 includes a CPU 401, a ROM 402, a RAM 403, an EEPROM 404, a power switch 405, an acceleration and orientation sensor 406, a medium I/F 408, and a GPS receiver 409.

The CPU 401 controls entire operation of the car navigation system 4. The ROM 402 stores a control program for controlling the CPU 401 such as an IPL. The RAM 403 is used as a work area for the CPU 401. The EEPROM 404 reads or writes various data such as a control program for the car navigation system 4 under control of the CPU 401. The power switch 405 turns on or off the power of the car navigation system 4. The acceleration and orientation sensor 406 includes various sensors such as an electromagnetic compass for detecting geomagnetism, a gyrocompass, and an acceleration sensor. The medium I/F 408 controls reading or writing of data with respect to a recording medium 407 such as a flash memory. The GPS receiver 409 receives a GPS signal from a GPS satellite.

The car navigation system 4 further includes a long-range communication circuit 411, an antenna 411a for the long-range communication circuit 411, a CMOS sensor 412, an imaging element I/F 413, a microphone 414, a speaker 415, an audio input/output (I/O) I/F 416, a display 417, a display I/F 418, an external device connection I/F 419, a short-range communication circuit 420, and an antenna 420a for the short-range communication circuit 420.

The long-range communication circuit 411 is a circuit, which receives traffic jam information, road construction information, traffic accident information and the like provided from an infrastructure system external to the vehicle, and transmits information on the location of the vehicle, life-saving signals, etc. back to the infrastructure system in the case of emergency. Examples of such infrastructure include, but not limited to, a road information guidance system such as a Vehicle Information and Communication System (VICS) system. The CMOS sensor 412 is an example of a built-in imaging device capable of capturing a subject under control of the CPU 401. The imaging element I/F 413 is a circuit that controls driving of the CMOS sensor 412. The microphone 414 is an example of built-in audio collecting device capable of inputting audio under control of the CPU 401. The audio I/O I/F 416 is a circuit for inputting or outputting an audio signal between the microphone 414 and the speaker 415 under control of the CPU 401. The display 417 may be a liquid crystal or organic electro luminescence (EL) display that displays an image of a subject, an operation icon, or the like. The display 417 has a function of a touch panel. The touch panel is an example of input device that enables the user to input a user instruction for operating the car navigation system 4 through touching a screen of the display 417. The display I/F 418 is a circuit for transmitting display data to the display 417 under control of the CPU 401. The external device connection I/F 419 is an interface circuit that connects the car navigation system 4 to various external devices. The short-range communication circuit 420 is a communication circuit that communicates in compliance with the NFC, the Bluetooth, and the like. The car navigation system 4 further includes a bus line 410. The bus line 410 is an address bus or a data bus, which electrically connects the elements in FIG. 4 such as the CPU 401.

<Hardware Configuration of Server and PC>

Figure 5:
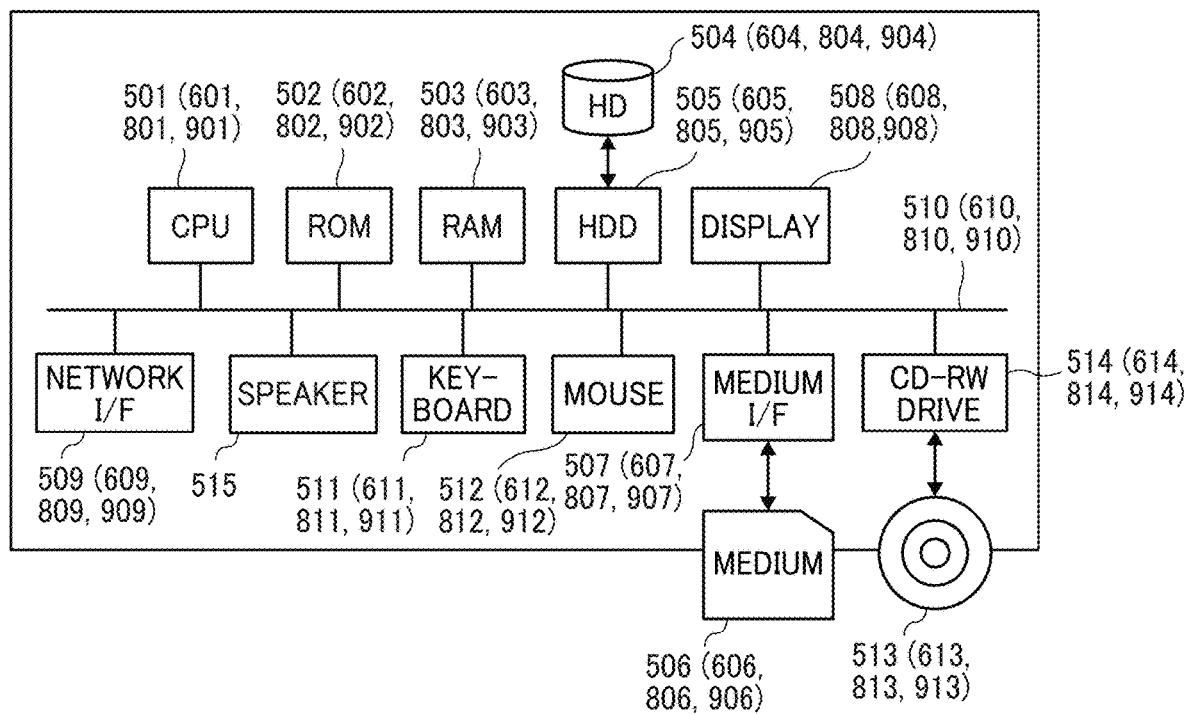
FIG. 5 is a schematic block diagram illustrating a hardware configuration of a computer, such as a personal computer (PC), and a server, according to an embodiment.

FIG. 5 is a diagram illustrating a hardware configuration of the server (such as the sharing assistant server 6 and the schedule management server 8) and the PC 5, according to the embodiment. As illustrated in FIG. 5, the PC 5 includes a CPU 501, a ROM 502, a RAM 503, a hard disk (HD) 504, a hard disk drive (HDD) 505, a medium I/F 507, a display 508, a network I/F 509, a keyboard 511, a mouse 512, a CD-RW drive 514, a speaker 515, and a bus line 510.

The CPU 501 controls entire operation of the PC 5. The ROM 502 stores a control program for controlling the CPU 501 such as an IPL. The RAM 503 is used as a work area for the CPU 501. The HD 504 stores various data such as a control program. The HDD 505, which may also be referred to as a hard disk drive controller, controls reading or writing of various data to or from the HD 504 under control of the CPU 501. The medium I/F 507 controls reading or writing of data with respect to a recording medium 506 such as a flash memory. The display 508 displays various information such as a cursor, menu, window, characters, or image. The network I/F 509 is an interface that controls communication of data with an external device through the communication network 10. The keyboard 511 is one example of input device provided with a plurality of keys for enabling a user to input characters, numerals, or various instructions. The mouse 512 is one example of input device for enabling the user to select a specific instruction or execution, select a target for processing, or move a curser being displayed. The CD-RW drive 514 reads or writes various data with respect to a Compact Disc ReWritable (CD-RW) 513, which is one example of removable recording medium. The speaker 515 outputs a sound signal under control of the CPU 501.

The bus line 510 may be an address bus or a data bus, which electrically connects various elements such as the CPU 501 of FIG. 5.

Still referring to FIG. 5, a hardware configuration of each of the sharing assistant server 6 and the schedule management server 8 is described. Referring to FIG. 5, the sharing assistant server 6, which is implemented by the general-purpose computer, includes a CPU 601, a ROM 602, a RAM 603, a hard disk (HD) 604, a hard disk drive (HDD) 605, a medium I/F 607, a display 608, a network I/F 609, a keyboard 611, a mouse 612, a CD-RW drive 614, and a bus line 610. The sharing assistant server 6 may be provided with a recording medium 606 or a CD-RW 613. Since these elements are substantially similar to the CPU 501, ROM 502, RAM 503, HD 504, HDD 505, medium I/F 507, display 508, network I/F 509, keyboard 511, mouse 512, CD-RW drive 514, and bus line 510, description thereof is omitted.

Referring to FIG. 5, the schedule management server 8, which is implemented by the general-purpose computer, includes a CPU 801, a ROM 802, a RAM 803, a HD 804, a HDD 805, a medium I/F 807, a display 808, a network I/F 809, a keyboard 811, a mouse 812, a CD-RW drive 814, and a bus line 810. The schedule management server 8 may be provided with a recording medium 806 or a CD-RW 813. Since these elements are substantially similar to the CPU 501, ROM 502, RAM 503, HD 504, HDD 505, medium I/F 507, display 508, network I/F 509, keyboard 511, mouse 512, CD-RW drive 514, and bus line 510, description thereof is omitted.

As illustrated in FIG. 5, the conversion server 9, which is implemented by the general-purpose computer, includes a CPU 901, a ROM 902, a RAM 903, a hard disk (HD) 904, a hard disk drive (HDD) 905, a medium I/F 907, a display 908, a network I/F 909, a keyboard 911, a mouse 912, a CD-RW drive 914, and a bus line 910. Since these elements are substantially similar to the CPU 501, ROM 502, RAM 503, HD 504, HDD 505, medium I/F 507, display 508, network I/F 509, keyboard 511, mouse 512, CD-RW drive 514, and bus line 510, description thereof is omitted.

Further, any one of the above-described control programs may be recorded in a file in a format installable or executable on a computer-readable recording medium for distribution. Examples of the recording medium include, but not limited to, Compact Disc Recordable (CD-R), Digital Versatile Disc (DVD), blue-ray disc, and SD card. In addition, such recording medium may be provided in the form of a program product to users within a certain country or outside that country.

The sharing assistant server 6 may be configured by a single computer or a plurality of computers to which divided portions (functions, means, or storages) are arbitrarily allocated. This also applies to the schedule management server 8 and the conversion server 9.

<Software Configuration of Electronic Whiteboard>

Figure 6:
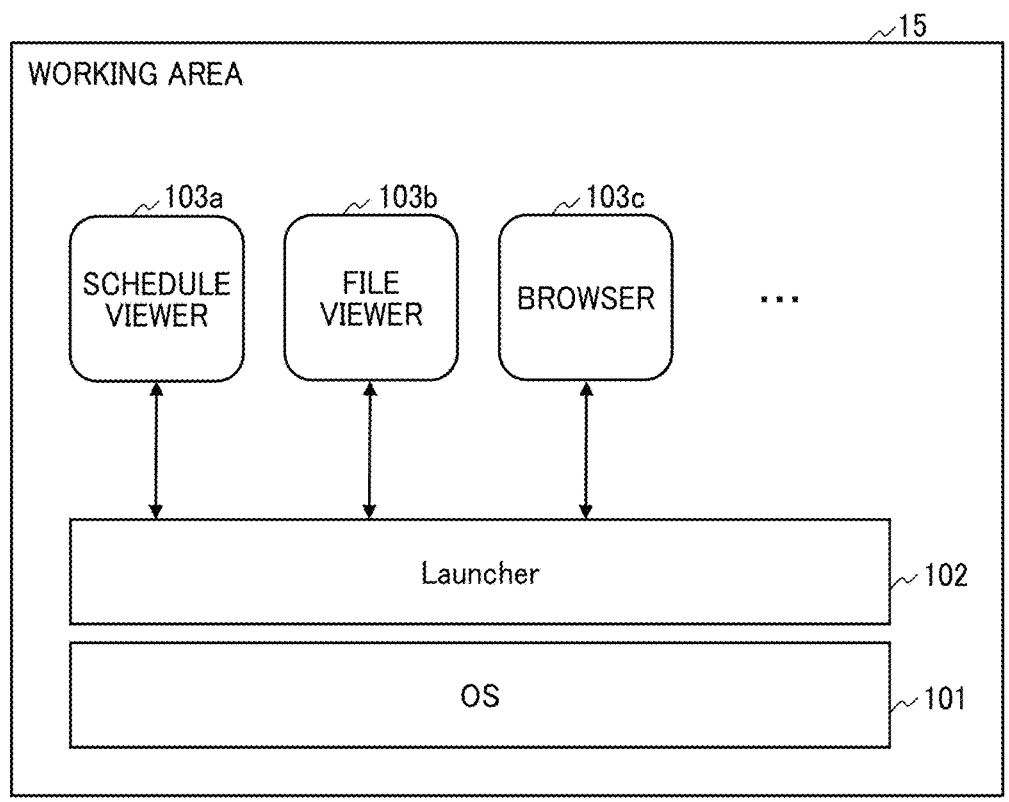
FIG. 6 is a schematic diagram illustrating a software configuration of the electronic whiteboard, according to an embodiment.

Next, referring to FIG. 6, computer software to be installed to the electronic whiteboard 2 is described according to an embodiment. In this disclosure, computer software (hereinafter referred to as software) is a program relating to operation to be performed by a computer or any data to be used in processing by a computer according to such program. The program is a set of instructions for causing the computer to perform processing to have a certain result. While data to be used in processing according to the program is not a program itself, such data may define processing to be performed by the program such that it may be interpreted as equivalent to the program. For example, a data structure, which is a logical structure of data described by an interrelation between data elements, may be interpreted as equivalent to the program.

The application program, which may be referred to as "application", is a general term for any software used to perform certain processing. The operating system (referred to as an OS) is software for controlling a computer, such that software, such as application, is able to use computer resource. The OS controls basic operation of the computer such as input or output of data, management of hardware such as a memory or a hard disk, or processing to be executed. The application controls processing using functions provided by the OS.

FIG. 6 is a schematic diagram illustrating a software configuration of the electronic whiteboard, according to an embodiment. As illustrated in FIG. 6, the electronic whiteboard 2 is installed with OS 101, Launcher 102, schedule viewer 103a, file viewer 103b, and browser application 103c, which operate on a work area 15 of the RAM 203. The OS 101 is basic software that controls entire operation of the electronic whiteboard 2 through providing basic functions.

The Launcher 102 operates on the OS 101. The Launcher 102 controls, for example, processing to start or end an event managed by the electronic whiteboard 2, or controls application such as the schedule viewer 103a, the file viewer 103b, and the browser application 103c, which may be used during the event being conducted. In the following, one example of event is a meeting.

In this example, the schedule viewer 103a, the file viewer 103b, and the browser application 103c (collectively referred to as "external application" 103) operate on the Launcher 102. The external application 103 executes processing independently of the Launcher 102 to execute a service or a function under control of the OS 101. Although FIG. 6 illustrates an example in which three external applications including the schedule viewer 103a, the file viewer 103b and the browser application 103c are installed on the electronic whiteboard 2, any number of external applications may be installed on the electronic whiteboard 2.

<Software Configuration of PC>

Figure 7:
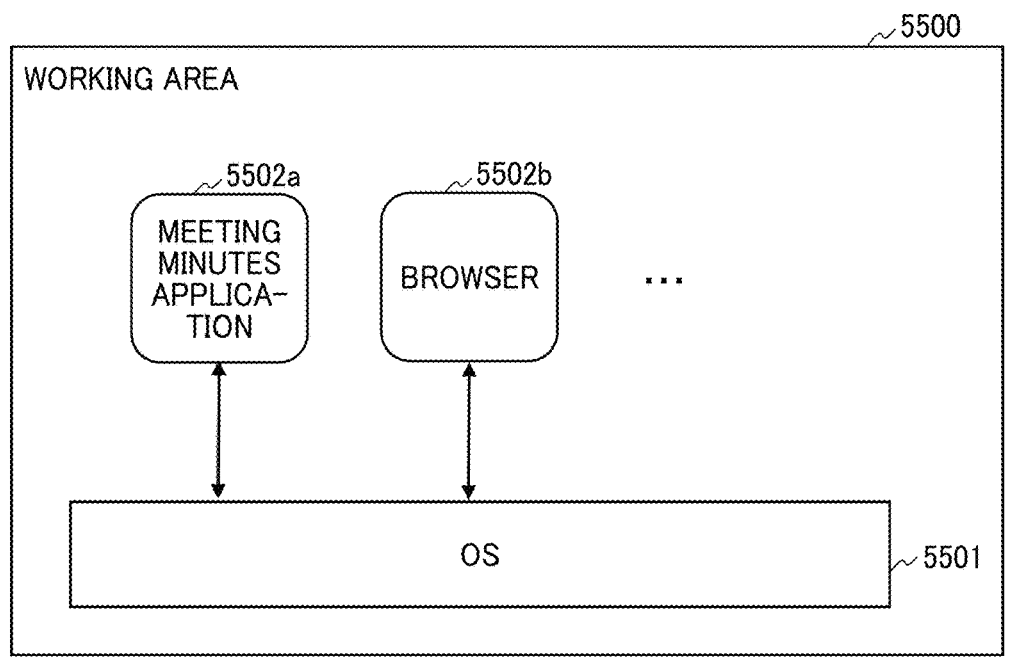
FIG. 7 is a schematic diagram illustrating a software configuration of the PC, according to an embodiment.

Next, referring to FIG. 7, computer software to be installed to the PC 5 is described according to an embodiment. FIG. 7 is a schematic diagram illustrating a software configuration of the PC 5, according to the embodiment. As illustrated in FIG. 7, the PC 5 is installed with OS 5501, meeting minutes application 5502a, and browser application 5502b, which operate on a working area 5500 of the RAM 503. The OS 5501 is basic software that controls entire operation of the PC 5 through providing basic functions.

The meeting minutes application 5502a, in cooperation with the browser 5502b, generates and displays an event record screen, which functions as meeting minutes of one or more meetings conducted using the electronic whiteboard 2, for example, based on various data transmitted from the schedule management server 8. Although FIG. 7 illustrates an example in which two external applications including the meeting minutes application 5502a and the browser 5502b are installed on the PC 5, any number of external applications may be installed on the PC 5.

<Functional Configuration of Sharing System>

Figure 8A:
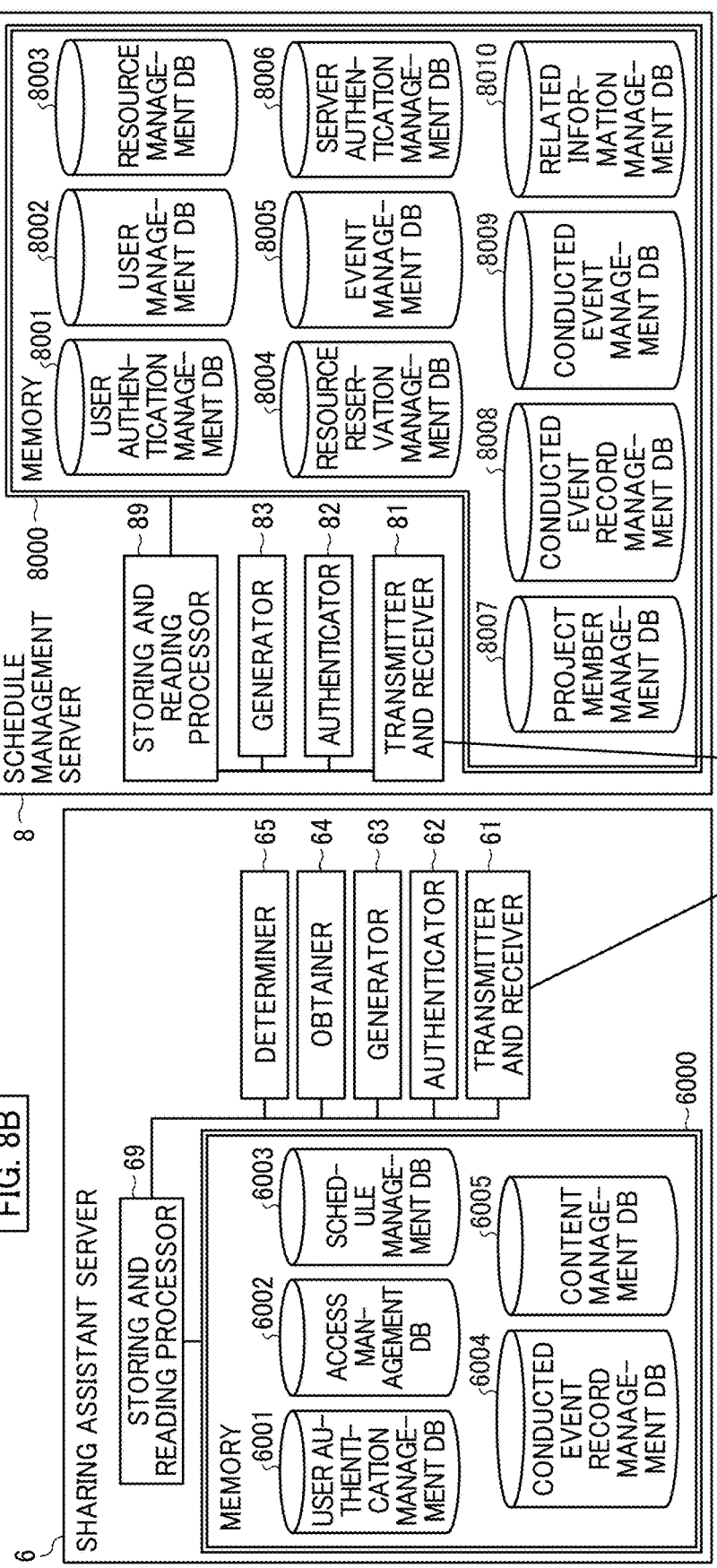
FIGS. 8A and 8B (FIG. 8) are a schematic block diagram illustrating a functional configuration of a part of the sharing system illustrated in FIG. 1, according to an embodiment.
Figure 8B:
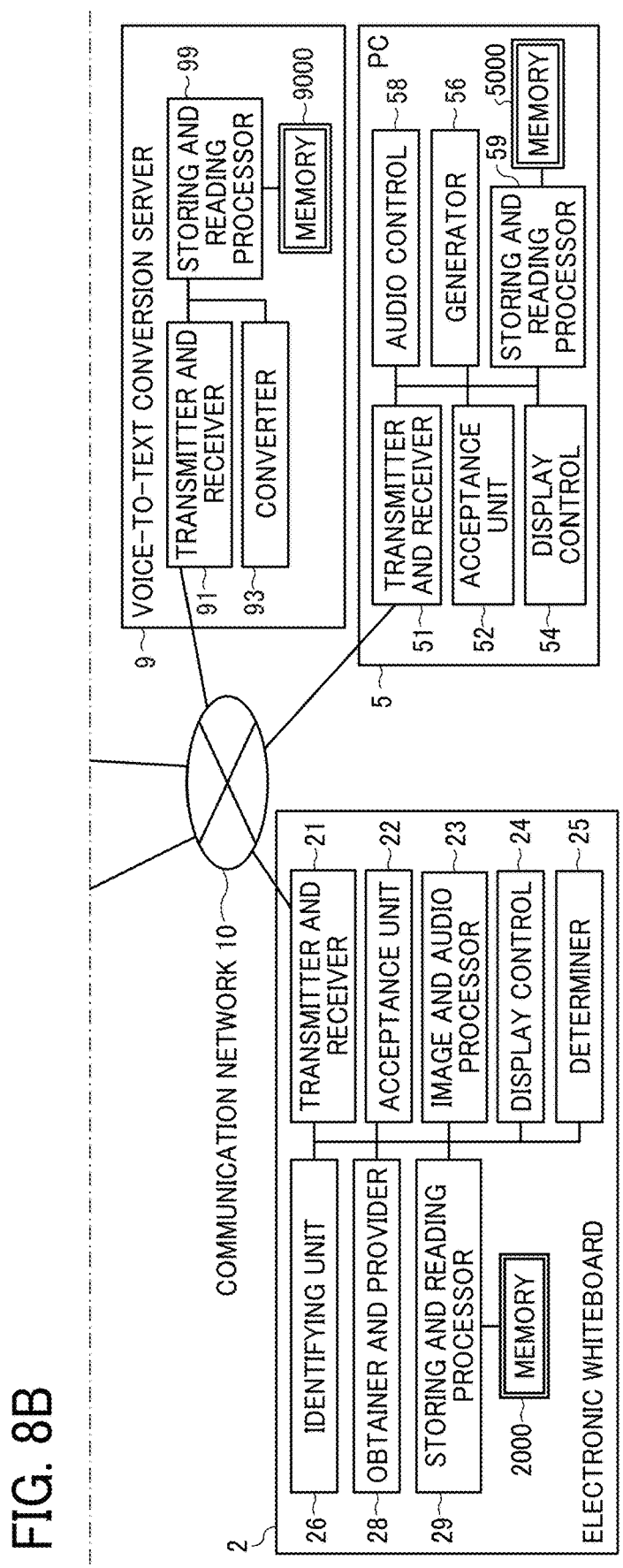

Referring to FIGS. 8 to 15, a functional configuration of the sharing system 1 is described according to the embodiment. FIG. 8 is a diagram illustrating a functional configuration of the sharing system 1. In FIG. 8, only a part of those terminals, devices, and servers illustrated in FIG. 1 is illustrated, which relates to processing or operation to be described below. More specifically, the following illustrates an example case in which the user uses the conference room X as a resource, in which the electronic whiteboard 2 is provided. In other words, the videoconference terminal 3 and the car navigation system 4 do not have to be provided in the following embodiment.

<Functional Configuration of Electronic Whiteboard>

As illustrated in FIG. 8, the electronic whiteboard 2 includes a transmitter and receiver 21, an acceptance unit 22, an image and audio processor 23, a display control 24, a determiner 25, an identifying unit 26, an obtainer and provider 28, and a storing and reading processor 29. These units are functions that are implemented by or that are caused to function by operating any of the elements illustrated in FIG. 2 in cooperation with the instructions of the CPU 201 according to the electronic whiteboard control program read from the SSD 204 to the RAM 203. The electronic whiteboard 2 further includes a memory 2000, which is implemented by the RAM 203, SSD 204, or USB memory 2600 illustrated in FIG. 2.

Next, a functional unit of the electronic whiteboard 2 is described according to the embodiment. The transmitter and receiver 21, which may be implemented by the instructions of the CPU 201, the network I/F 205, and the external device connection I/F 206, illustrated in FIG. 2, transmits or receives various data (or information) to or from other terminal, apparatus, or system through the communication network 10.

The acceptance unit 22, which is implemented by the instructions of the CPU 201, the contact sensor 214, and the electronic pen controller 216, illustrated in FIG. 2, accepts various inputs from the user.

In example operation, the image and audio processor 23, which may be implemented by the instructions of the CPU 201 and the capturing device 211 illustrated in FIG. 2, captures and stores image data displayed on the display 220. In other operation, the image and audio processor 23, which may be implemented by the instructions of the CPU 201 and the GPU 212 illustrated in FIG. 2, performs processing on data to be displayed on the display 220. For example, the image and audio processor 23 applies image processing to an image of a subject that has been captured by the camera 2400. Further, after the audio, such as voice of the user, is converted to an audio signal by the microphone 2200, the image and audio processor 23 applies processing to audio data based on this audio signal. The image and audio processor 23 then outputs the audio signal according to the audio data to the speaker 2300, and the speaker 2300 outputs audio. In another example, the image and audio processor 23 obtains drawing image data, drawn by the user with the electronic pen 2500 or the user's hand H onto the display 220, and converts the drawing image data to coordinate data. For example, when the electronic whiteboard 2 transmits the coordinate data to an electronic whiteboard 2 at another site, the electronic whiteboard 2 at the another site controls the display 220 to display a drawing image having the same content based on the received coordinate data.

The display control 24 is implemented by the instructions of the CPU 201 and the display controller 213, illustrated in FIG. 2. The display control 24 controls the display 220 to display a drawing image, or accesses the sharing assistant server 6 using the web browser to display various screen data. Specifically, the display control 24 activates and executes the Launcher 102 and the external application 103, which operates on the OS 101 illustrated in FIG. 6, to display various screens on the display 220, under control of an API (Application Programming Interface) of the OS 101.

The determiner 25, which may be implemented by the instructions of the CPU 201 illustrated in FIG. 2, outputs a determination result.

The identifying unit 26, which may be implemented by the instructions of the CPU 201 illustrated in FIG. 2, identifies a designated area 262 on a screen of the display 220.

The obtainer and provider 28, which is implemented by the instructions of the CPU 201 and the short-range communication circuit 219 with the antenna 219a, illustrated in FIG. 2, communicates with a terminal device carried by the user, such as an IC card or a smart phone to obtain or provide data from or to the IC card or the smart phone by short-range communication.

The storing and reading processor 29, which is implemented by the instructions of the CPU 201 illustrated in FIG. 2, performs processing to store various types of data in the memory 2000 or read various types of data stored in the memory 2000. Further, every time image data and audio data are received in performing communication with other electronic whiteboard or videoconference terminal, the memory 2000 overwrites the image data and audio data. The display 220 displays an image based on image data before being overwritten, and the speaker 2300 outputs audio based on audio data before being overwritten.

Even if the videoconference terminal 3 or the car navigation system 4 is used as the communication terminal, the videoconference terminal 3 and car navigation system 4 are substantially similar in function to the electronic whiteboard 2, such that description thereof is omitted.

<Functional Configuration of PC>

As illustrated in FIG. 8, the PC 5 includes a transmitter and receiver 51, an acceptance unit 52, a display control 54, a generator 56, an audio control 58, and a storing and reading processor 59. These units are functions that are implemented by or that are caused to function by operating any of the elements illustrated in FIG. 8 in cooperation with the instructions of the CPU 501 according to the control program expanded from the HD 504 to the RAM 503. The PC 5 further includes a memory 5000 implemented by the HD 504 illustrated in FIG. 5.

Next, a functional configuration of the PC 5 is described in detail. The transmitter and receiver 51, which is implemented by the instructions from the CPU 501 and by the network I/F 509 illustrated in FIG. 5, transmits or receives various types of data (or information) to or from another terminal, device, apparatus, or system via the communication network 10.

The acceptance unit 52, which is implemented by the instructions of the CPU 501, keyboard 511, and mouse 512, illustrated in FIG. 5, accepts various inputs from the user. The display control 54, which is implemented by the instructions of the CPU 501, controls the display 508 to display an image, for example, using web browser based on various screen data that is obtained through accessing the sharing assistant server 6. Specifically, the display control 54 activates and executes the meeting minutes application 5502a or the browser 5502b, which operates on the OS 5501 illustrated in FIG. 7, to access the sharing assistant server 6 or the schedule management server 8. Then, the display control 54 downloads, for example, WebAPP (Web Application), which includes at least HTML (Hyper Text Markup Language), and further includes CSS (Cascading Style Sheets) or JAVASCRIPT (Registered Trademark). The display control 54 further controls the display 508 to display various image data generated using the WebAPP. For example, the display control 54 controls the display 508 to display image data generated by HTML, which includes data in XML (Extensible Markup Language), JSON (JavaScript Object Notation), or SOAP (Simple Object Access Protocol).

The generator 56, which is implemented by the instructions from the CPU 501 illustrated in FIG. 5, generates various types of image data for display on the display 508. For example, the generator 56 generates various image data using content data received at the transmitter and receiver 51. In one example, the generator 56 renders text data as an example of content data, and generates image data for display based on the text data that has been rendered. In this example, rendering is a set of processes to interpret data described in language for Web page (HTML, CSS, XML, etc.) and calculate the arrangement of characters or images to be displayed on a screen.

The audio control 58, which is implemented by instructions from the CPU 501 illustrated in FIG. 5, controls the speaker 515 to output an audio signal. The audio control 58 sets audio data to be output from the speaker 515, such that the speaker 515 outputs the audio signal based on the set audio data to reproduce audio.

The storing and reading processor 59, which may be implemented by the instructions of the CPU 501 and the HDD 505, illustrated in FIG. 5, performs processing to store various types of data in the memory 5000 or read various types of data stored in the memory 5000.

<Functional Configuration of Sharing Assistant Server>

The sharing assistant server 6 includes a transmitter and receiver 61, an authenticator 62, a generator 63, an obtainer 64, a determiner 65, and a storing and reading processor 69. These units are functions that are implemented by or that are caused to function by operating any of the hardware elements illustrated in FIG. 5 in cooperation with the instructions of the CPU 601 according to a sharing assistant program read from the HD 604 to the RAM 603. The sharing assistant server 6 includes a memory 8000 implemented by the HD 504 illustrated in FIG. 5.

FIG. 9A is an illustration of an example data structure of a user authentication management table. The memory 6000 stores a user authentication management DB 6001 such as the user authentication management table illustrated in FIG. 9A. The user authentication data management table stores, for each user being managed, a user ID for identifying the user, a user name of the user, an organization ID for identifying an organization to which the user belongs, and a password, in association. The organization ID may be represented as a domain name assigned to an organization such as a group for managing a plurality of computers on the communication network.

FIG. 9B is an illustration of an example data structure of an access management table. The memory 6000 stores an access management DB 6002, such as the access management table illustrated in FIG. 9B. The access management table stores an organization ID, and an access ID and an access password for authenticating a user in accessing a corresponding scheduler managed by the schedule management server 8, in association. The access ID and the access password are needed for the sharing assistant server 6 to use a service (function) provided by the schedule management server 8 via such as the Web API (Application Programming Interface), using a protocol such as HTTP or HTTPS. Since the schedule management server 8 manages a plurality of schedulers, which may differ among the organizations, the access management table is provided to manage schedulers.

FIG. 9C is an illustration of an example data structure of a schedule management table. The memory 6000 stores a schedule management DB 6003, which is implemented by the schedule management table illustrated in FIG. 9C. The schedule management table stores, for each set of a scheduled event ID and a conducted event ID of an event, an organization ID and a user ID of a user as a reservation holder, participation of the reservation holder, a name of the reservation holder, a scheduled start time of the event, a scheduled end time of the event, a name of the event, a user ID(s) of one or more other users (other participants) in the event, participation of each other participant, names of one or more other users, and a file name of data related to the event ("data file"), in association.

The scheduled event ID is identification information for identifying an event that has been scheduled. The scheduled event ID is an example of scheduled event identification information for identifying an event to be conducted. The conducted event ID is identification information for identifying an event that has been conducted or an event being conducted, from among one or more scheduled events. The conducted event ID is an example of conducted event identification information (conducted event ID) for identifying an event that has been conducted or being conducted. That is, as described below, the conducted event ID is assigned to any event that has started. The name of the reservation holder is a name of the user who has reserved to use a particular resource. For example, assuming that the resource is a conference room, a name of the user who made the reservation is a name of an organizer who has organized a meeting (an example of event) to be held in that conference room. In case where the resource is a vehicle, a name of the user who made the reservation is a name of a driver who will drive the vehicle. The scheduled start time indicates a time when the user plans to start using the reserved resource. The scheduled end time indicates a time when the user plans to end using the reserved resource. That is, with the scheduled start time and the scheduled end time, a scheduled time period for the event is defined. The event name is a name of the event to be held by the user who has reserved the resource, using the reserved resource. The user ID of other participant is identification information for identifying any participant other than the reservation holder. As a participant other than the reservation holder, any resource to be used for the event may be included, such as the communication terminal. That is, the user scheduled to attend the event, managed by the schedule management table, includes a user as a reservation holder, other user as a participant of the event, and the resource reserved by the reservation holder such as the communication terminal. The user ID of the communication terminal is an identifier that is previously assigned to the communication terminal, and is stored in its internal memory. The file name is identification information for identifying an electronic data file, which has been registered by a user in relation to the event. For example, as described below, the user A may register a data file to be used for the event identified with the event ID, through a schedule input screen 550 (See FIG. 19). In the following, electronic data file may be referred to as a data file or a file, for simplicity. Instead of a file name, the data file may be identified using any other identification information. In this example, the data file may be generated in any desired format, using any desired application. Examples of data file format include, but not limited to, ppt (power point) and xsl (excel).

Figure 24:
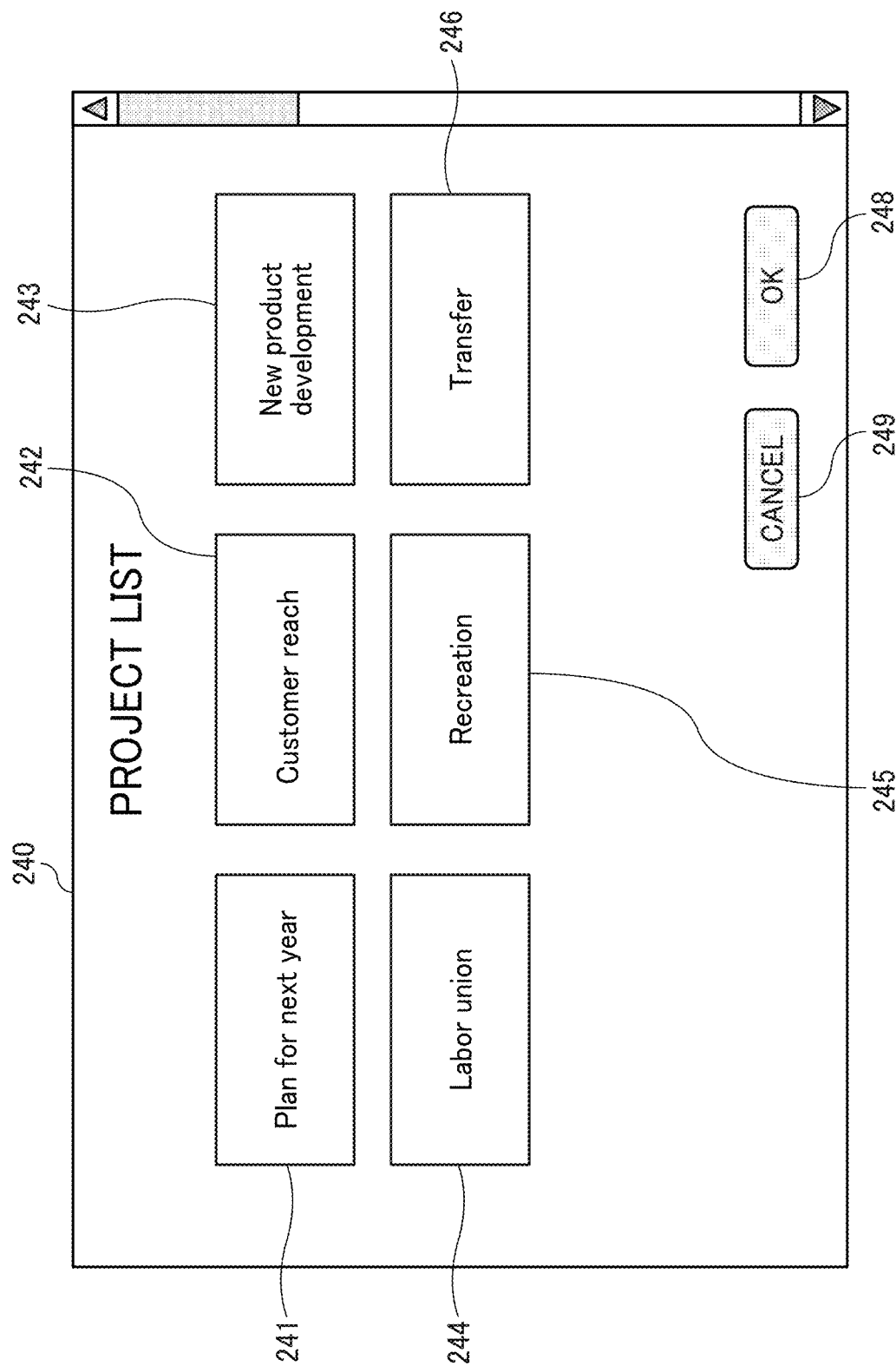
FIG. 24 is an illustration of an example project list screen.

FIG. 10A is an illustration of an example data structure of a conducted event management table. The memory 6000 stores a conducted event management DB 6004, which is implemented by the conducted event management table as illustrated in FIG. 10A. The conducted event management table stores, for each project, a project ID of the project and a conducted event ID of each of one or more events that have been performed in relation to the project, in association. The project ID is an example of identification information for identifying a project. The project is any undertaking, possibly involving research or design, that is planned to achieve a particular aim. The project is carried out by a team or a group of members, called project members. In this embodiment, the project members of a particular project can share event records such as minutes of an event for the particular project. As illustrated in FIG. 24, a project ID is assigned to each project, such as to the project "Plan for next year" and the project "Customer reach". The project ID may be alternatively referred to as a group ID or a team ID, for identifying a group or team of project members.

FIG. 10B is an illustration of an example data structure of a content management table. The memory 6000 stores a content management DB 6005, which is implemented by a content management table illustrated in FIG. 10B. The content management table stores, for each conducted event ID, a content processing ID, a type of content processing, content data, start date and time of content processing, and end date and time of content processing, in association. The content is any data or information that has been generated or that has been referred to, during the event held in relation to a particular project. For example, in case the event is a meeting, content being referred to may be any meeting materials such as data of presentation slides. Examples of type of content processing ("content processing type") include audio recording ("recording"), taking screenshots ("screenshot"), conversion of voice text data ("voice text conversion"), generation of action item ("action item"), and transmission of a data file ("file transmission"). The content processing ID is identification information for identifying processing to be performed in relation to content generated or used during the event.

Examples of content data include information or data ("record information") that helps to describe how the event has been progressed, and information or data that has been generated as the event is being held. In case the event is a meeting, the record information could be recorded voice data, screenshots, text data converted from voice, and meeting materials. The information or data generated during the meeting could be an action item. Screenshot is processing to capture a screen of the resource (such as the communication terminal), at any time during when the event is being held, to record as screen data. The screenshot may be alternatively referred to as capturing or image detection.

When the content processing type is "recording", the "content data" field includes a URL of a storage destination of voice data that has been recorded. When the content processing type is "screenshot", the "content data" field includes a URL of a storage destination of image data generated by capturing a screen. In this disclosure, capturing is processing to store an image being displayed on the display 220 of the electronic whiteboard 2 in a memory, as image data. When the content processing type is "voice text conversion", the "content data" field includes a URL of a storage destination of voice text data (text data) that has been converted.

One or more action items may occur during the event, such as the meeting, in relation to a particular project. The action item indicates an action to be taken by a person related to the event or the particular project. When the content processing type is "action item", the "content data" field includes a user ID of an owner of the action item, a due date of such action item, and a URL indicating a storage destination of image data describing the action item. When the content processing type is "file transmission", the "content data" field includes a URL indicating a storage destination of a data file that is stored in relation to the event or the particular project.

Next, a functional unit of the sharing assistant server 6 is described in detail according to the embodiment. In the following description of the functional configuration of the sharing assistant server 6, relationships of one or more hardware elements in FIG. 5 with each functional unit of the sharing assistant server 6 in FIG. 8 will also be described.

The transmitter and receiver 61 of the sharing assistant server 6 illustrated in FIG. 8, which is implemented by the instructions of the CPU 601 illustrated in FIG. 5 and by the network I/F 609 illustrated in FIG. 5, transmits or receives various types of data (or information) to or from another terminal, device, or system via the communication network 10.

The authenticator 62, which is implemented by the instructions of the CPU 601 illustrated in FIG. 5, determines whether data (user ID, organization ID, and password) transmitted from the communication terminal matches any data previously registered in the user authentication management DB 6001. As described above, the communication terminal is any device that the user uses for login.

Figure 22:
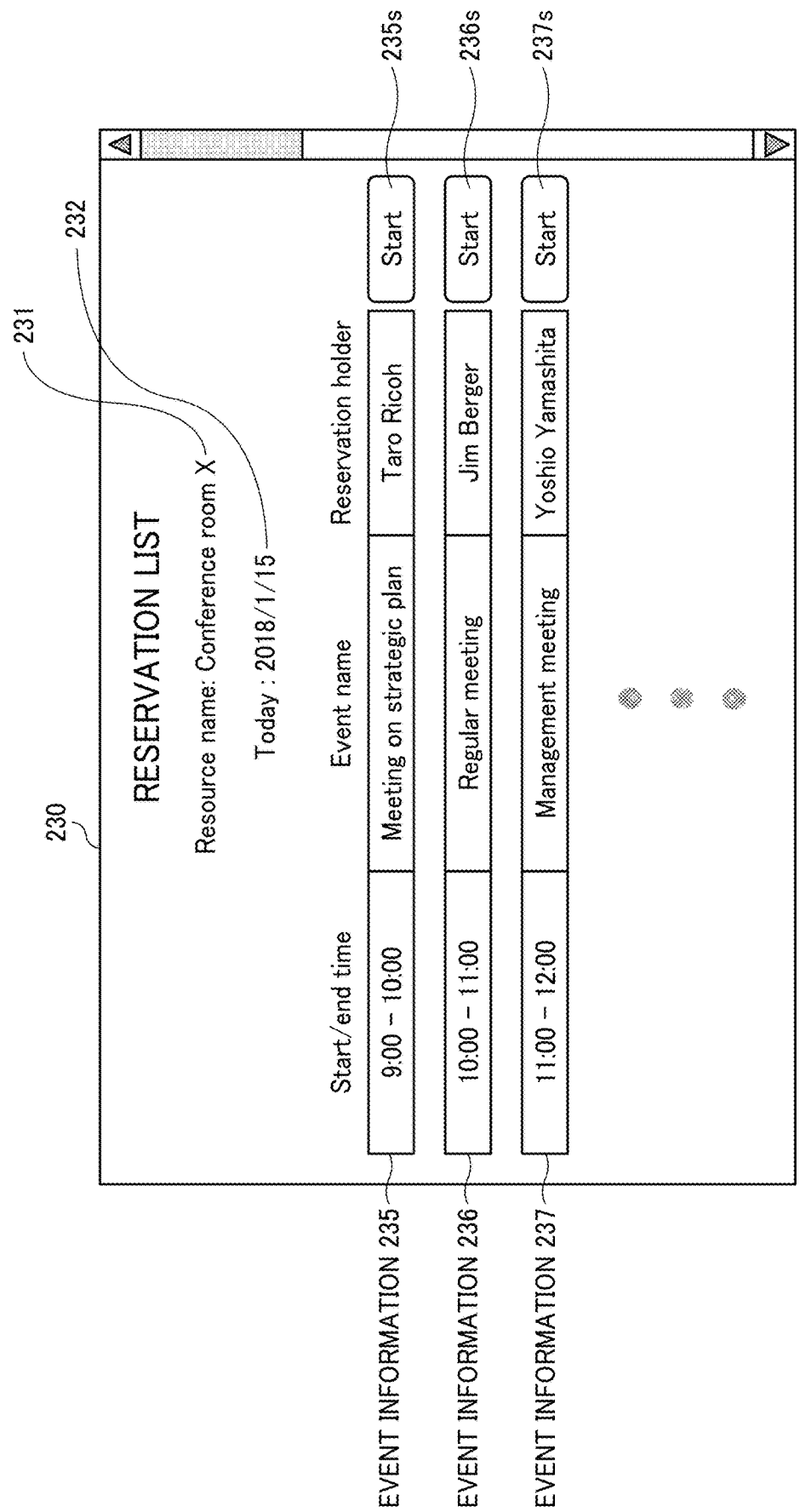
FIG. 22 is an illustration of an example resource reservation list screen.

The generator 63, which is implemented by the instructions of the CPU 601 as illustrated in FIG. 5, generates a reservation list screen 230 as illustrated in FIG. 22, based on reservation information and schedule information transmitted from the schedule management server 8.

The obtainer 64, which is implemented by the instructions of the CPU 601 illustrated in FIG. 5, generates, or obtains, a conducted event ID, a content processing ID, and a URL of a storage destination of content. For ID, the obtainer 64 may assign any number or letter to uniquely identify each event.

The determiner 66, which is implemented by the instructions of the CPU 601 illustrated in FIG. 5, makes various determinations to output determination results.

The storing and reading processor 69, which is implemented by the instructions of the CPU 601 illustrated in FIG. 5 and the HDD 605 illustrated in FIG. 5, performs processing to store various types of data in the memory 6000 or read various types of data stored in the memory 6000.

<Functional Configuration of Schedule Management Server>

The schedule management server 8 includes a transmitter and receiver 81, an authenticator 82, a generator 83, and a storing and reading processor 89. These units are functions that are implemented by or that are caused to function by operating any of the elements illustrated in FIG. 5 in cooperation with the instructions of the CPU 801 according to the schedule management program expanded from the HD 804 to the RAM 803. The schedule management server 8 includes a memory 8000 implemented by the HD 804 illustrated in FIG. 5.

FIG. 11A is an illustration of an example data structure of a user authentication management table. The memory 8000 stores the user authentication management DB 8001 such as the user authentication management table illustrated in FIG. 11A. The user authentication management table of FIG. 11A stores, for each user being managed, a user ID for identifying the user, an organization ID for identifying an organization to which the user belongs, and a password, in association.

FIG. 11B is an illustration of an example data structure of a user management table. The memory 8000 stores a user management DB 8002, which is implemented by the user management table illustrated in FIG. 11B. The user management table stores, for each organization ID, one or more user IDs each identifying the user belonging to that organization, and names of the one or more users.

FIG. 11C is an illustration of an example data structure of a resource management table. The memory 8000 stores a resource management DB 8003, which is implemented by the resource management table illustrated in FIG. 11C. The resource management table stores, for each organization ID, one or more resource IDs each identifying the resource managed by that organization, and names of the one or more resources, in association.

FIG. 12A is an illustration of an example data structure of a resource reservation management table. The memory 8000 stores a resource reservation management DB 8004, which is implemented by the resource reservation management table illustrated in FIG. 12A. The resource reservation management table manages, for each organization, reservation information in which various data items relating to a reserved resource are associated. The reservation information includes, for each organization ID, a resource ID and a resource name of a reserved resource, a user ID of a communication terminal, a user ID of a reservation holder who made reservation, a scheduled start date and time and a scheduled end date and time of an event in which the reserved resource is to be used, and an event name of such event. The scheduled start date and time indicates a date and time when the user plans to start using the reserved resource. The scheduled end date and time indicates a date and time when the user plans to end using the reserved resource. In this example, while the date and time is expressed in terms of year, month, date, hour, minute, second, and time zone, FIG. 12A only shows year, month, date, hour, and minute for simplicity.

FIG. 12B is an illustration of an example data structure of the event management table. The memory 8000 stores an event management DB 8005, which is implemented by the event management table as illustrated in FIG. 12B. The event management table manages, for each event, event schedule information in which various data items relating to an event are associated. Specifically, the event management table stores, for each scheduled event ID, an organization ID, a user ID, and a name of each user who is scheduled to attend the event, a scheduled start date and time of the event, a scheduled end date and time of the event, and a name of the event, in association. As described above, the communication terminal is treated as a user who is scheduled to attend the event. The scheduled start date and time of the event indicates a date and time of the event that the user plans to participate starts. The scheduled end date and time of the event indicates a date and time of the event that the user plans to participate ends. In this example, while the date and time is expressed in terms of year, month, date, hour, minute, second, and time zone, FIG. 12B only shows year, month, date, hour, and minute for simplicity. The event management table further stores a memo, and a file name of a data file ("data file") such as data of meeting materials used in the event. The memo corresponds to any data entered during registering the schedule as described below referring to FIG. 19.

FIG. 13A is an illustration of an example data structure of a server authentication management table. The memory 8000 stores a server authentication management DB 8006, such as the server authentication management table illustrated in FIG. 13A. The server authentication management table stores an access ID and an access password in association. In authentication, the schedule management server 8 determines whether the access ID and the access password transmitted from the sharing assistant server 6 matches the access ID and the access password stored in the server authentication management DB 8006. That is, data managed by the sharing assistant server 6 using the access management table of FIG. 9B, and data managed by the schedule management server 8 using the server authentication management table of FIG. 13A are to be kept the same.

FIG. 13B is an illustration of an example data structure of a project member management table. The memory 8000 stores a project member management DB 8007, which is implemented by the project member management table illustrated in FIG. 13B. The project member management table stores, for each project being managed by each organization having the organization ID, a project ID, a project name, and a user ID of each project member, in association.

FIG. 14A is an illustration of an example data structure of a conducted event record management table. The memory 6000 stores a conducted event record management DB 8008, which is implemented by the conducted event record management table as illustrated in FIG. 14A. The conducted event management table stores, for each set of project ID and conducted event ID, a content processing ID, a type of content processing, content data, a start date and time of content processing, and an end date and time of content processing, in association. The conducted event record management DB 8008 is generated based on the content management DB 6005. That is, the conducted event ID, content processing ID, type of content processing, start date and time of content processing, and end date and time of content processing, are the same between these databases 6005 and 8008. The data in the "content data" field, that is, the storage destination of content, is managed using a different expression format, while the actual storage location is the same. Specifically, the storage destination is described in c:// (local drive) for the content management table (FIG. 10B), and in http:// for the conducted event record management table (FIG. 14A).

FIG. 14B is an illustration of a conducted event management table. The memory 8000 stores a conducted event management DB 8009, which is implemented by the conducted event management table illustrated in FIG. 14B. The conducted event management table stores, for each conducted event ID, an event name, an event start date and time, and an event end date and time, in association. From among the schedule information stored in the event management DB 8005, information related to one or more events that have been actually held (called "conducted event") are managed using the conducted event management DB 8009.

FIG. 15 is an illustration of an example data structure of a related information management table. The memory 8000 stores a related information management DB 8010, which is implemented by the related information management table illustrated in FIG. 15. The related information management table stores, for each set of the project ID and the conducted event ID, related information in which various data items related to an event for a project are associated. Specifically, the related information associates a time when content is generated ("content generation time"), voice data, voice text data, and image data, in association. The content generation time is represented by an elapsed time counted from the event start date and time, until the time when content is generated during the event. The content generation time is generated by the generator 83, based on the event start date and time stored in the event management DB 8005, the start date and time, and end date and time of the content processing each stored in the event record management DB 8008. The content generation time is an example of time information. The "voice data" field includes content processing ID, and content processing type. The "voice text data" field and the "image data" field each include content processing ID, content processing type, and a sequence number. The sequence number is assigned to each content processing ID, based on the content generation time. Accordingly, the sequence number indicates an order in which each content processing is being performed during the event.

Next, a functional unit of the schedule management server 8 is described in detail according to the embodiment. In the following description of the functional configuration of the schedule management server 8, relationships of one or more hardware elements in FIG. 5 with each functional unit of the schedule management server 8 in FIG. 8 will also be described.

The transmitter and receiver 81 of the schedule management server 8 illustrated in FIG. 8, which is implemented by the instructions of the CPU 801 illustrated in FIG. 5 and by the network I/F 809 illustrated in FIG. 5, transmits or receives various types of data (or information) to or from another terminal, device, or system via the communication network 10.

The authenticator 82, which is implemented by the instructions of the CPU 801 illustrated in FIG. 5, determines whether data (user ID, organization ID, and password) transmitted from the resource matches any data previously registered in the user authentication management DB 8001. The authenticator 82 determines whether data (access ID and access password) transmitted from the sharing assistant server 6 matches any data previously registered in the server authentication management DB 8006, to authenticate the sharing assistant server 6.

The generator 83, which is implemented by the instructions of the CPU 801 illustrated in FIG. 5, generates related information to be registered to the related information management DB 8010.

The storing and reading processor 89, which is implemented by the instructions of the CPU 801 illustrated in FIG. 5 and the HDD 805 illustrated in FIG. 5, performs processing to store various types of data in the memory 8000 or read various types of data stored in the memory 8000.

<Functional Configuration of Voice-to-Text Conversion Server>

The voice-to-text conversion server 9 includes a transmitter and receiver 91, a converter 93, and a storing and reading processor 99. These units are functions that are implemented by or that are caused to function by operating any of the elements illustrated in FIG. 8 in cooperation with the instructions of the CPU 901 according to the control program expanded from the HD 904 to the RAM 903. The voice-to-text conversion server 9 includes a memory 9000, implemented by the HD 904 illustrated in FIG. 5.

Next, a functional unit of the voice-to-text conversion server 9 is described in detail according to the embodiment. In the following description of the functional configuration of the voice-to-text conversion server 9, relationships of one or more hardware elements in FIG. 5 with each functional unit of the conversion server 9 in FIG. 8 will also be described.

The transmitter and receiver 91 of the conversion server 9 illustrated in FIG. 8, which is implemented by the instructions of the CPU 901 illustrated in FIG. 5 and by the network I/F 909 illustrated in FIG. 5, transmits or receives various types of data (or information) to or from another terminal, device, or system via the communication network 10.

The converter 93, which is implemented by the instructions of the CPU 901 illustrated in FIG. 5, converts voice data received at the transmitter and receiver 91 via the communication network 10, into text data (voice text data).

The storing and reading processor 99, which is implemented by the instructions of the CPU 901 illustrated in FIG. 5 and the HDD 905 illustrated in FIG. 5, performs processing to store various types of data in the memory 9000 or read various types of data stored in the memory 9000.

In this disclosure, any one of the IDs described above is an example of identification information identifying the device or terminal, or the user operating the device or terminal. Examples of the organization ID include, but not limited to, a name of a company, a name of a branch, a name of a business unit, a name of a department, a name of a region, etc. In alternative to the user ID identifying a specific user, an employee number, a driver license number, and an individual number called "My Number" under the Japan's Social Security and Tax Number System, may be used as identification information for identifying the user.

<Operation>

The following describes one or more operations to be performed by the sharing system 1.

<Processing to Register Schedule>

Figure 16:
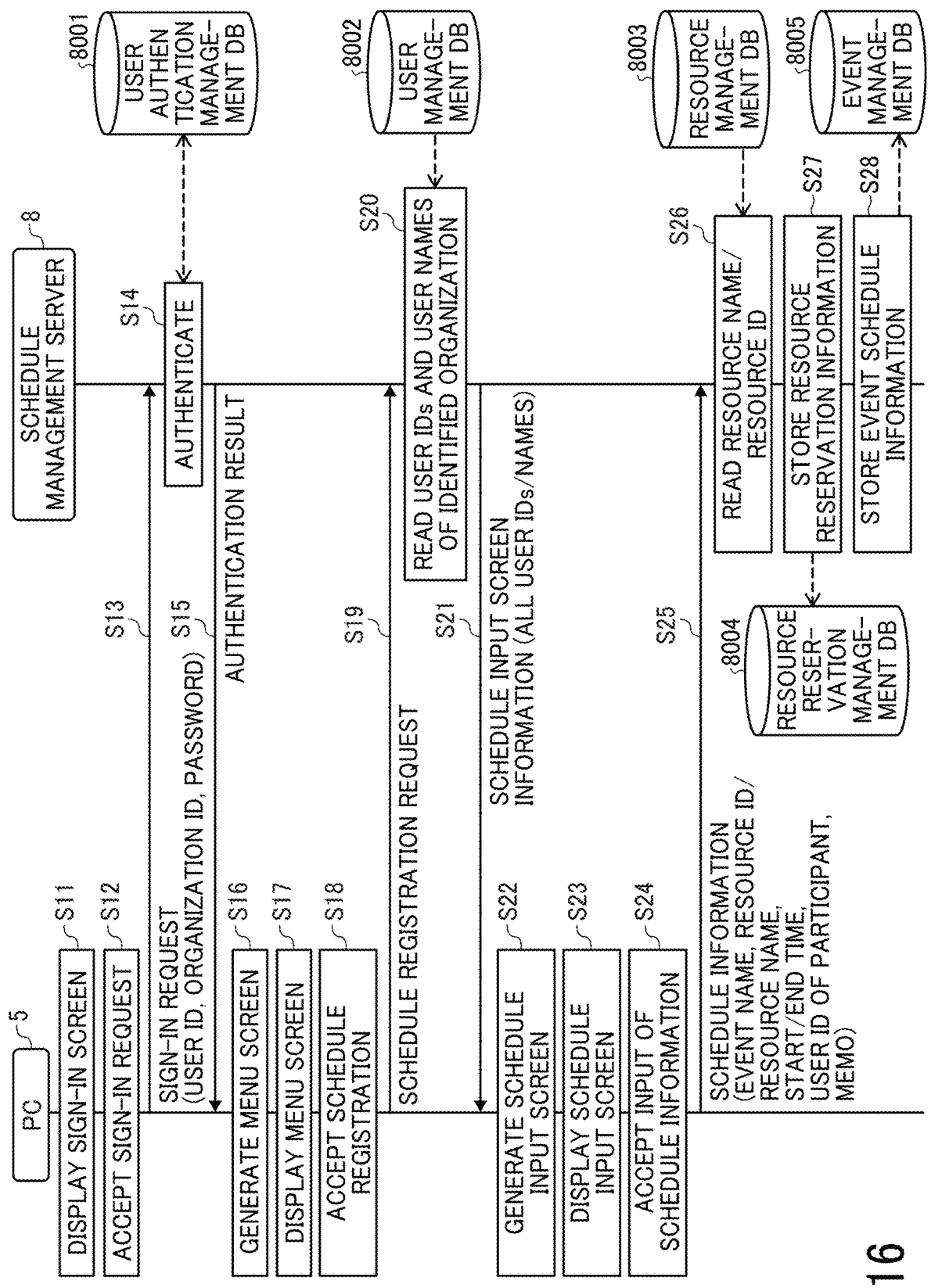
FIG. 16 is a sequence diagram illustrating operation of registering a schedule, according to an embodiment.
Figure 17:
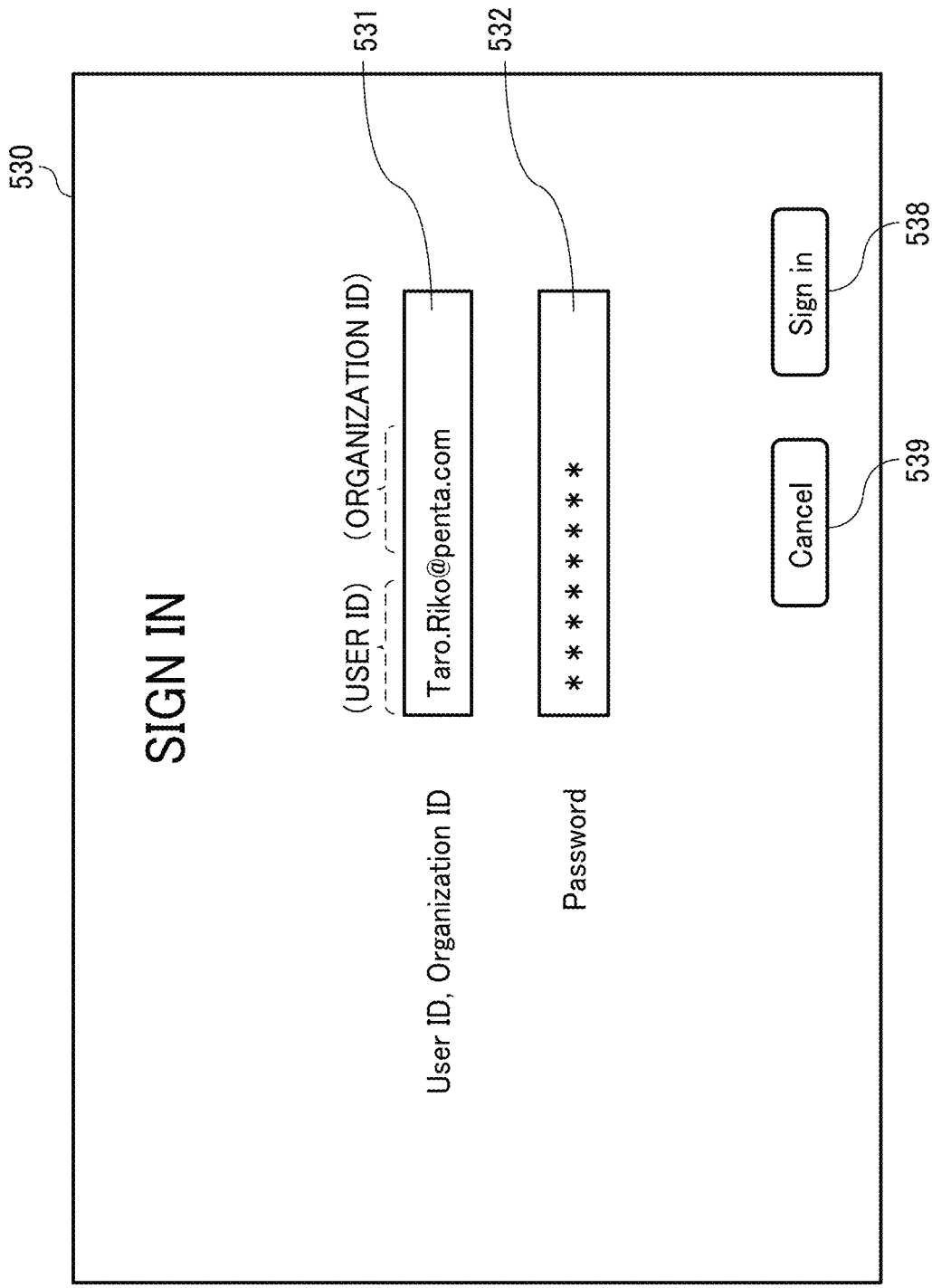
FIG. 17 is an illustration of an example sign-in screen.
Figure 18:
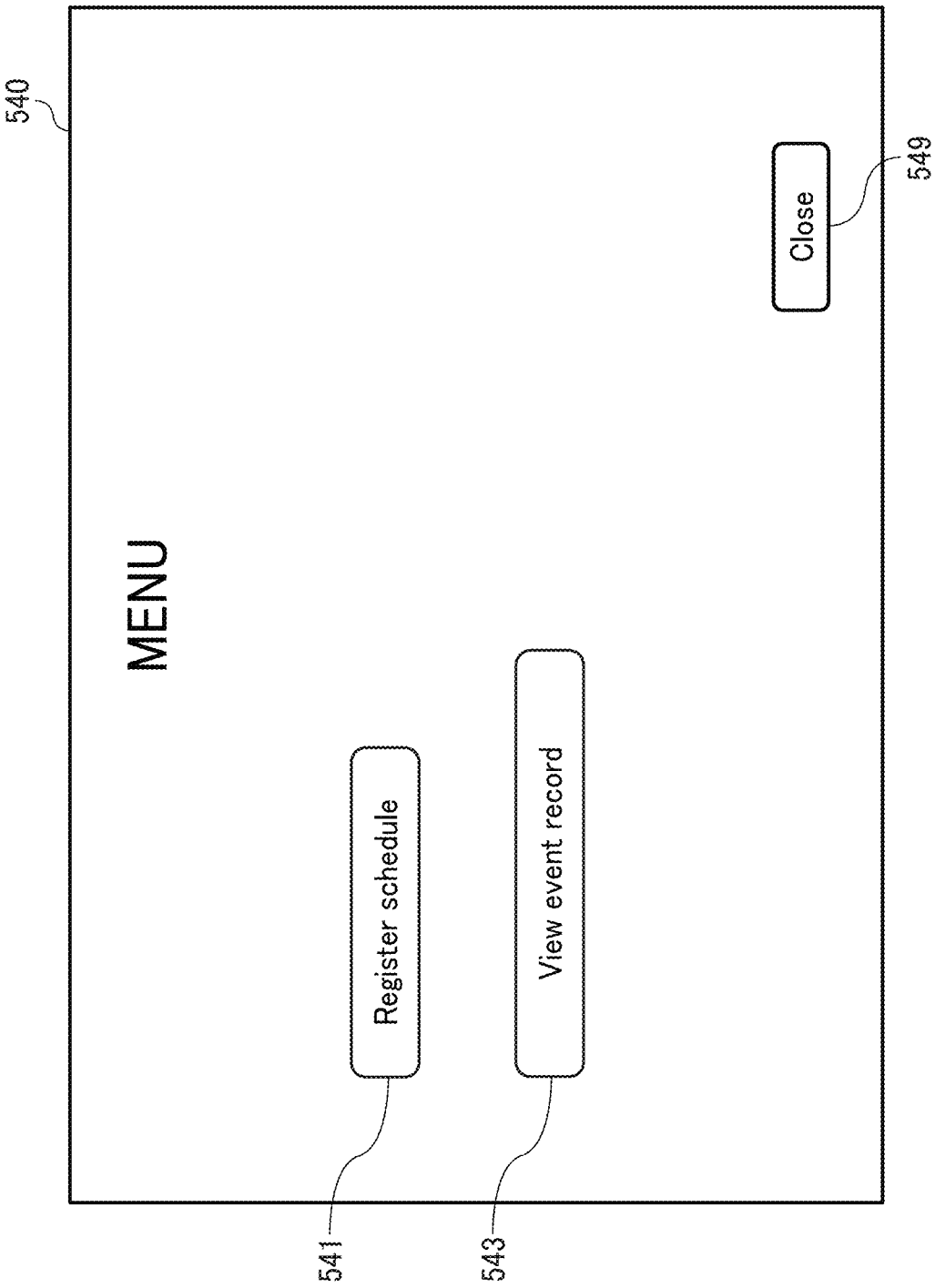
FIG. 18 is an example menu screen displayed by the PC.
Figure 19:
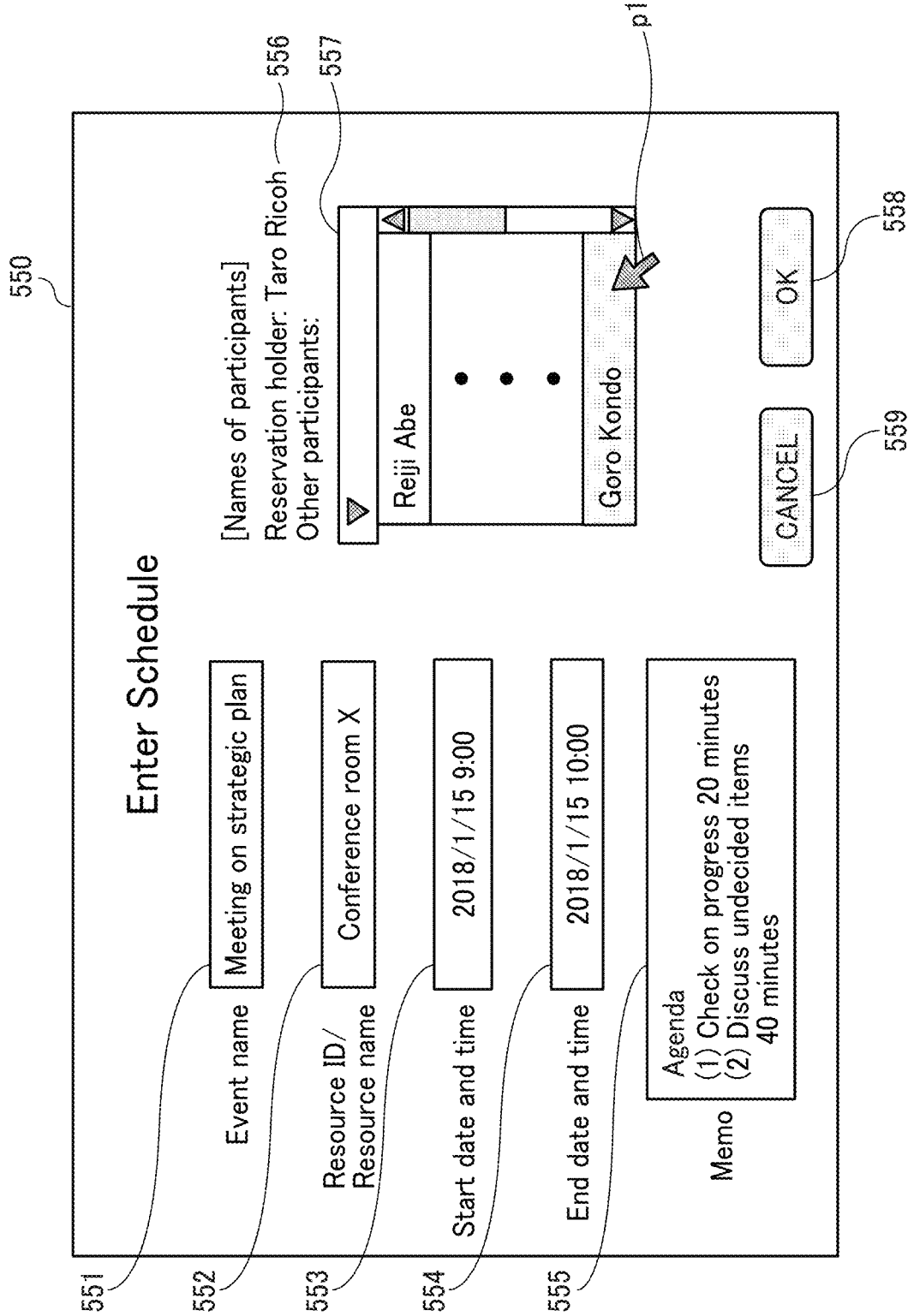
FIG. 19 is an illustration of an example schedule input screen.

Referring to FIGS. 16 to 19, processing of registering a schedule of a user A (Taro Ricoh) to the schedule management server 8, using the PC 5, is described according to an example. FIG. 16 is a sequence diagram illustrating operation of registering schedule, according to an embodiment. FIG. 17 is an illustration of an example sign-in screen. FIG. 18 is an example menu screen displayed by the PC 5. FIG. 19 is an illustration of an example schedule input screen.

In response to an operation on the keyboard 511 of the PC 5 by the user A, the display control 54 of the PC 5 displays a sign-in screen 530 on the display 508 as illustrated in FIG. 17 (S11). The sign-in screen 530 allows the user to sign (log) into the schedule management server 8. The sign-in screen 530 includes an entry field 531 for entering a user ID and an organization ID of a user, an entry field 532 for entering a password, a sign-in button 538 to be pressed when executing sign-in processing, and a cancel button 539 to be pressed when canceling the sign-in processing. In this case, the user ID and the organization ID are each extracted from an e-mail address of the user A. Specifically, a user name of the email address represents the user ID, and a domain name of the email address represents the organization ID. While only one entry field 531 for entering the email address is illustrated in FIG. 17, an entry field may be provided for each of the user ID and the organization ID.

Through the sign-in screen 530, the user enters the user ID and the organization ID of his/her own into the entry field 531, enters the password of his/her own into the entry field 532, and presses the sign in button 538. In response to such user operation, the acceptance unit 52 of the PC 5 accepts a request for sign-in processing (S12). The transmitter and receiver 51 of the PC 5 transmits sign-in request information to the schedule management server 8 (S13). The sign-in request information includes the user ID, organization ID, and password, which are accepted at S12. Accordingly, the transmitter and receiver 81 of the schedule management server 8 receives the sign-in request information.

Next, the authenticator 82 of the schedule management server 8 authenticates the user A using the user ID, the organization ID, and the password (S14). Specifically, the storing and reading processor 89 determines whether a set of the user ID, the organization ID, and the password, which is obtained from the sign-in request information received at S13, has been registered in the user authentication management DB 8001 (FIG. 11A). When there is the set of the user ID, the organization ID, and the password in the user authentication management DB 8001, the authenticator 82 determines that the user A who has sent the sign-in request is an authorized user. When there is no such set of the user ID, the organization ID, and the password in the user authentication management DB 8001, the authenticator 82 determines that the user A is an unauthorized (illegitimate) user. When it is determined that the user A is an illegitimate user, the transmitter and receiver 81 sends to the PC 5 a notification indicating that the user A is the illegitimate user. In the following, it is assumed that the user A is determined to be an authorized user.

The transmitter and receiver 81 transmits an authentication result to the PC 5 (S15). The transmitter and receiver 51 of the PC 5 receives the authentication result.

When the authentication result indicating successful authentication is received at S15, the generator 56 of the PC 5 generates data of a menu screen 540 for display as illustrated in FIG. 18 (S16). The display control 54 of the PC 5 controls the display 508 to display the menu screen 540 as illustrated in FIG. 18 (S17). In this example, the menu screen 540 includes a "Register schedule" button 541 for registering a schedule, and an "View event record" button 543 for viewing a record related to an event such as action items in case the event is a meeting. In response to pressing of the "Register schedule" button 541 by the user, the acceptance unit 52 accepts a request for schedule registration (S18). The transmitter and receiver 51 of the PC 5 transmits a schedule registration request to the schedule management server 8 (S19). Accordingly, the transmitter and receiver 81 of the schedule management server 8 receives the schedule registration request.

Next, the storing and reading processor 89 of the schedule management server 8 searches the user management DB 8002 (FIG. 11B), using the organization ID received at S13 as a search key, to obtain all user IDs and all user names that are associated with the received organization ID (S20). The transmitter and receiver 81 transmits schedule input screen information to the PC 5 (S21). The schedule input screen information includes all user IDs and all user names read out at S20. Here, all user names include the name of the user A who has entered various information at S12 to request for sign-in processing to input schedule information. The transmitter and receiver 51 of the PC 5 receives the schedule input screen information.

The generator 56 of the PC 5 generates data of a schedule input screen 550 for display, based on the schedule input screen information received at S21 (S22). The display control 54 of the PC 5 controls the display 508 to display the schedule input screen 550 as illustrated in FIG. 19 (S23).

The schedule input screen 550 includes an entry field 551 for an event name, an entry field 552 for a resource ID or a resource name, and an entry field 553 for a scheduled start date and time of the event (use of the resource), an entry field 554 for a scheduled end date and time of the event (use of the resource), an entry field 555 for entering memo such as agenda, a display field 556 for displaying a name of a reservation holder (in this example, the user A) who is making a reservation, a selection menu 557 for selecting one or more participants other than the reservation holder by name, an "OK" button 558 to be pressed when requesting for registration of reservation, and a "CANCEL" button 559 to be pressed when cancelling any content being entered or has been entered. In addition, an "upload file" button for uploading a data file of event materials (such as meeting materials) may be displayed for user selection. The name of the reservation holder is a name of the user who has entered various information using the PC 5 to request for sing-in processing at S12. FIG. 19 further illustrates a mouse pointer p1.

The user may enter an email address of the resource in the entry field 552, as an identifier of the resource to be reserved. Further, the selection menu 557 may allow the reservation holder to select one or more resources by name. When a name of a particular resource is selected from the selection menu 557, that selected resource is added as one of participants in the event.

The user A enters items as described above in the entry fields 551 to 555, selects the name of each user participating in the event from the selection menu 557 by moving the pointer p1 with the mouse, and presses the "OK" button 558. In response to pressing of the "OK" button 558, the acceptance unit 52 of the PC 5 accepts input of schedule information (S24). The transmitter and receiver 51 transmits the schedule information, which has been accepted, to the schedule management server 8 (S25). The schedule information includes an event name, a resource ID (or a resource name), a scheduled start date and time, a scheduled end date and time, a user ID of each participant, and information on memo. If there is any file selected for uploading, the schedule information may include information on the selected file. When a resource ID is entered in the entry field 552 on the schedule input screen 550, the PC 5 transmits the entered resource ID as part of schedule information. When a resource name is entered in the entry field 552, the PC 5 transmits the entered resource name as part of schedule information. Here, only the user name is selected from the selection menu 557 on the schedule input screen 550. However, since the PC 5 has received the user IDs at S21, the PC 5 transmits the user ID corresponding to each of the user names that have been selected as part of schedule information. Accordingly, the transmitter and receiver 81 of the schedule management server 8 receives the schedule information.

Next, the storing and reading processor 89 of the schedule management server 8 searches the resource management DB 8003 (FIG. 13C) using the resource ID (or resource name) received at S25 as a search key, to obtain the corresponding resource name (or resource ID) (S26).

The storing and reading processor 89 stores the reservation information in the resource reservation management DB 8004 (FIG. 12A) (S27). In this case, the storing and reading processor 89 adds one record of reservation information to the resource reservation management table in the resource reservation management DB 8004 managed by a scheduler previously registered (that is, the scheduler managed for a particular organization). The reservation information is generated based on the schedule information received at S25 and the resource name (or resource ID) read out at S26. The scheduled start date and time in the resource reservation management DB 8004 corresponds to the scheduled start date and time in the schedule information. The scheduled end date and time in the resource reservation management DB 8004 corresponds to the scheduled end date and time in the schedule information.

The storing and reading processor 89 stores the schedule information in the event management DB 8005 (FIG. 12B) (S28). In this case, the storing and reading processor 89 adds one record of schedule information (that is, event schedule information) to the event management table in the event management DB 8005 managed by the scheduler that is previously registered (that is, the scheduler managed for a particular organization). The schedule information is generated based on the schedule information received at S25. The event start schedule date and time in the event management DB 8005 corresponds to the scheduled start date and time in the schedule information. The event end schedule date and time in the event management DB 8005 corresponds to the scheduled end date and time in the schedule information.

As described above, the user A registers his or her schedule to the schedule management server 8. Referring to FIGS. 16 to 19, processing of registering schedules using the PC 5 is described. In a substantially similar manner, schedules may be registered using any other device such as the electronic whiteboard 2, videoconference terminal 3, or car navigation system 4.

<Processing to Start Event>

Figure 20:
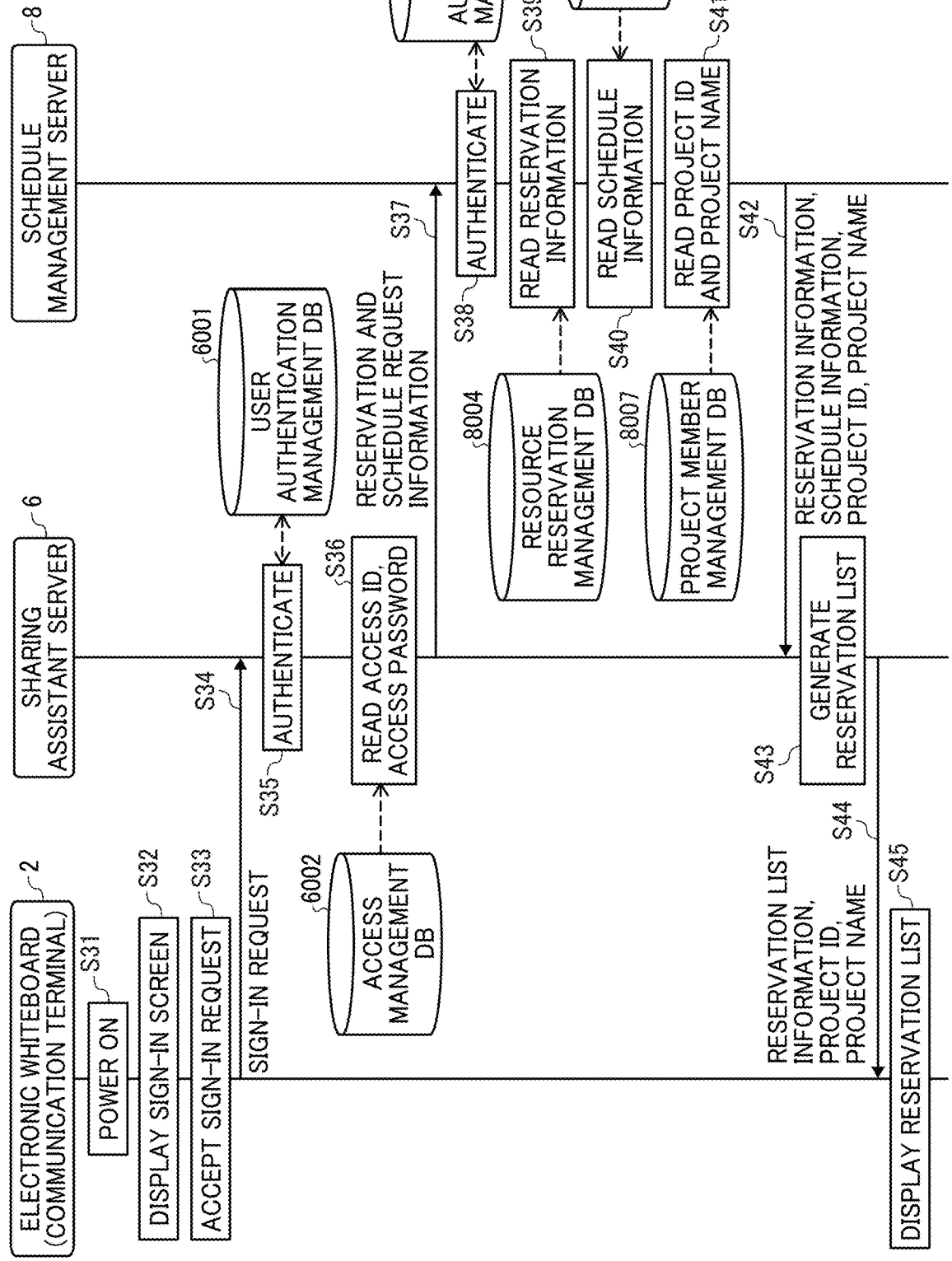
FIG. 20 is a sequence diagram illustrating operation of controlling processing to start an event, according to an embodiment.
Figure 21:
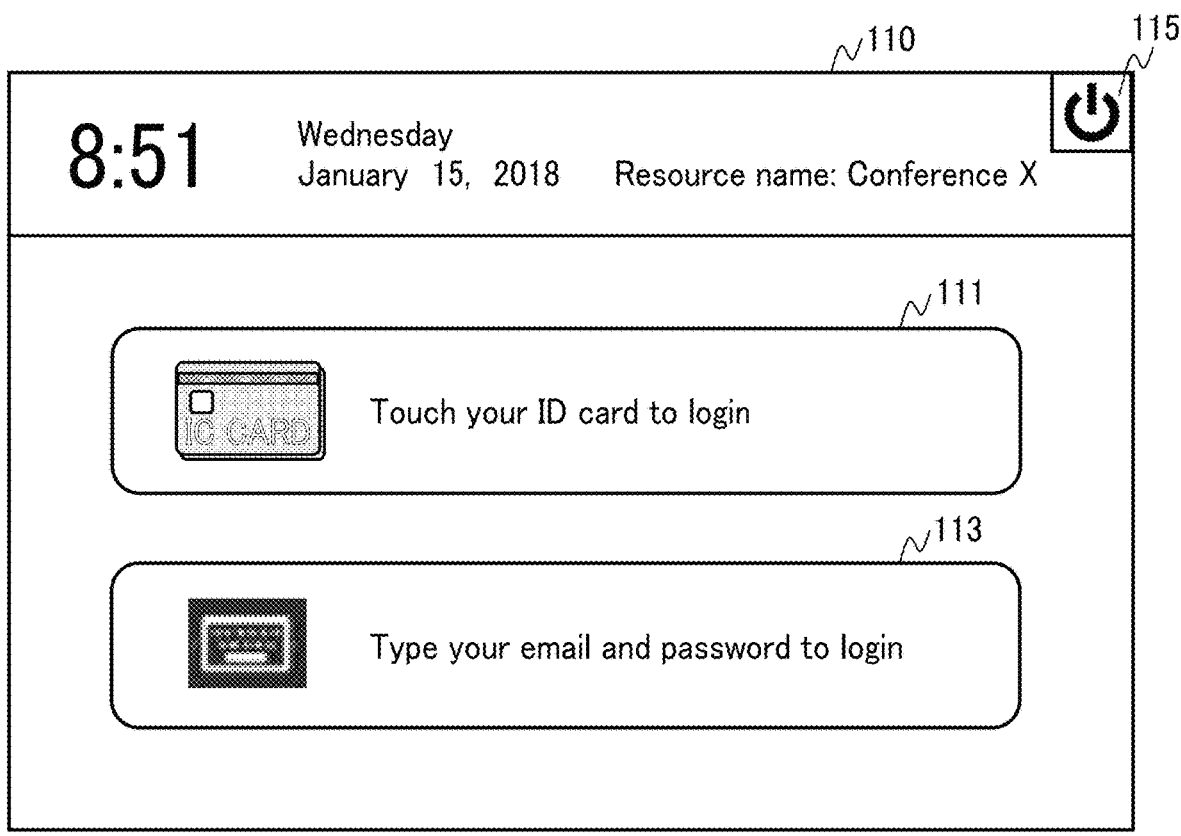
FIG. 21 is an illustration of an example sign-in screen.
Figure 23:
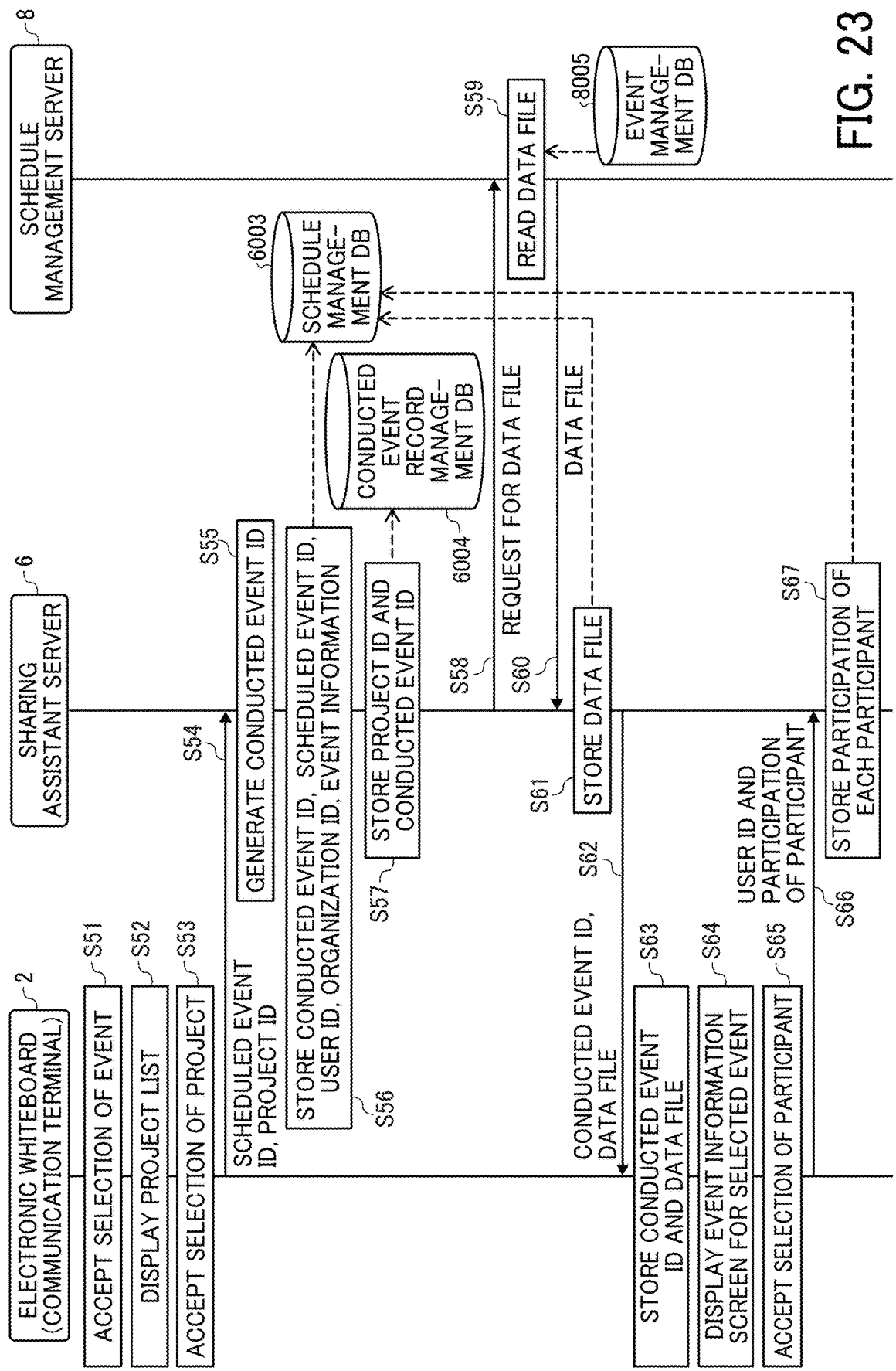
FIG. 23 is a sequence diagram illustrating operation of controlling processing to start an event, according to an embodiment.
Figure 25:
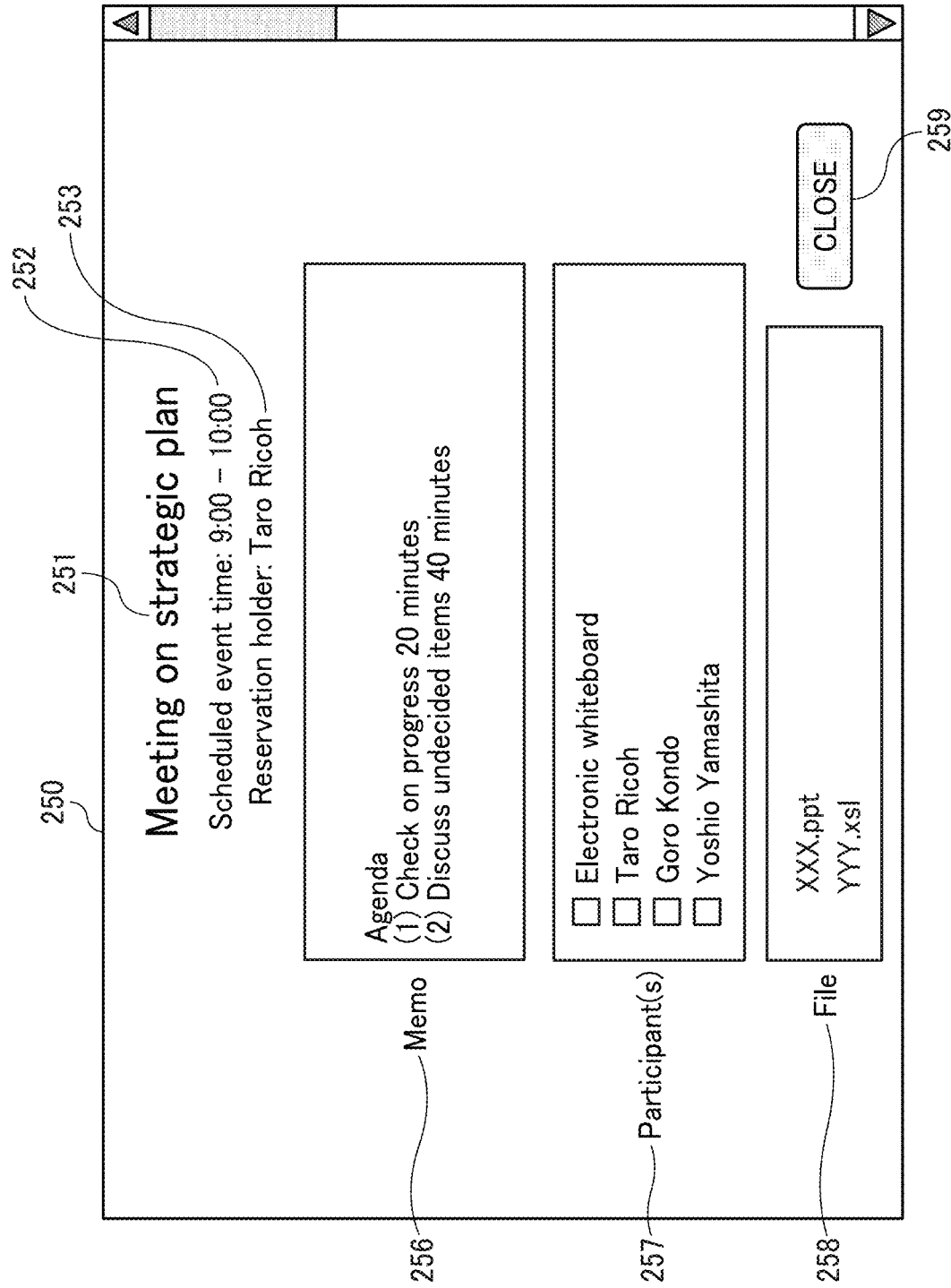
FIG. 25 is an illustration of an example event information screen.
Figure 26:
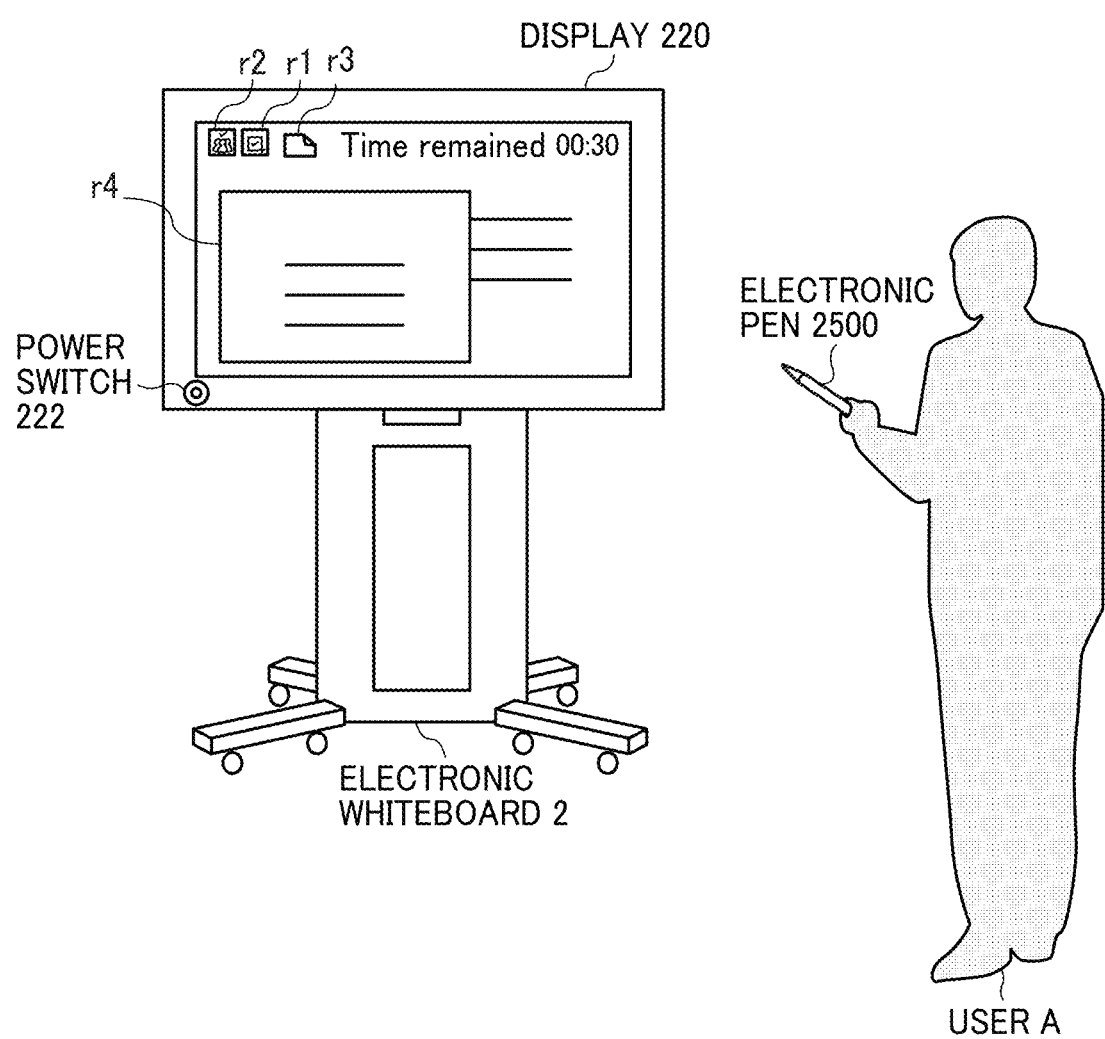
FIG. 26 is an illustration for explaining a use scenario of the electronic whiteboard, according to an embodiment.

Referring to FIGS. 20 to 26, operation of conducting a meeting with meeting participants using the electronic whiteboard 2, in the conference room X that has been reserved by the user A (Taroh Ricoh), is described according to an embodiment. FIGS. 20 and 23 are a sequence diagram illustrating a processing to start an event, such as a meeting, according to the embodiment. FIG. 21 is an illustration of an example sign-in screen, displayed by the electronic whiteboard 2. FIG. 22 is an illustration of an example resource reservation list screen. FIG. 24 is an illustration of an example project list screen. FIG. 25 is an illustration of an example event information screen. FIG. 26 is an illustration for explaining a use scenario of the electronic whiteboard 2 by a user, according to the embodiment.

As the power switch 222 of the electronic whiteboard 2 is turned on by the user, the acceptance unit 22 of the electronic whiteboard 2 accepts a turn-on operation by the user (S31). The acceptance unit 22 then activates the Launcher 102 illustrated in FIG. 6. The display control 24 of the electronic whiteboard 2 displays a sign-in screen 110 on the display 220 as illustrated in FIG. 21 (S32). The sign-in screen 110 includes a selection icon 111, selection icon 113, and power-on icon 115. In this example, the selection icon 111 is pressed by the user A to request for sign-in using the IC card of the user A. The selection icon 113 is pressed by the user A to request for sign-in using an email address (including the user ID and the organization ID) and a password of the user A. The power-on icon 115 is pressed to turn off the electronic whiteboard 2, without performing sign-in operation.

In response to pressing of the selection icon 111 or the selection icon 113, the acceptance unit 22 accepts a request for sign-in (S33). In one example, the user A presses the selection icon 111, and brings his or her IC card into close contact with the short-range communication circuit 219 (such as a card reader). In another example, the user A presses the selection icon 113, and enters the email address and password of the user A. The transmitter and receiver 21 of the electronic whiteboard 2 transmits sign-in request information indicating a sign-in request to the sharing assistant server 6 (S33). The transmitter and receiver 21 of the electronic whiteboard 2 transmits sign-in request information indicating a sign-in request to the sharing assistant server 6 (S33). The sign-in request information includes information on a time zone of a country or a region where the electronic whiteboard 2 is located, and authentication information. The authentication information includes authentication information of the user A received at S33, such as the user ID, organization ID, and password of the user A. The authentication information further includes the user ID and the organization ID of the electronic whiteboard 2, which is one example of the communication terminal that the user uses to conduct the event. The user ID and the organization ID of the electronic whiteboard 2 are previously stored in a memory of the electronic whiteboard 2. Accordingly, the transmitter and receiver 61 of the sharing assistant server 6 receives the sign-in request information. Alternatively, the sign-in screen may not be displayed in response to a request for turning on. In such case, the authentication information includes the user ID and the organization ID of the electronic whiteboard 2. Further, if the organization ID is common to the electronic whiteboard 2 and the user A, the organization ID does not have to be transmitted twice.

Next, the authenticator 62 of the sharing assistant server 6 authenticates the user A using the authentication information received from the user A, such as the user ID, the organization ID, and the password of the user A received at S34 (S35). Specifically, the storing and reading processor 69 determines whether a set of the user ID, the organization ID, and the password, which is obtained from the sign-in request information at S34, has been registered in the user authentication management DB 6001 (FIG. 9A). When there is the set of the user ID, the organization ID, and the password in the user authentication management DB 6001, the authenticator 62 determines that the user A who has sent the sign-in request is an authorized (legitimate) user. When there is no such set of the user ID, the organization ID, and the password in the user authentication management DB 6001, the authenticator 62 determines that the user A is an unauthorized (illegitimate) user. When it is determined that the user A is illegitimate, the transmitter and receiver 61 sends to the electronic whiteboard 2, a notification indicating the illegitimate user. In the following, it is assumed that the user A is determined to be an authorized user.

Next, the storing and reading processor 69 of the sharing assistant server 6 searches the access management DB 6002 (FIG. 9B) using the organization ID of the user A received at S34 as a search key to obtain the access ID and access password that correspond to the received organization ID (S36).

The transmitter and receiver 61 of the sharing assistant server 6 transmits, to the schedule management server 8, reservation request information indicating a request for reservation information of a resource, and schedule request information indicating a request for schedule information of a user (S37). The reservation request information and the schedule request information each include the time zone information, and authentication information (in this case, the user ID of the electronic whiteboard 2 as the communication terminal, and the organization ID) received at S34, and the access ID and the password that are read out at S36. Accordingly, the transmitter and receiver 81 of the schedule management server 8 receives the reservation request information and the schedule request information. As the authentication information, the user ID of the login user may be additionally received, or may alternatively received.

Next, the authenticator 82 of the schedule management server 8 authenticates the sharing assistant server 6 using the access ID and the access password (S38). Specifically, the storing and reading processor 89 searches the server authentication management DB 8006 (FIG. 13A) using a set of the access ID and the password received at S37 as a search key, to determine whether the same set of the access ID and the password have been registered. When there is the set of the access ID and the password in the server authentication management DB 8006, the authenticator 82 determines that the sharing assistant server 6 that has sent the request is an authorized entity. When there is no such set of the access ID and the password in the server authentication management DB 8006, the authenticator 82 determines that the sharing assistant server 6 that has sent the request is an unauthorized (illegitimate) entity. When it is determined that the sharing assistant server 6 is illegitimate, the transmitter and receiver 81 sends to the sharing assistant server 6, a notification indicating the illegitimate entity. In the following, it is assumed that the sharing assistant server 6 is determined to be an authorized entity.

The storing and reading processor 89 searches information stored in the resource reservation management DB 8004 (FIG. 12A) that corresponds to the organization ID (that is, information managed by a scheduler of the organization to which the login user belongs), using the user ID of the electronic whiteboard 2 (communication terminal) received at S37 as a search key, to read reservation information having the user ID of the electronic whiteboard 2 in its record (S39). In this case, the storing and reading processor 89 reads the reservation information whose scheduled start date is today. Accordingly, the reservation information related to the electronic whiteboard 2 in the conference room X is obtained for today. In alternative to using the user ID of the electronic whiteboard 2, the storage and reading processor 89 may search the resource reservation management DB 8004 to obtain reservation information having the user ID of the login user in its record.

Further, the storing and reading processor 89 of the schedule management server 8 searches the event management DB 8005 (FIG. 12B) managed using the scheduler, using the user ID of the electronic whiteboard 2 (communication terminal) received at S37 as a search key, to read schedule information having the user ID of the electronic whiteboard 2 in its record (S40). In this case, the storing and reading processor 89 reads the schedule information whose scheduled start date and time is today. Accordingly, the schedule information related to the electronic whiteboard 2 in the conference room X is obtained for today. In alternative to using the user ID of the electronic whiteboard 2, the storage and reading processor 89 may search the event management DB 8005 to obtain reservation information having the user ID of the login user in its record. When the schedule management server 8 is located in a country or region having a time zone that differs from a time zone applied to the communication terminal such as the electronic whiteboard 2 or the like, the electronic whiteboard 2 adjusts the time zone according to a local time zone applicable to a place where the communication terminal is provided, using the time zone information received at S37. However, if the time zone is the same, time zone information does not have to be used or transmitted.

Next, the storing and reading processor 89 searches the project member management DB 8007 (FIG. 13B) using the user ID of the electronic whiteboard 2 (communication terminal) received at S37, to obtain project IDs and project names of all projects, which are related to the electronic whiteboard 2 (S41)). That is, the project IDs and project names are read, for all projects each having the user ID of the electronic whiteboard 2 on its record. Accordingly, the project information related to the electronic whiteboard 2 in the conference room X is obtained. For example, at the time of project registration, the storing and reading processor 89 of the schedule management server 8 may automatically store, in the project member management table of FIG. 13B, the user ID of the communication terminal that a specific organization manages (in this example, the user ID of the electronic whiteboard 2). Alternatively, the storing and reading processor 89 may obtain project IDs and project names of all projects using the user ID of the login user as a search key, based on assumption that the user ID of the login user is received from the sharing assistant server 6.

The transmitter and receiver 81 transmits, to the sharing assistant server 6, the reservation information obtained at S39, the schedule information obtained at S40, and project IDs and project names of all projects that are obtained at S41 (S42). Accordingly, the transmitter and receiver 61 of the sharing assistant server 6 receives the reservation information, schedule information, and project IDs and project names, all related to the electronic whiteboard 2 (communication terminal).

Next, the generator 63 of the sharing assistant server 6 generates a reservation list based on the reservation information and the schedule information received at S42 (S43). The transmitter and receiver 61 transmits reservation list information indicating the contents of the reservation list, and project IDs and project names of all projects related to the electronic whiteboard 2, to the electronic whiteboard 2 (S44). Accordingly, the transmitter and receiver 21 of the electronic whiteboard 2 receives the reservation list information, and the project IDs and project names.

Next, the display control 24 of the electronic whiteboard 2 controls the display 220 to display a reservation list screen 230 as illustrated in FIG. 22 (S45). The reservation list screen 230 includes a display area 231 for displaying a resource name (in this case, a name of a conference room) and a display area 232 for displaying the current (today's) date and time. The reservation list screen 230 further includes event information 235, 236, 237, etc. each indicating an event in which the target resource (here, in this case, the conference room X) is used. Each item of event information includes a scheduled start time and a scheduled end time for using the target resource, an event name, and a name of a user who has reserved the target resource. Along with the event information 235, 236, and 237, corresponding start buttons 235s, 236s, and 237s are displayed, each of which is pressed by the user when an event is started.

Referring to FIG. 23, when the user A presses the start button 235s with the electronic pen 2500 or the like, the acceptance unit 22 accepts a selection of the event indicated by the event information 235 (S51). Further, the display control 24 of the electronic whiteboard 2 controls the display 220 to display a project list screen 240 as illustrated in FIG. 26, based on the project IDs and project names that are received at S44 (S52). The project list screen 240 includes a plurality of project icons 241 to 246 each representing a particular project indicated by the project ID or project name that is received. The project list screen 240 further includes an "OK" button 248 to be pressed to confirm the selected project icon, and a "CANCEL" button 249 to be pressed to cancel selection of the project icon.

For example, referring to FIG. 24, when the user A presses the project icon 241 with the electronic pen 2500 or the like, the acceptance unit 22 accepts a selection of the project indicated by the project icon 241 (S53). The screen of FIG. 22 and the screen of FIG. 24 may be displayed in various ways, for example, in a predetermined order one by one, or together on the same display screen.

The transmitter and receiver 21 transmits, to the sharing assistant server 6, a scheduled event ID identifying the scheduled event selected at S51, and a project ID identifying the project selected at S53 (S54). Processing of S54 may be referred to as processing to transmit a request for conducted event identification information. Accordingly, the transmitter and receiver 61 of the sharing assistant server 6 receives the scheduled event ID of the selected event, and the project ID of the selected project.

Next, the obtainer 64 of the sharing assistant server 6 generates a conducted event ID, which can uniquely identify the conducted event (S55). Next, the storing and reading processor 69 of the sharing assistant server 6 stores, in the schedule management DB 6003 (FIG. 9C), as a record for the conducted event ID generated at S55 and the scheduled event ID received at S54, the user ID and organization ID of the reservation holder, and other data items related to the event in association (S56). The user ID and organization ID of the reservation holder, and the other data items related to the event, are obtained from the reservation information and/or the schedule information received at S42. At this point, there is no entry in the "participation" field in the schedule management table (FIG. 9C).

Next, the storing and reading processor 69 of the sharing assistant server 6 stores, in the conducted event management DB 6004 (FIG. 10A), the project ID received at S54, and the conducted event ID generated at S55, in association (S57).

The transmitter and receiver 61 of the sharing assistant server 6 transmits, to the schedule management server 8, a request for transmitting a data file that has been registered (S58). The file transmission request includes the scheduled event ID received at S54, the user ID of the electronic whiteboard 2 (the communication terminal) and the organization ID received at S34 (example of authentication information), and the access ID and access password read at S36. Accordingly, the transmitter and receiver 81 of the schedule management server 8 receives the file transmission request.

Next, the storing and reading processor 89 of the schedule management server 8 searches the event management DB 8005 (FIG. 12B), using the scheduled event ID received at S58 as a search key, to obtain a data file associated with the scheduled event ID (S59). The transmitter and receiver 81 transmits the data file read at S59 to the sharing assistant server 6 (S60). The sharing assistant server 6 receives the data file at the transmitter and receiver 61.

Next, the storing and reading processor 69 of the sharing assistant server 6 stores, in the schedule management DB 6003 (FIG. 9C), information on the data file received at S54, in association with the scheduled event ID received at S60 and the conducted event ID generated at S55 (S61).

The transmitter and receiver 61 transmits the conducted event ID generated at S55 and the data file received at S60, to the electronic whiteboard 2 (S62). Accordingly, the transmitter and receiver 21 of the electronic whiteboard 2 receives the conducted event ID and the data file.

Next, at the electronic whiteboard 2, the storing and reading processor 29 stores the conducted event ID and the data file in the memory 2000 (S63). The data file transmitted from the sharing assistant server 6 is stored in a specific storage area of the memory 2000. The display control 24 of the electronic whiteboard 2 accesses the specific storage area to read the data file, and controls the display 220 to display an image based on the data file, during the event identified using the conducted event ID. In this disclosure, the specific storage area is a storage area provided for each event being conducted, to store data being used during the event at least temporarily. The specific storage area may be described using an arbitrary path (characters) indicating a location in the memory 2000. Further, the conducted event ID may be associated with information indicating the specific storage area. The specific storage area is not limited to an internal memory of the electronic whiteboard 2. Preferably, the storage area is on an on-premise environment. For example, the specific storage area may be any area in an external memory connectable with the electronic whiteboard 2 or in a memory provided in a local server communicable with the electronic whiteboard 2.

The display control 24 of the electronic whiteboard 2 controls the display 220 to display an event information screen 250 for the selected event as illustrated in FIG. 25 (S64). The event information screen 250 includes a display area 251 for an event name, a display area 252 for a scheduled event time (scheduled start time and scheduled event time), and a display area 253 for a reservation holder name. The event information screen 250 further includes a display area 256 for memo, a display area 257 for names of registered participants, and a display area 258 for displaying identification information (such as a file name) of a data file stored in the specific storage area in the memory 2000. The display area 257 displays the name of the reservation holder, and the name of each participant, which are entered through the screen of FIG. 19. The display area 257 further displays a check box to be selected to indicate participation of each participant in the event (meeting). The display area 258 further displays a name of data file stored in a specific storage area of the memory 2000. Specifically, the display area 258 displays a file name of a data file that has been downloaded from the sharing assistant server 6 or being downloaded from the sharing assistant server 6. The event information screen 250 further includes a "CLOSE" button 259 to be pressed to close the screen 250, at its lower right. While the name of the electronic whiteboard 2 and corresponding checkbox is displayed in FIG. 25, the name or the checkbox does not have to be displayed on the screen.

After each participant is checked for presence (participation) using the checkbox, and the "CLOSE" button 259 is selected by the user, the acceptance unit 22 accepts a selection of each participant (S65). The transmitter and receiver 21 of the electronic whiteboard 2 transmits, to the sharing assistant server 6, the user ID of each participant and participation (presence) of each participant (S66). Accordingly, the transmitter and receiver 61 of the sharing assistant server 6 receives the user ID and participation of each participant.

At the sharing assistant server 6, the storing and reading processor 69 enters information on participation, in the "participation" field in the schedule management table (FIG. 9C) in the schedule management DB 6003 (S67).

As described above, the user A starts an event (a meeting on a strategy) using the resource (the conference room X) and the communication terminal (the electronic whiteboard 2 located in the conference room X). Specifically, as illustrated in FIG. 26, the user A uses the electronic whiteboard 2 to carry out a meeting in the conference room X. The display control 24 displays, on the display 220, a on-going event screen R as illustrated in FIG. 26. The display control 24 further displays, at an upper right portion of the on-going event screen R, the remaining time during which the resource (in this example, the conference room X) can be used. In this embodiment, the display control 24 calculates a time period between the current time and the scheduled end time indicated by the event information of the event selected at S51, and displays the calculated time period as the remaining time.

The display control 24 further displays, on the display 220, an icon r1 to be pressed to register an action item, an icon r2 to be pressed to view an event record, and an icon r3 to be pressed to view a data file (meeting materials) stored in a specific storage area of the memory 2000. The display control 24 further displays, in the on-going event screen R, an image r4 based on the data file of meeting materials. The icon r3 is an example of a selectable image, which is selected to display an image based on the data file stored in the specific storage area. For example, when the user of the electronic whiteboard 2 presses the icon r3, the acceptance unit 22 receives a selection of the icon r3. The display control 24 then controls the display 220 to display an image r4 based on the data file of meeting materials, which is stored in the specific storage area of the memory 2000. The display control 24 of the electronic whiteboard 2 not only stores a data file received at S62, but also a data file stored in the memory 2000 or a data file newly generated during the event being held, for display. In such case, the storing and reading processor 29 of the electronic whiteboard 2 stores the data file generated or modified during the event being conducted, in the specific storage area in the memory 2000.

<Registration of Event Record>

Figure 27:
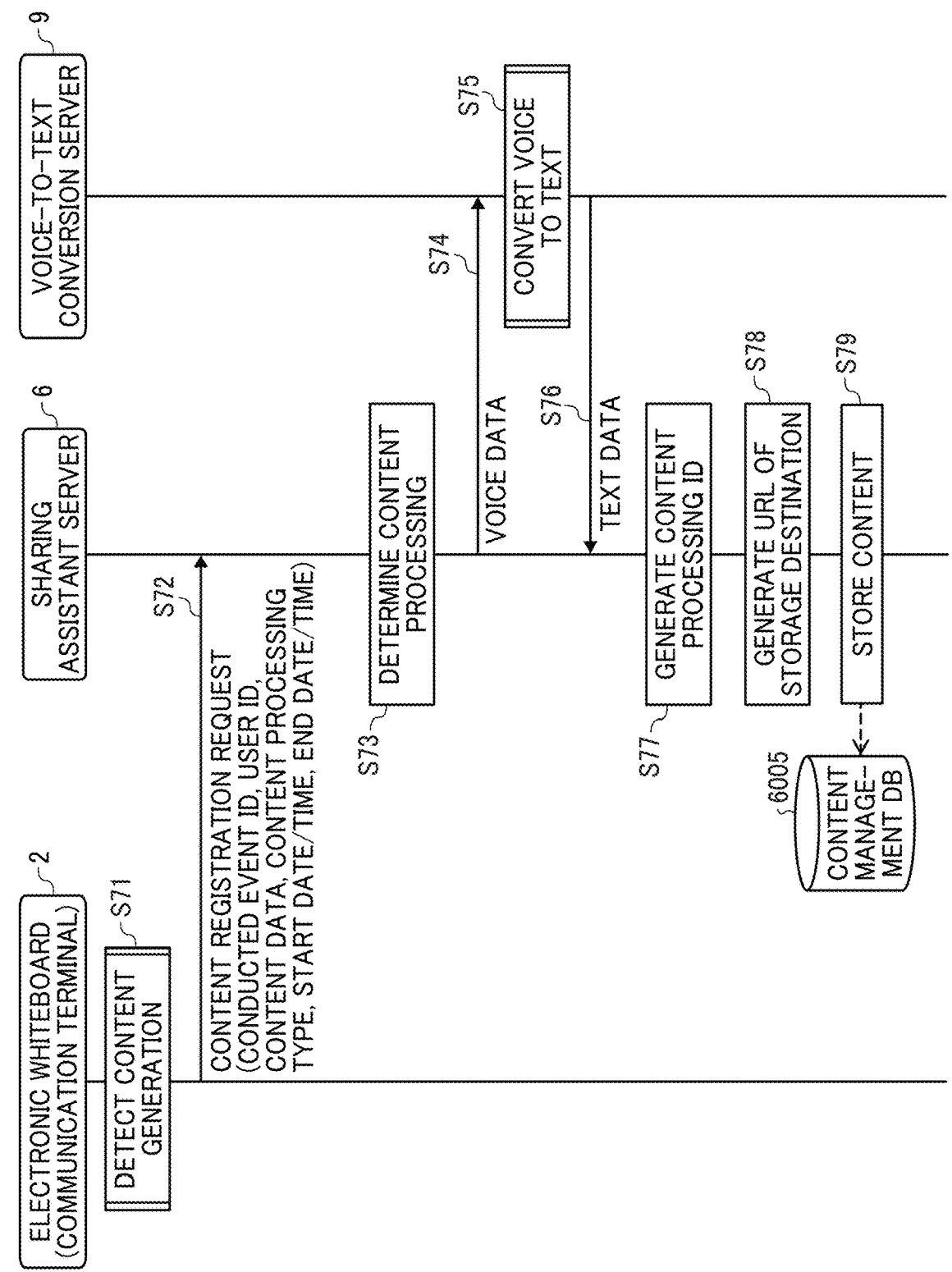
FIG. 27 is a sequence diagram illustrating operation of registering a record of the event that has been started, according to an embodiment.
Figure 28A:
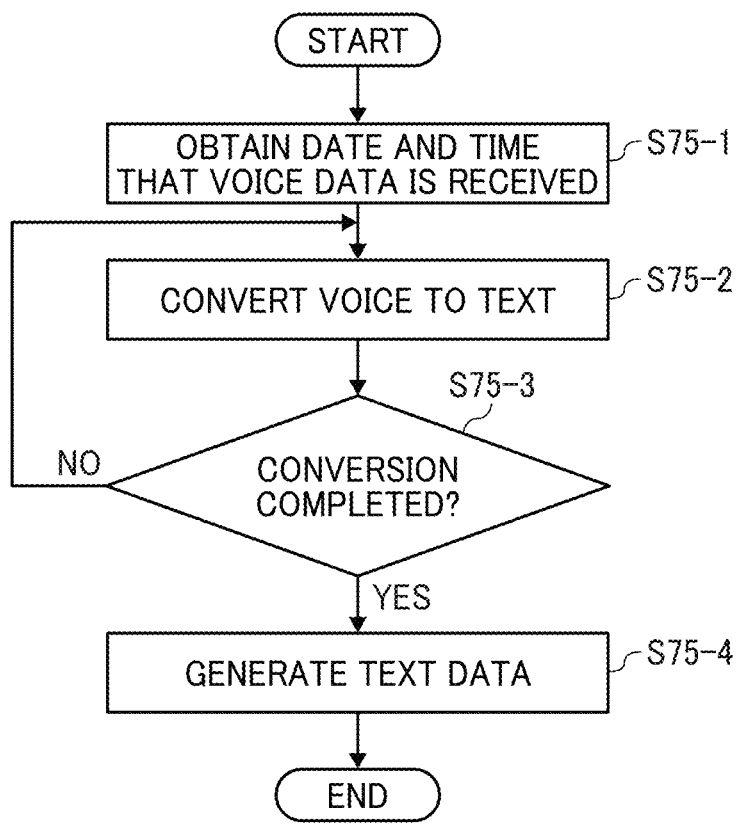
FIG. 28A is a flowchart illustrating operation of converting voice data to text data, according to an embodiment.
Figure 28B:
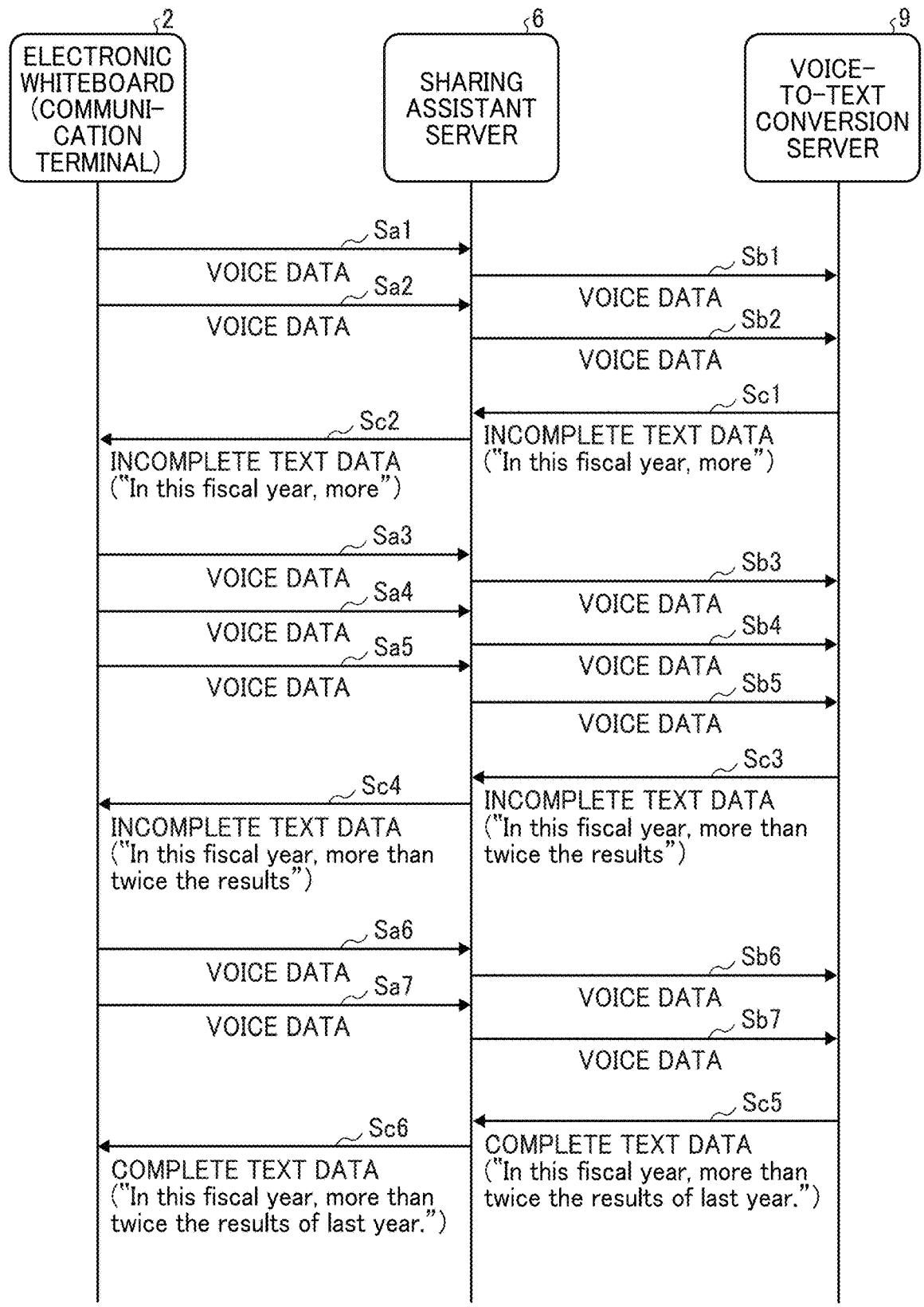
FIG. 28B is a sequence diagram illustrating operation of converting voice data to text data, according to an embodiment.
Figure 29:
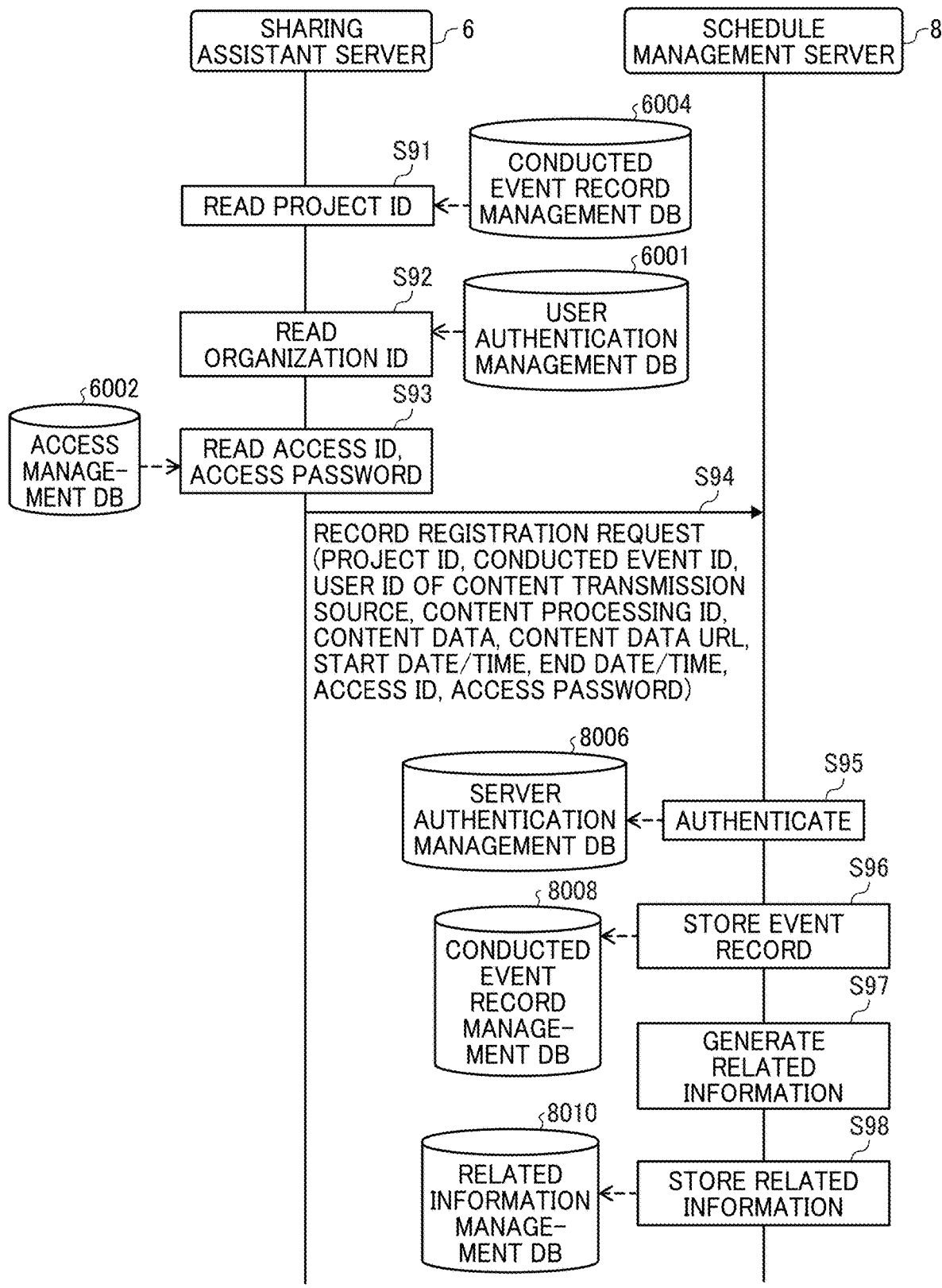
FIG. 29 is a sequence diagram illustrating operation of registering a record of the event that has been started, according to an embodiment.

Referring now to FIGS. 27 to 33, processing to register an event record is described according to an embodiment. FIGS. 27 and 29 are a sequence diagram illustrating operation of registering a record of the event that has been started, according to an embodiment. FIG. 28A is a flowchart illustrating operation of converting voice data to text data, according to an embodiment.

The determiner 25 detects content generation. Specifically, the determiner 25 of the electronic whiteboard 2 determines a type of content processing being performed during the event that has been started (S71). For example, when the content is voice data generated through recording by the image and audio processor 23, the determiner 25 determines a type of content processing as "recording". In another example, when the content is image data obtained through screenshot (capturing) by the image and audio processor 23, the determiner 25 determines that a type of content processing is "screenshot". In another example, when the content is a data file (such as data of meeting materials), which is transmitted by the transmitter and receiver 21, the determiner 25 determines a type of content processing is "file transmission".

Next, the transmitter and receiver 21 transmits content registration request information indicating a request for registering the content being generated, to the sharing assistant server 6 (S72). In this example, the transmitter and receiver 21 automatically transmits the content registration request information, every time generation of the content is detected. Alternatively, the transmitter and receiver 21 may transmit the content registration request information, for more than one content that is detected. The content registration request information includes the conducted event ID, the user ID of a transmission source of the content (in this example, the user ID of the electronic whiteboard 2 as the communication terminal), content data, and content processing type (recording, screenshot, file transmission). With the content registration request information, information on the start date/time and end date/time of content processing may be transmitted. Accordingly, the transmitter and receiver 61 of the sharing assistant server 6 receives the content registration request information.

The determiner 65 of the sharing assistant server 6 determines a type of content processing, based on the content processing type in the content registration request information that is received at the transmitter and receiver 61 (S73). In one example, when the content processing type is determined to be "recording", the transmitter and receiver 61 of the sharing assistant server 6 transmits the voice data, which is received as content data, to the voice-to-text conversion server 9 (S74). Accordingly, the transmitter and receiver 91 of the conversion server 9 receives the voice data. When the content type processing is other than "recording", the operation proceeds to S77 without performing S74 to S76.

The converter 93 of the conversion server 9 converts the voice data received, to text data (S75). Referring to FIG. 28A, processing of voice-to-text conversion, performed by the voice-to-text conversion server 9, is described according to an embodiment. The converter 93 obtains information indicating date and time when the voice data is received at the transmitter and receiver 91 (S75-1). The information obtained at S75-1 may indicate the date and time when the sharing assistant server 6 receives the voice data (S72), or the date and time when the sharing assistant server 6 sends the voice data (S74). The transmitter and receiver 91 of the conversion server 9 receives the voice data and information on the date and time that the voice data is received, from the sharing assistant server 6.

Next, the converter 93 converts the voice data, received at the transmitter and receiver 91, to text data (S75-2). When it is determined that conversion is completed ("YES" at S75-3), the operation proceeds to S75-4. When it is determined that conversion is not completed ("NO" at S75-3), the operation repeats S75-2. At S75-3, the converter 93 determines that voice-to-text conversion is completed, when a predetermined size of voice data received at the transmitter and receiver 91 has been converted to text data. For example, when voice data for one sentence has been converted to text data, the converter 93 determines that voice-to-text conversion is completed. The converter 93 generates text data, as a result of voice-to-text conversion (S75-4). As described above, the voice-to-text conversion server 9 converts the voice data transmitted from the sharing assistant server 6 into text data. The voice-to-text conversion server 9 repeatedly performs operation of FIG. 28A, every time the voice data is transmitted from the sharing assistant server 6.

Referring now to FIG. 28B, voice-to-text conversion processing described above referring to S74 to S76 of FIG. 27 and FIG. 28A is described in detail. FIG. 28B is a sequence diagram illustrating operation of converting voice data to text data, according to the embodiment.

As described referring to S72 of FIG. 27, the transmitter and receiver 21 of the electronic whiteboard 2 transmits voice data, generated during the event, to the sharing assistant server 6, sequentially as the voice data is generated (Sa1, Sa2). The transmitter and receiver 61 of the sharing assistant server 6 receives the voice data, sequentially transmitted from the electronic whiteboard 2. The transmitter and receiver 61 of the sharing assistant server 6 sequentially transmits the voice data to the conversion server 9 (Sb1, Sb2). The transmitter and receiver 91 of the conversion server 9 receives the voice data, sequentially from the sharing assistant server 6.

The voice data transmitted from the electronic whiteboard 2 to the sharing assistant server 6 at Sa1, is transmitted at Sb1 from the sharing assistant server 6 to the conversion server 9. The voice data transmitted from the electronic whiteboard 2 to the sharing assistant server 6 at Sa2, is transmitted at Sb2 from the sharing assistant server 6 to the conversion server 9. As described above, the voice data, which is collected and processed at the image and audio processor 23 of the electronic whiteboard 2, is sequentially transmitted to the conversion server 9.

The converter 93 of the conversion server 9 converts the voice data received at the transmitter and receiver 91, to text data. The transmitter and receiver 91 of the conversion server 9 transmits the text data converted by the converter 93, to the sharing assistant server 6 (Sc1). In this case, the text data transmitted at Sc1 is text data converted from the voice data received at Sb1 and Sb2.

The text data transmitted from the conversion server 9 to the sharing assistant server 6 at Sc1 is incomplete text data. The converter 93 of the conversion server 9 determines that text data is complete, when a size of data applied with voice-to-text conversion has reached a certain level that is pre-set. For example, when voice-to-text conversion has been performed for data of one sentence, the converter 93 determines that voice-to-text conversion completes such that converted text data is complete to represent one complete sentence. Since the text data "In this fiscal year, more" is a part of one sentence, the converter 93 associates an incomplete flag indicating that text data is incomplete with that text data. The transmitter and receiver 91 transmits the converted text data with the incomplete flag at Sc1.

The transmitter and receiver 61 of the sharing assistant server 6 transmits the text data (incomplete text data), received from the conversion server 9, to the electronic whiteboard 2 (Sc2). The transmitter and receiver 21 of the electronic whiteboard 2 receives the text data (incomplete text data), transmitted from the sharing assistant server 6. The display control 24 of the electronic whiteboard 2 controls the display 508 to display the text data received at the transmitter and receiver 21. Specifically, using the received text data, the electronic whiteboard 2 displays captions corresponding to voice data generated during the event, on the on-going event screen R illustrated in FIG. 26. The electronic whiteboard 2 receives the text data, even it is incomplete, for display to the user. The user at the electronic whiteboard 2 is able to see the caption, that is, the text data converted from the collected voice data, as voice-to-text conversion is being performed at the conversion server 9.

The sharing system 1 performs processing Sa3 to Sa1, Sb3 to Sb7, and Sc3 to Sc4, in a substantially similar manner as described above referring to Sa1 to Sa2, Sb1 to Sb2, and Sc1 to Sc2, to perform voice-to-text conversion of voice data collected and processed at the image and audio processor 23 of the electronic whiteboard 2. A number (frequency) of transmissions of incomplete text data per unit time, by the conversion server 9, may be changed as desired.

At the conversion server 9, when the converter 93 has completed voice-to-text conversion for one sentence of voice data, to generate the text data for one sentence, the transmitter and receiver 91 transmits the complete text data of one sentence to the sharing assistant server 6 (Sc5). In this case, the converter 93 associates a complete flag indicating that text data is complete, with that text data "In this fiscal year, more than twice the results of last year". The transmitter and receiver 91 transmits the converted text data with the complete flag. The transmitter and receiver 61 of the sharing assistant server 6 receives the text data (complete text data), transmitted from the conversion server 9.

As described below referring to S79 of FIG. 27, the storing and reading processor 69 stores the text data received at Sc5 in the content management DB 6005. The date and time of content processing for text data received at Sc5, is determined based on the date and time when transmission of voice data from the sharing assistant server 6 starts at Sb1, and the date and time when reception of text data from the conversion server 9 ends at Sc5, for one sentence. Specifically, the start date and time of content processing to be stored in the content management DB 6005 is the date and time when transmission of voice data from the sharing assistant server 6 starts at Sb1 for one sentence. The end date and time of content processing to be stored in the content management DB 6005 is the date and time when reception of text data at the sharing assistant server 6 ends at Sc5 for that sentence. As described above, the sharing assistant server 6 transmits text data (complete text data), received from the conversion server 9, to the electronic whiteboard 2 for display. Additionally, the sharing assistant server 6 manages the date and time when transmission of voice data to the conversion server 9 starts, as start date and time of content processing. Similarly, the sharing assistant server 6 manages the date and time when complete text data converted from that voice data is received, as end date and time of content processing.

The transmitter and receiver 61 of the sharing assistant server 6 transmits the text data (complete text data), received from the conversion server 9, to the electronic whiteboard 2 (Sc6). The transmitter and receiver 21 of the electronic whiteboard 2 receives the text data (complete text data), transmitted from the sharing assistant server 6. The display control 24 of the electronic whiteboard 2 controls the display 220 to display the text data received from the sharing assistant server 6.

As described above, in the sharing system 1, the conversion server 9 converts voice data generated during the event to text data. Information related to time when such text data is generated (start date and time of content processing, and end date and time of content processing), is stored in each of the sharing assistant server 6 and the schedule management server 8.

Referring back to FIG. 27, description of registration of the event record continues. The transmitter and receiver 91 transmits the text data converted by the converter 93, to the sharing assistant server 6 (S76). With the text data, the transmitter and receiver 91 transmits the information indicating the date and time that the voice data is received, which is obtained at S75-1, to the sharing assistant server 6. The sharing assistant server 6 receives the text data at the transmitter and receiver 61, with information regarding the time.

The obtainer 64 generates a content processing ID for identifying the content processing, which is detected during the event (S77). The obtainer 64 further obtains a URL of content data being generated (S78). The storing and reading processor 69 stores, in the content management DB 6005 (FIG. 10B), the content processing type, the start date and time of content processing, the end date and time of content processing, the content processing ID obtained at S77, and the URL of the content data obtained at S78, for the conducted event ID that is received at S72 (S79).

In this embodiment, the start date and time and the end date and time of the content processing may be determined based on information regarding the time, which is received with the text data at S76. In one example, when a type of content processing is "voice-to-text conversion", start and date time and end date and time of content processing correspond to date and time when voice data is converted to text data. As illustrated in FIG. 28B, in one example, the date and time when voice data is converted to text data, corresponds to date and time when voice data is transmitted at the transmitter and receiver 61 of the sharing assistant server 6, and date and time when text data is received at the transmitter and receiver 61 of the sharing assistant server 6. In another example, the date and time when voice data is converted to text data, may be based on date and time when voice data is received at the transmitter and receiver 91 of the conversion server 9, and date and time when text data is transmitted at the transmitter and receiver 91 of the conversion server 9. That is, when a type of content processing is "voice-to-text conversion", start date and time of content processing, and end date and time of content processing may be set equal to start date and time of voice-to-text conversion.

When a type of content processing is "recording", "screenshot", or "file transmission", start date and time of content processing, and end date and time of content processing, may be set based on date and time when the transmitter and receiver 61 of the sharing assistant server 6 receives content data (voice data, image data, or data file), at S72. Alternatively, when a type of content processing is "recording", "screenshot", or "file transmission", start date and time of content processing, and end date and time of content processing, may be set based on date and time when the transmitter and receiver 21 of the electronic whiteboard 2 transmits content transmitter and receiver 21 (voice data, image data, or data file), at S72. In another example, when a type of content processing is "recording", start date and time of content processing, and end date and time of content processing, may be set based on date and time when the image and audio processor 23 starts recording voice and ends recording voice. In another example, when a type of content processing is "screenshot", start date and time of content processing, and end date and time of content processing, may be set based on date and time when the image and audio processor 23 starts capturing a screenshot image and ends capturing the screenshot image.

The operation now proceeds to S91 of FIG. 29. The storing and reading processor 69 of the sharing assistant server 6 searches the conducted event management DB 6004 (FIG. 10A) using the conducted event ID received at S72 as a search key, to obtain corresponding project ID (S91). The storing and reading processor 69 searches the user authentication management DB 6001 (FIG. 9A) using the user ID of the content transmission source as a search key, to obtain the corresponding organization ID (S92).

The storing and reading processor 69 searches the access management DB 6002 (FIG. 9B) using the organization ID read at S92 as a search key to obtain the access ID and access password that correspond to the organization ID obtained at S92 (S93).

Next, the transmitter and receiver 61 transmits record registration request information indicating a request for registering an event record, to the schedule management server 8 (S94). The record registration request includes the project ID read at S91, the conducted event ID, the user ID of the content transmission source, the content data, the start date and time of content processing, and the end date and time of content processing (received at S72), the content processing ID obtained at S77, the URL of data file obtained at S78, and the access ID and password read at S93. The transmitter and receiver 81 of the schedule management server 8 receives the record registration request.

Next, the authenticator 82 of the schedule management server 8 authenticates the sharing assistant server 6 using the access ID and the access password (S95). Since processing of S95 is substantially the same as described above referring to S38, description thereof is omitted. The following describes the case where the authentication result indicates that authentication is successful.

The storing and reading processor 89 stores various types of data or information, received at S94, in the event record management DB 8008 (FIG. 14A) (S96). Specifically, the storing and reading processor 89 stores, in the event record management DB 8008 (FIG. 14A), various data (or information) including information on the data file, in association with a set of the project ID and the conducted event ID received at S94. Accordingly, the schedule management server 8 is able to manage information regarding the content, in a substantially similar manner as the sharing assistant server 6 manages the content, using the project ID and the conducted event ID.

The generator 83 of the schedule management server 8 generates related information, in which the content data received at S94 is organized by the content generation time (S97). The content generation time is generated by the generator 83, based on the event start date and time stored in the event management DB 8005, the start date and time, and end date and time of the content processing each stored in the event record management DB 8008. The content generation time is represented by an elapsed time counted from the event start date and time, until the time when content is generated during the event. The storing and reading processor 89 of the schedule management server 8 stores the related information generated at the generator 83, in association with the project ID and the conducted event ID that are received at S94, in the related information management DB 8010 (FIG. 15) (S98). Accordingly, the schedule management server 8 is able to manage various types of content data according to the content generation time, by content processing type.

Referring now to FIG. 28C, a data format of text data to be stored in the sharing assistant server 6 and the schedule management server 8 is described. FIG. 28C is an illustration of an example data file including text data converted from voice data. The data file d1 illustrated in FIG. 28C is stored at a location indicated by an URL of content, which can be managed as the URL is stored in each of the content management DB 6005 and the conducted event record management DB 8008.

As illustrated in FIG. 28C, the data file d1 includes 10 items of text data (transcript). The text data (0 to 9) each includes a sequence number (seq_num) representing an order of content processing having been executed, text data (text), start date and time of content processing (start time), end date and time of content processing (end time), and content processing ID (id). The information contained in the text data (0 to 9) correspond to items of data to be managed using the content management DB 6005 and the event record management DB 8006. The number of items of text data to be included in the data file d1 is not limited to 10.

The sharing assistant server 6 and the schedule management server 8 each associates text data, and time information relating to processing of such text data (that is, start date and time and end date and time of content processing), in the form of the data file d1 as illustrated in FIG. 28C. For example, information such as the content processing ID may be associated with the text data as attribute data.

As described above, the electronic whiteboard 2 transmits the conducted event ID of an event related to a particular project, and any content that is generated during the event, to the schedule management server 8. The schedule management server 8 stores, for each conducted event ID associated with the project ID, information on the content in the event record management DB 8008. That is, with information indicating association between the event that has been started and the project, content data generated during the event can be stored for each project.

(Registration of Action Item)

Figure 30:
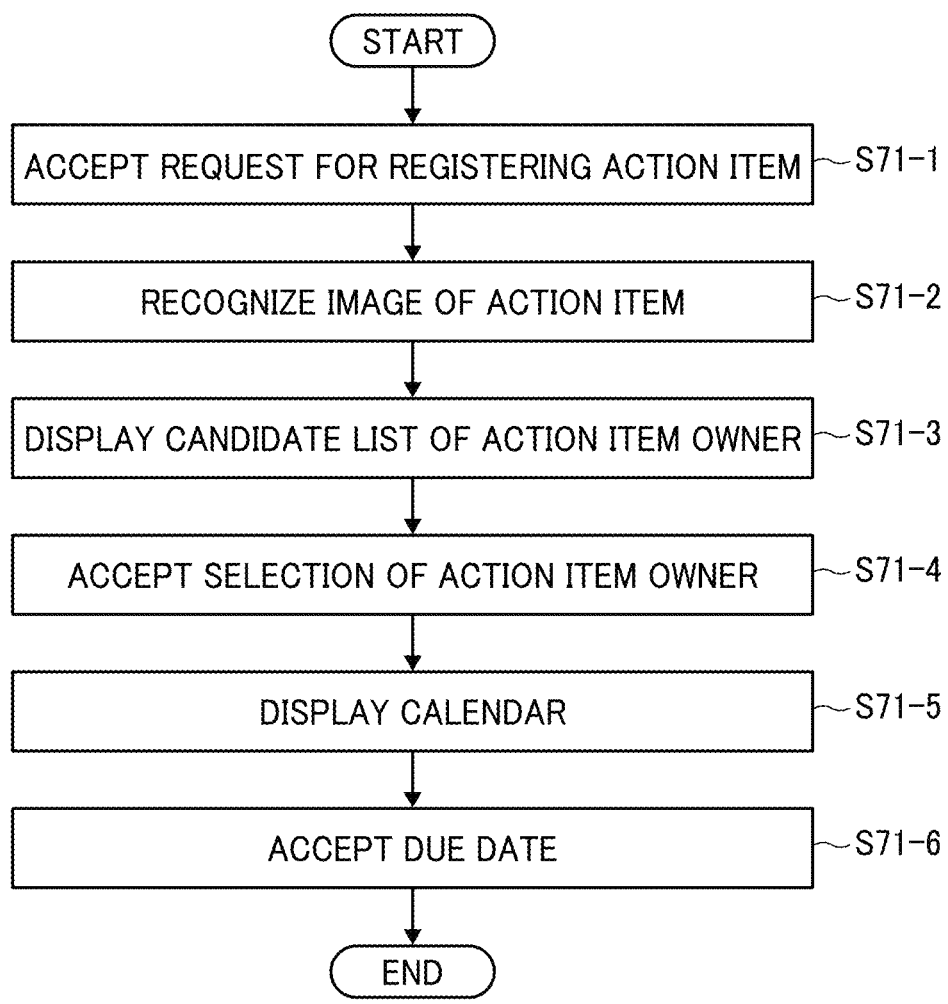
FIG. 30 is a flowchart illustrating operation of registering an action item, according to an embodiment.
Figure 31:
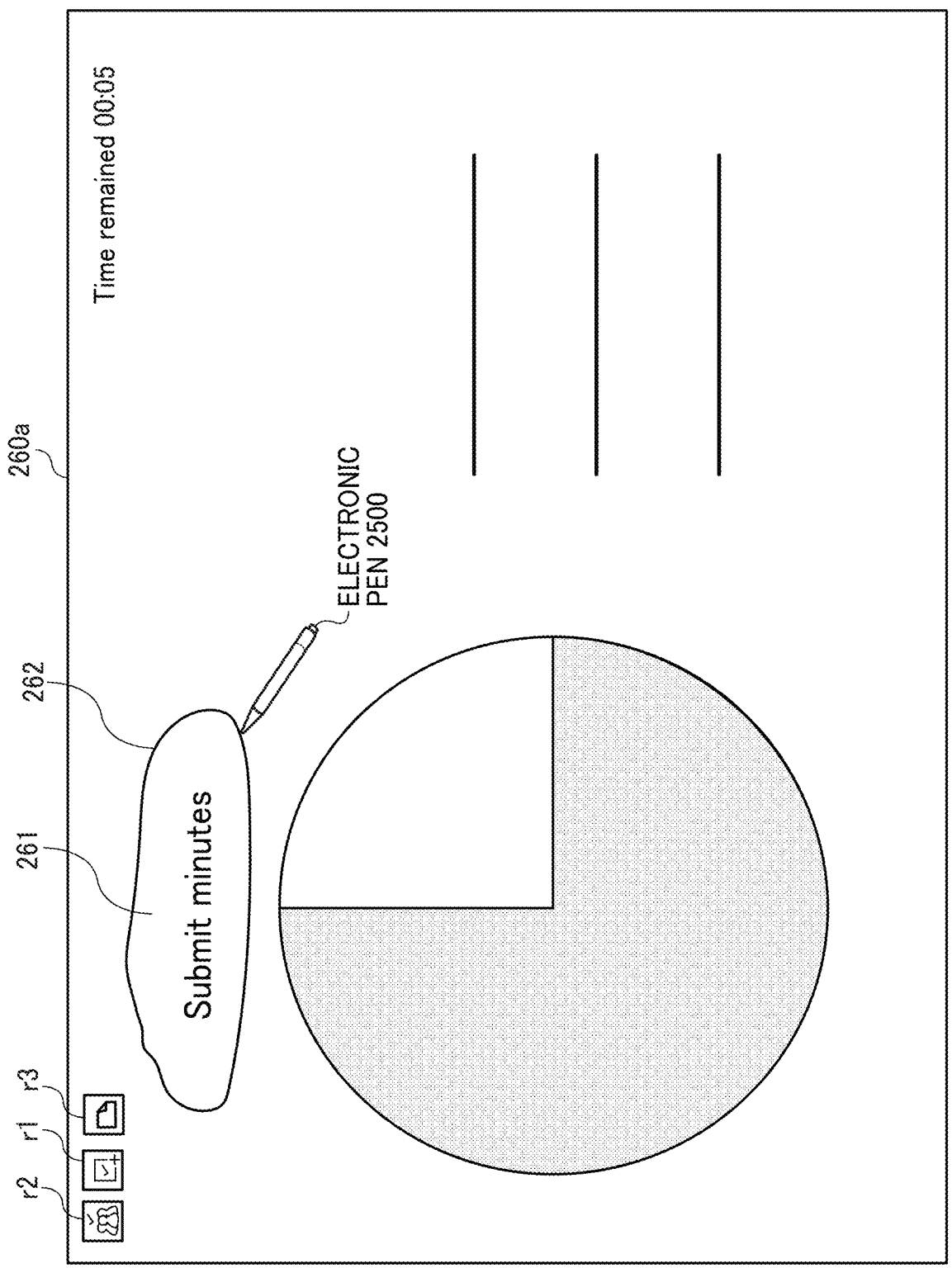
FIG. 31 is an illustration of an example screen in which an action item is designated.
Figure 32:
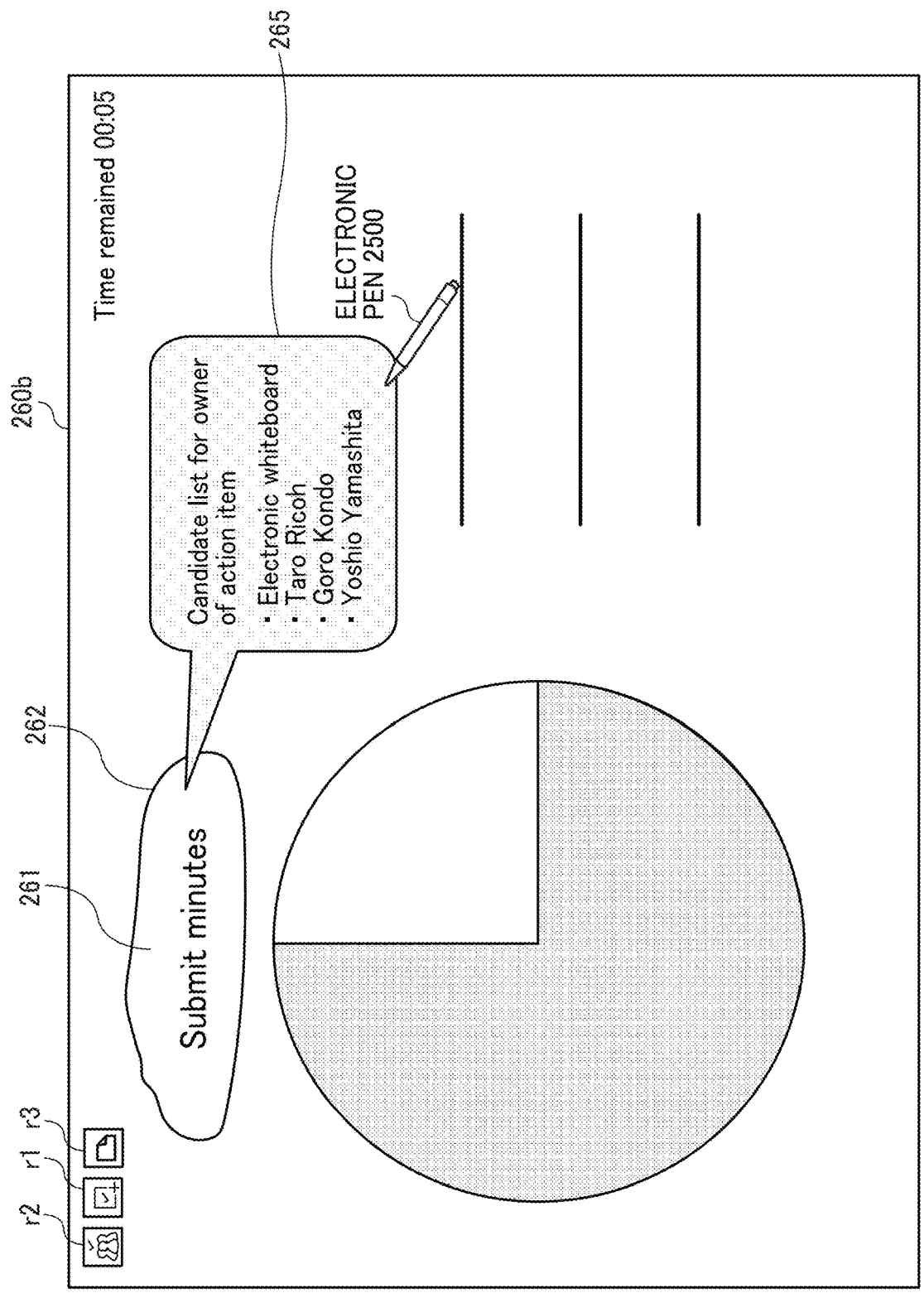
FIG. 32 is an illustration of an example screen with a list of candidates of owner of the action item.
Figure 33:
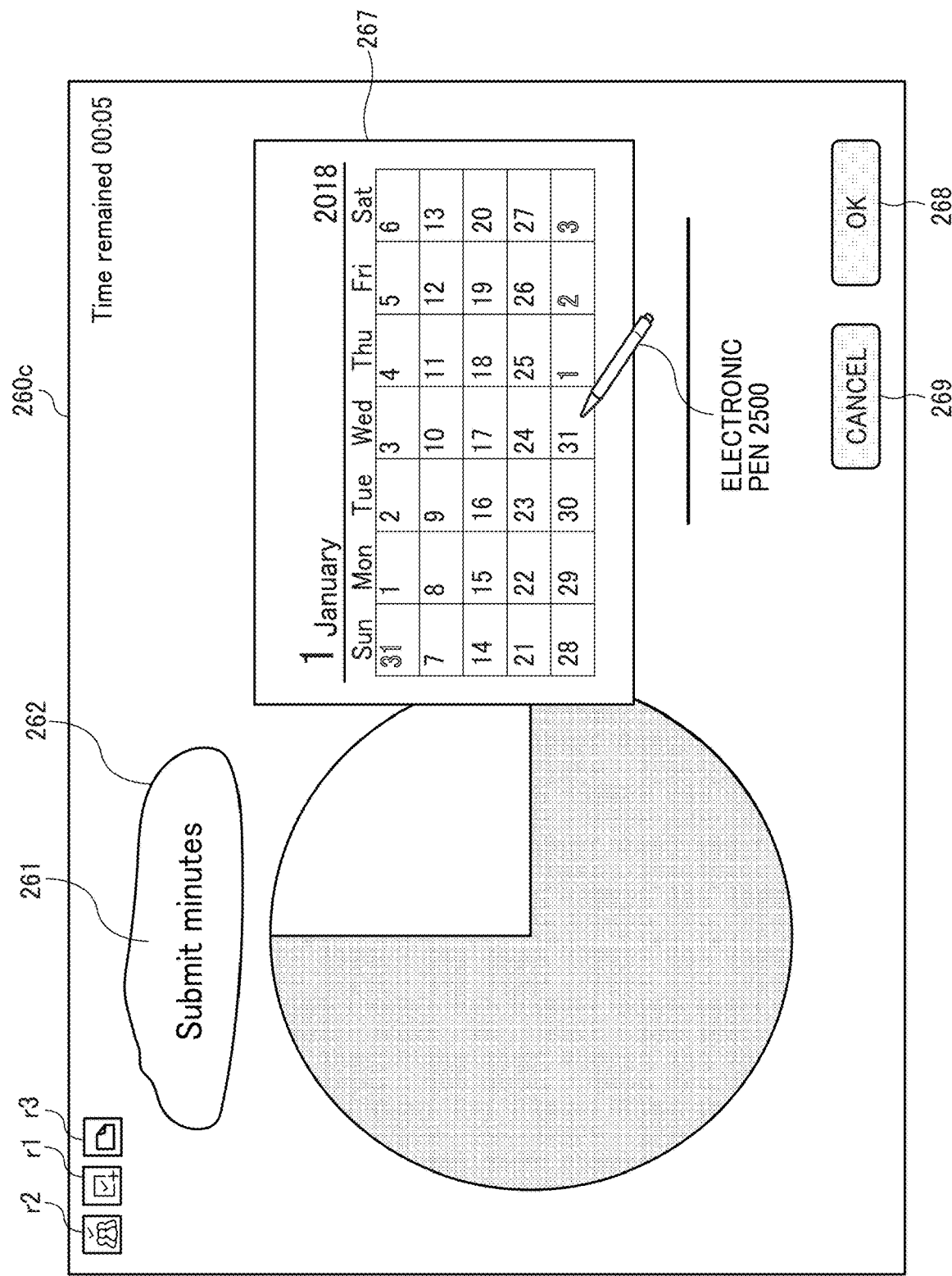
FIG. 33 is an illustration of an example screen with a calendar for selecting the due date of the action item.

Referring now to FIGS. 30 to 33, operation of processing an action item, as an example of content, is described according to an embodiment. FIG. 30 is a flowchart illustrating operation of registering an action item, according to an embodiment. FIG. 31 is an illustration of an example screen in which an action item is designated. FIG. 32 is an illustration of an example screen with a list of candidates of owner of the action item. FIG. 33 is an illustration of an example screen with a calendar for selecting the due date of the action item.

Referring to FIG. 30, as the user presses the icon r1 illustrated in FIG. 26, the acceptance unit 22 receives a request for registering an action item (S71-1). As illustrated in FIG. 31, it is assumed that the user writes an action item ("Submit minutes") on a drawing screen 260a of the electronic whiteboard 2 using the electronic pen 2500, and circles the drawing image 261. In such case, the electronic whiteboard 2 recognizes the circled area as a designated area 262, which includes a drawing image 261. The acceptance unit 22 accepts input of the designated area 262 including the drawing image 261. The identifying unit 26 identifies the drawing image 261, included in the designated area 262, as an image of the action item (S71-2). FIG. 31 describes the example case in which the identifying unit 26 identifies the drawing image 261, which is circled by the line of the designated area 262. Alternatively, the identifying unit 26 may identify the drawing image 261, which is determined by a line that is apart from the designated area 262 at a predetermined distance. As described above, the designated area 262 may be determined based on the user's drawing of a certain figure, such as a circle or a polygon, with the electronic pen 2500.

Next, as illustrated in FIG. 32, the display control 24 displays a candidate list 265, which lists candidates of an owner of the action item, on the drawing screen 260b (S71-3). As the user selects a particular name from the candidate list 265 with the electronic pen 2500, the acceptance unit 22 receives a selection of the owner of the action item (S71-4). The user names to be displayed in the candidate list 265 may be obtained from the names of participants, or from the project members.

Next, as illustrated in FIG. 33, the display control 24 displays, on the drawing image 260c, a calendar 267 for receiving a selection of a particular date (S71-5). As the user selects a particular date from the calendar 267 with the electronic pen 2500, the acceptance unit 22 accepts a selection of the due date for the action item (S71-6). The calendar 267 is an example of a due date input screen. The due date input screen may be a list of dates, without indication of a day.

After the above-described operation, the electronic whiteboard 2 sends a content registration request, which requests to register the action item, to the sharing assistant server 6. The content registration request information includes a conducted event ID for identifying the event in which the action item is generated, a user ID of the owner of the action item that is selected at S71-4, image data of the action item (in this case, "Submit minutes") identified at S71-2, and the due date of the action item input at S71-6. As an example of content, the transmitter and receiver 21 transmits image data, which is a part of the image being displayed for the currently-held event, as image data representing the action item generated in that event. Accordingly, the transmitter and receiver 61 of the sharing assistant server 6 receives the content registration request information. The processing after the sharing assistant server 6 receives the content registration request information is substantially the same as the processing described above referring to FIG. 27 and FIG. 29, such that description thereof is omitted.

<Processing to End Event>

Figure 34:
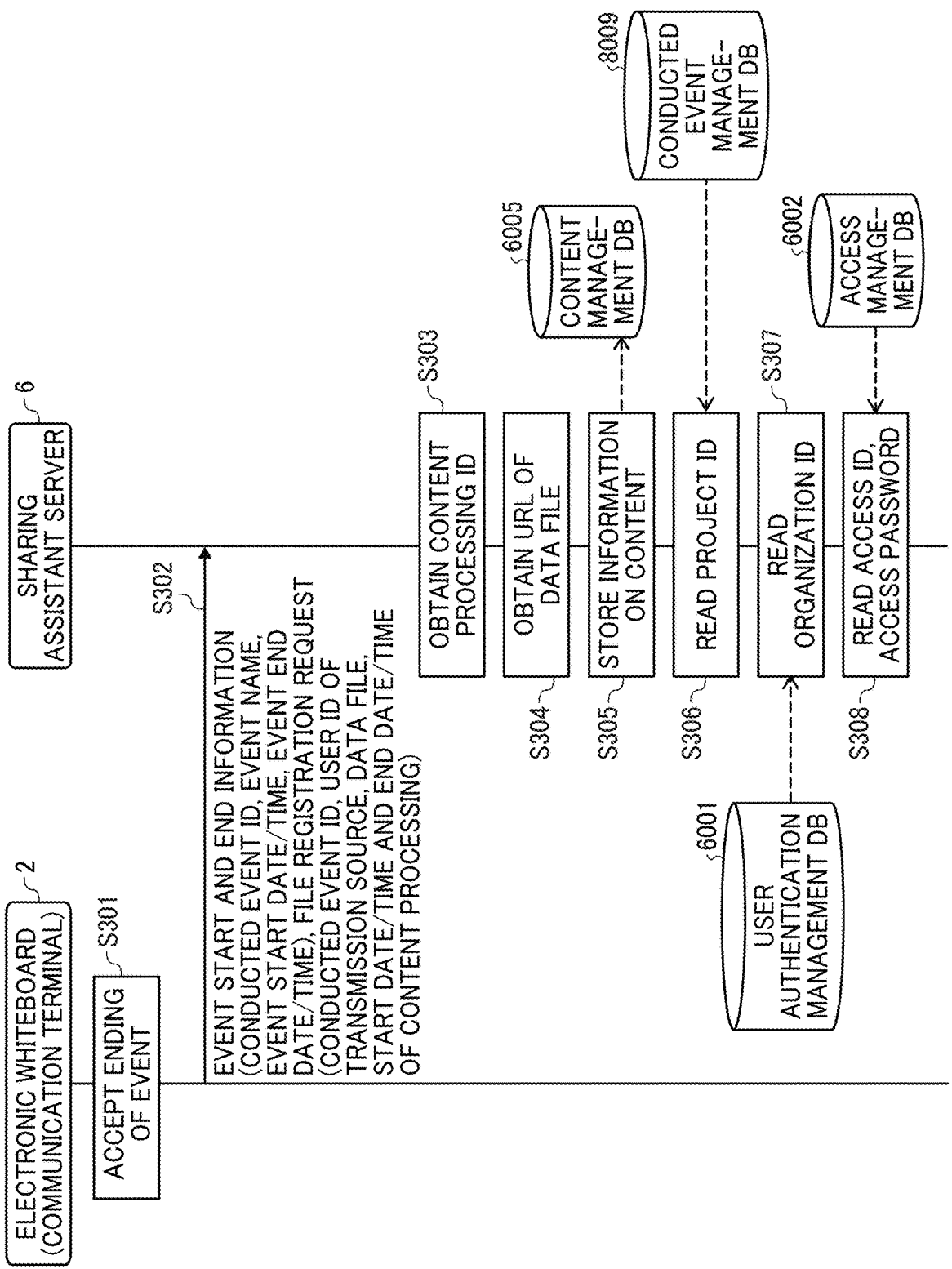
FIG. 34 is a sequence diagram illustrating operation of controlling processing to end an event, according to the embodiment.
Figure 35:
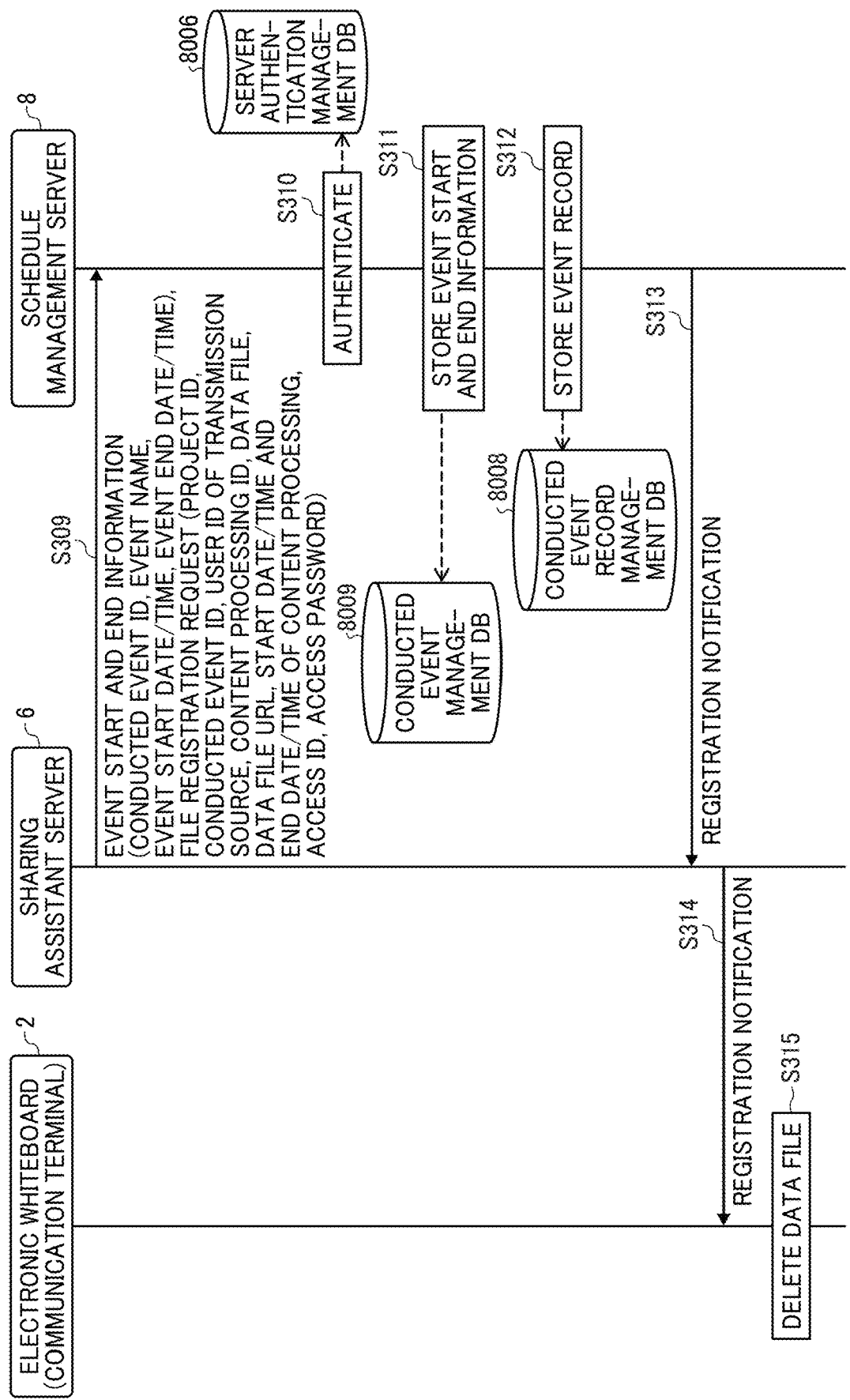
FIG. 35 is a sequence diagram illustrating operation of controlling processing to end an event, according to an embodiment.
Figure 36:
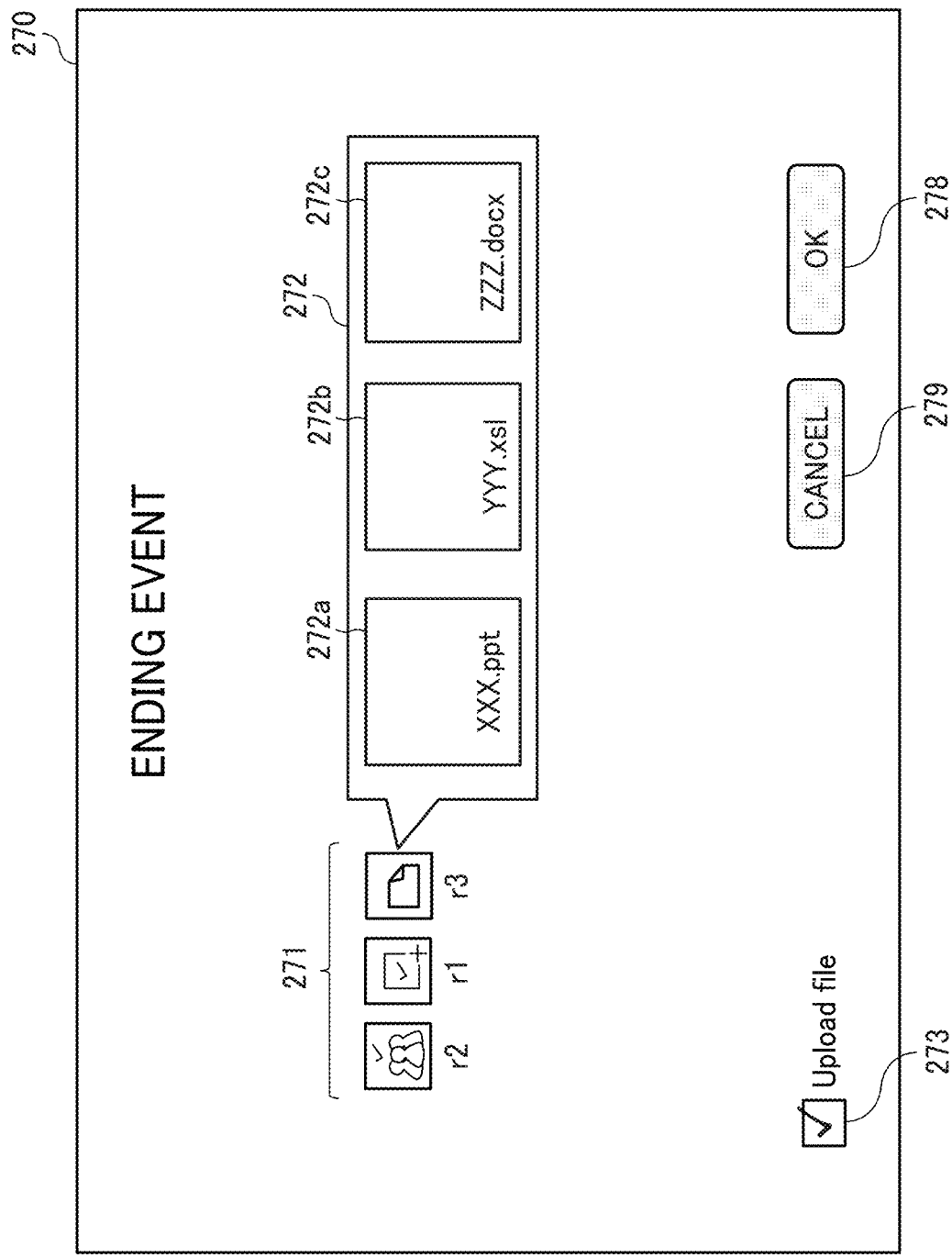
FIG. 36 is an illustration of an example event end screen, displayed by the electronic whiteboard.
Figure 37:
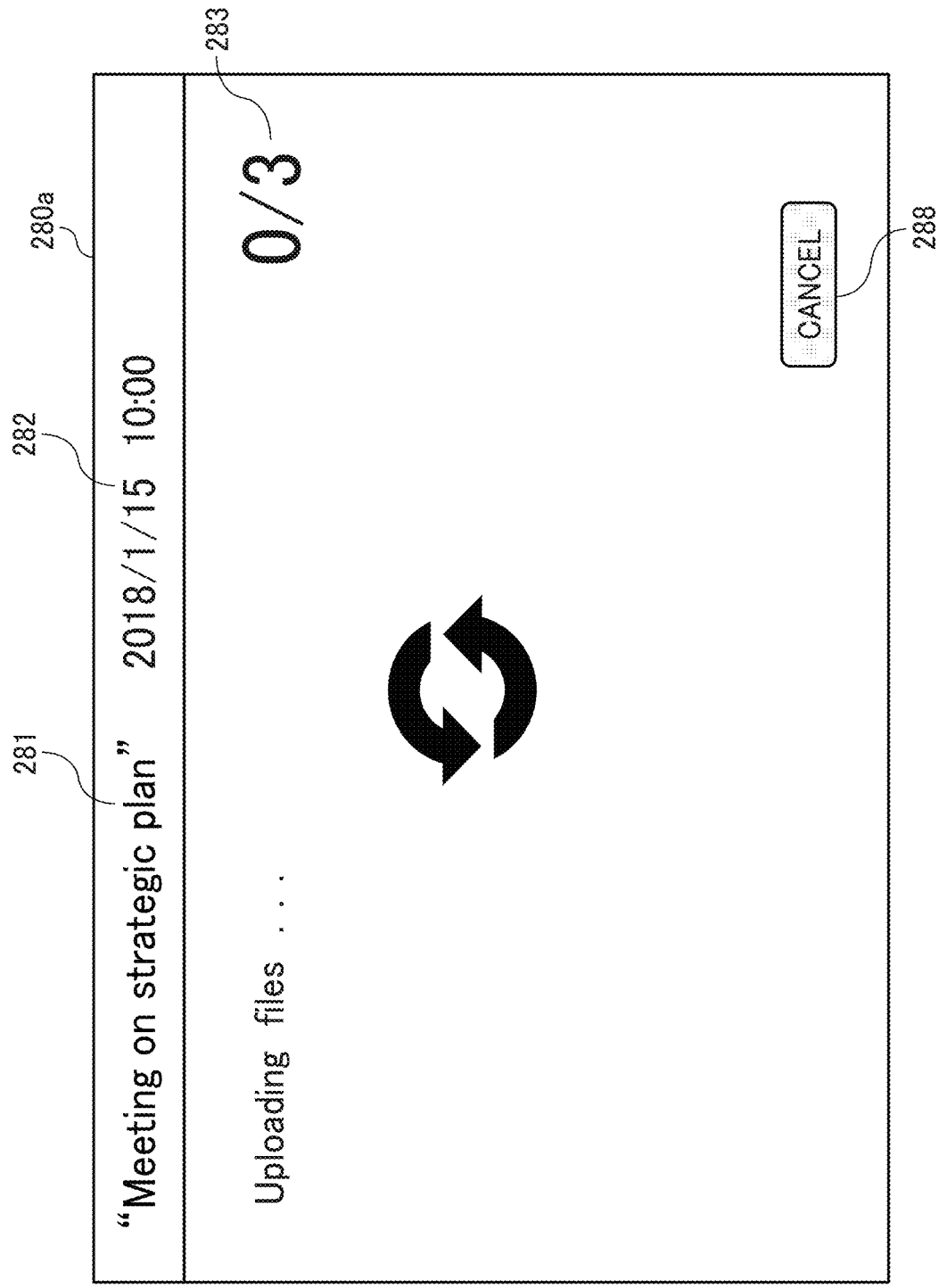
FIG. 37 is an illustration of an example file uploading screen, displayed by the electronic whiteboard.
Figure 38:
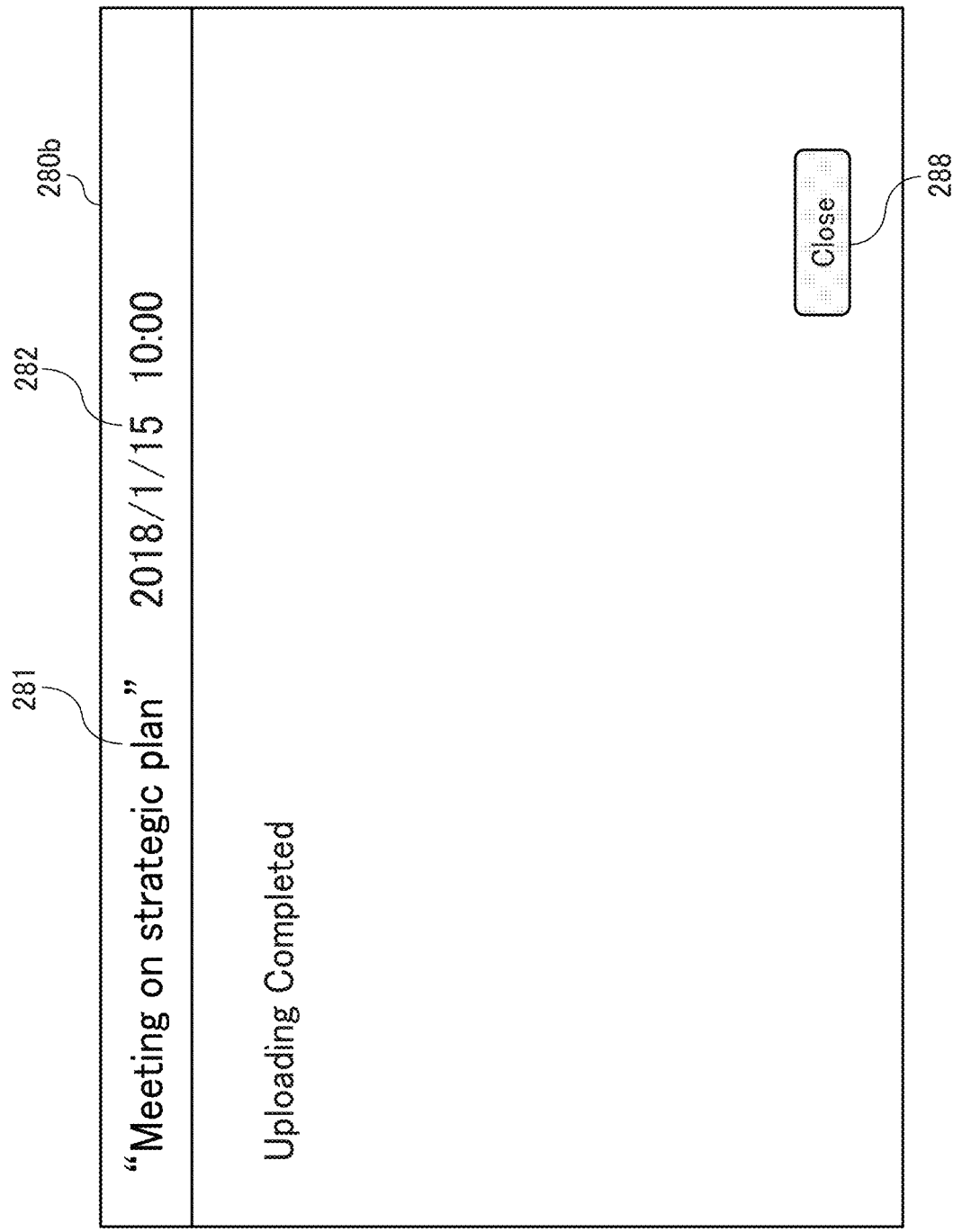
FIG. 38 is an illustration of an example uploading completion screen, displayed by the electronic whiteboard.

Next, referring to FIGS. 34 to 38, operation of controlling processing to end an event being conducted, is described according to an embodiment. FIGS. 34 and 35 are a sequence diagram illustrating operation of controlling processing to end an event, according to the embodiment. FIG. 36 is an illustration of an example event end screen, displayed by the electronic whiteboard 2. FIG. 37 is an illustration of an example file uploading screen, displayed by the electronic whiteboard 2. FIG. 38 is an illustration of an example uploading completion screen, displayed by the electronic whiteboard 2.

Referring to FIG. 34, in response to a user instruction to close the screen being displayed on the display 220 (See FIG. 26), the acceptance unit 22 accepts an instruction to end the event being conducted (S301).

The transmitter and receiver 21 transmits, to the sharing assistant server 6, event start and end information, and a request for registering a data file (S302). The event start and end information includes the conducted event ID, the event name, the event start date and time, and the event end date and time. The file registration request includes the conducted event ID, the user ID of a transmission source (the user ID of the electronic whiteboard 2), the data file, the start date and time of content processing, and the end date and time of content processing. The transmitter and receiver 61 of the sharing assistant server 6 receives the event start and end information, and the file registration request.

The obtainer 64 of the sharing assistant server 6 obtains, for each content that has been generated during the event, a content processing ID identifying the content. (S303). The obtainer 64 further obtains a URL of content data that has been generated during the event (S304). The storing and reading processor 69 stores, in the content management DB 6005 (FIG. 10B), the content processing type, the start date and time of content processing, the end date and time of content processing, the content processing ID obtained at S303, and the URL of the content data obtained at S304, for the conducted event ID that is received at S302 (S305).

The storing and reading processor 69 of the sharing assistant server 6 searches the conducted event management DB 6005 (FIG. 10A) using the conducted event ID received at S302 as a search key, to obtain the corresponding project ID (S306). The storing and reading processor 69 searches the user authentication management DB 6001 (FIG. 9A) using the user ID of the content transmission source as a search key, to obtain the corresponding organization ID (S307).

The storing and reading processor 69 searches the access management DB 6002 (FIG. 9B) using the organization ID read at S92 as a search key to obtain the access ID and access password that correspond to the organization ID obtained at S307 (S308).

Next, referring to FIG. 35, the transmitter and receiver 61 transmits, to the schedule management server 8, the event start and end information received at S302, and the file registration request (S309). The file registration request includes the project ID read at S306, the conducted event ID, the user ID of a transmission source, the data file, the start date and time of content processing, and the end date and time of content processing (received at S302), the content processing ID obtained at S303, the URL of data file obtained at S304, and the access ID and password read at S308. The transmitter and receiver 81 of the schedule management server 8 receives the event start and end information, and the file registration request.

Next, the authenticator 82 of the schedule management server 8 authenticates the sharing assistant server 6 using the access ID and the access password (S310). Since processing of S310 is substantially the same as described above referring to S38, description thereof is omitted. The following describes the case where the authentication result indicates that authentication is successful.

Next, the storing and reading processor 89 of the schedule management server 8 stores, in the conducted event management DB 8009 (FIG. 14B), the event start and end information received at S309 (S311). Specifically, the storing and reading processor 89 adds one record of event start and end information, to the conducted event management table in the conducted event management DB 8009.

The storing and reading processor 89 stores various types of data or information, received at S309, in the event record management DB 8008 (FIG. 14A) (S312). Specifically, the storing and reading processor 89 stores, in the event record management DB 8008 (FIG. 14A), various data (or information) including information on the data file, in association with the project ID and the conducted event ID received at S309. Accordingly, the schedule management server 8 is able to manage information regarding the data file, in a substantially similar manner as the sharing assistant server 6 manages the data file, using the project ID and the conducted event ID.

Next, the transmitter and receiver 81 transmits a notification indicating that the data file is registered, to the sharing assistant server 6 (S313). The sharing assistant server 6 receives the notification at the transmitter and receiver 61.

The transmitter and receiver 61 of the sharing assistant server 6 transmits the notification of registration received from the schedule management server 8, to the electronic whiteboard 2 (S314). The electronic whiteboard 2 receives the notification of registration at the transmitter and receiver 21.

In response to the notification, the storing and reading processor 29 of the electronic whiteboard 2 deletes the data file, which has been registered, from the specific storage area of the memory 2000 (S315). Since the data file that has been transmitted to the sharing assistant server 6 is deleted from the electronic whiteboard 2, leakage of confidential information that might have been shared during the meeting can be prevented.

The following describes transitions of screen displayed by the electronic whiteboard 2, when controlling processing to end the event. In response to acceptance of an instruction to end the event by the acceptance unit 22 at S301, the display control 24 controls the display 220 to display an event end screen 270 as illustrated in FIG. 36. The event end screen 270 includes a tool bar 271, a file display area 272, a file uploading selection area 273, a "OK" button 278 to be pressed to end the event, and a "CANCEL" button 279 to be pressed to cancel processing to end the event. The tool bar 271 includes graphical images such as icons r1, r2 and r3, which are similar to the icons illustrated in FIG. 26. The file display area 272 includes data file images 272a, 272b and 272c, each being used for identifying a data file stored in a specific storage area of the memory 2000. The file uploading selection area 273 includes a check box (an example of a selection area) for selecting whether or not the data file represented by the data file image, displayed in the file display area 272, is to be uploaded to the sharing assistant server 6.

When the acceptance unit 22 accepts selection of the "OK" button 278 after the file uploading selection area 273 is selected, the display control 24 displays a file uploading screen 280a as illustrated in FIG. 37. At this time, the transmitter and receiver 21 starts transmitting the data file, selected for uploading. That is, the file uploading screen 280a is displayed on the display 220, when the data file stored in the specific storage area of the memory 2000, is being uploaded to the sharing assistant server 6. The file uploading screen 280a includes an event name 281 of the event to end, the event end date and time 282, a display area 283 for displaying the progress in updating the data file, and a "CANCEL" button 288 for interrupting (or cancelling) uploading of the data file. The display area 283 indicates a number of data files to be updated ("3" in FIG. 37), and a number of data files that have been uploaded ("0" in FIG. 37).

When uploading of the data file is completed, the display control 24 controls the display 220 to display an uploading completion screen 280b illustrated in FIG. 38. The uploading completion screen 280b includes a "CLOSE" button 288 to be pressed to end the event. At this time, as described above referring to S315, the storing and reading processor 29 of the electronic whiteboard 2 deletes the data file, which has been uploaded, from the specific storage area of the memory 2000.

On the other hand, when uploading of any data file fails, during when the file uploading screen 280a is being displayed on the display 220, the display control 24 displays information for identifying the data file that uploading has failed (such as the file name). For example, if uploading of data file has failed due to a trouble in the communication network 10, the user participating in the event may print any data file that has been generated or edited during the event, or store such data file in the USB memory 2600 connected to the electronic whiteboard 2.

When the data file is kept stored in the specific storage area of the memory 2000 after the event ends, for example, due to failure in uploading, the storing and reading processor 29 of the electronic whiteboard 2 may delete the data file stored in the specific storage area, before or at the time of starting a next event for the electronic whiteboard 2. Since the user can be notified of any failure, the data file can be deleted, assuming that the user has a copy of the data file. Since the data file that is kept stored can be deleted from the electronic whiteboard 2, leakage of confidential information that might have been shared during the meeting can be prevented.

<Viewing of Event Record>

Figure 39:
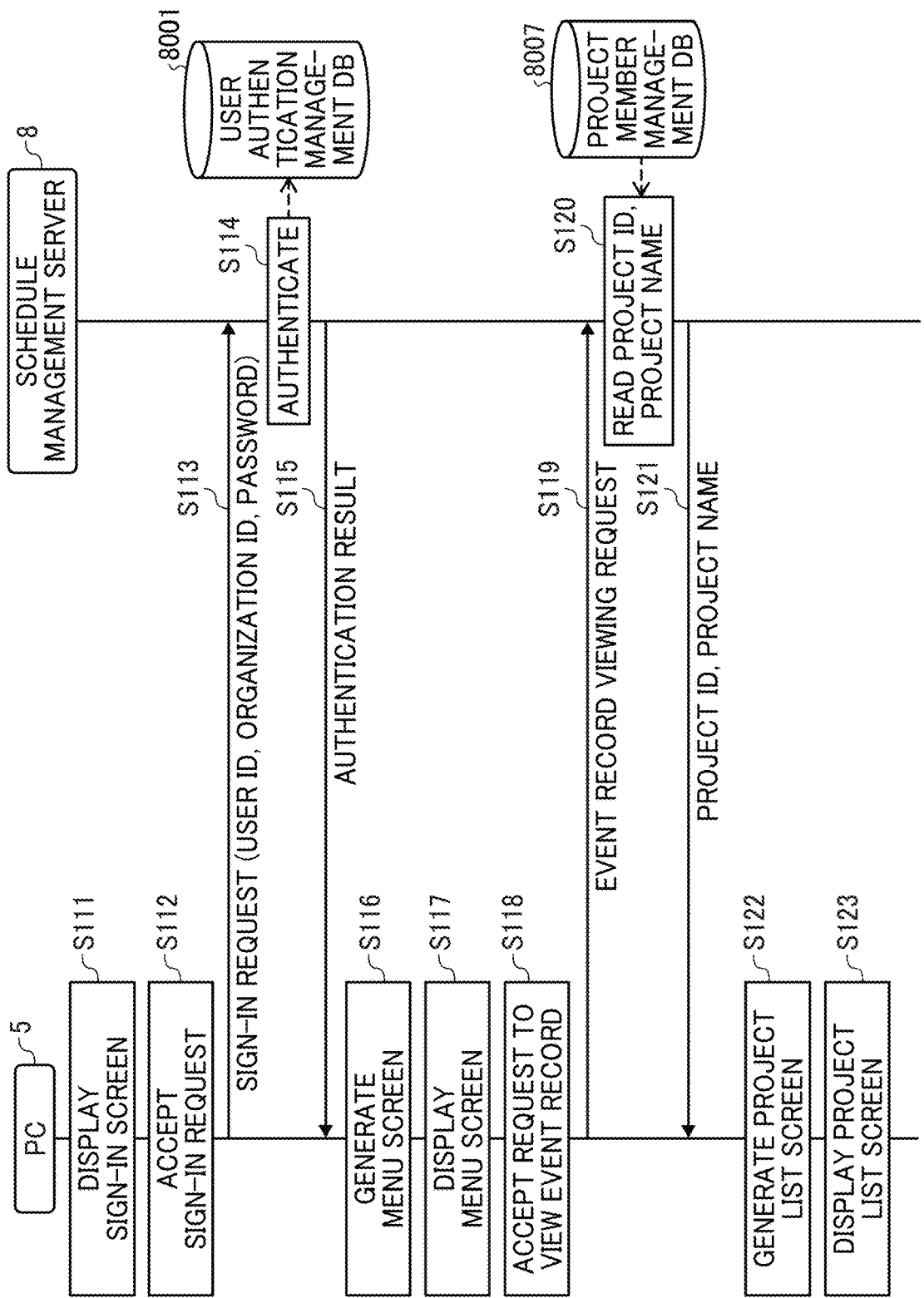
FIG. 39 is a sequence diagram illustrating operation of controlling processing to output a record of the event, according to an embodiment.
Figure 40:
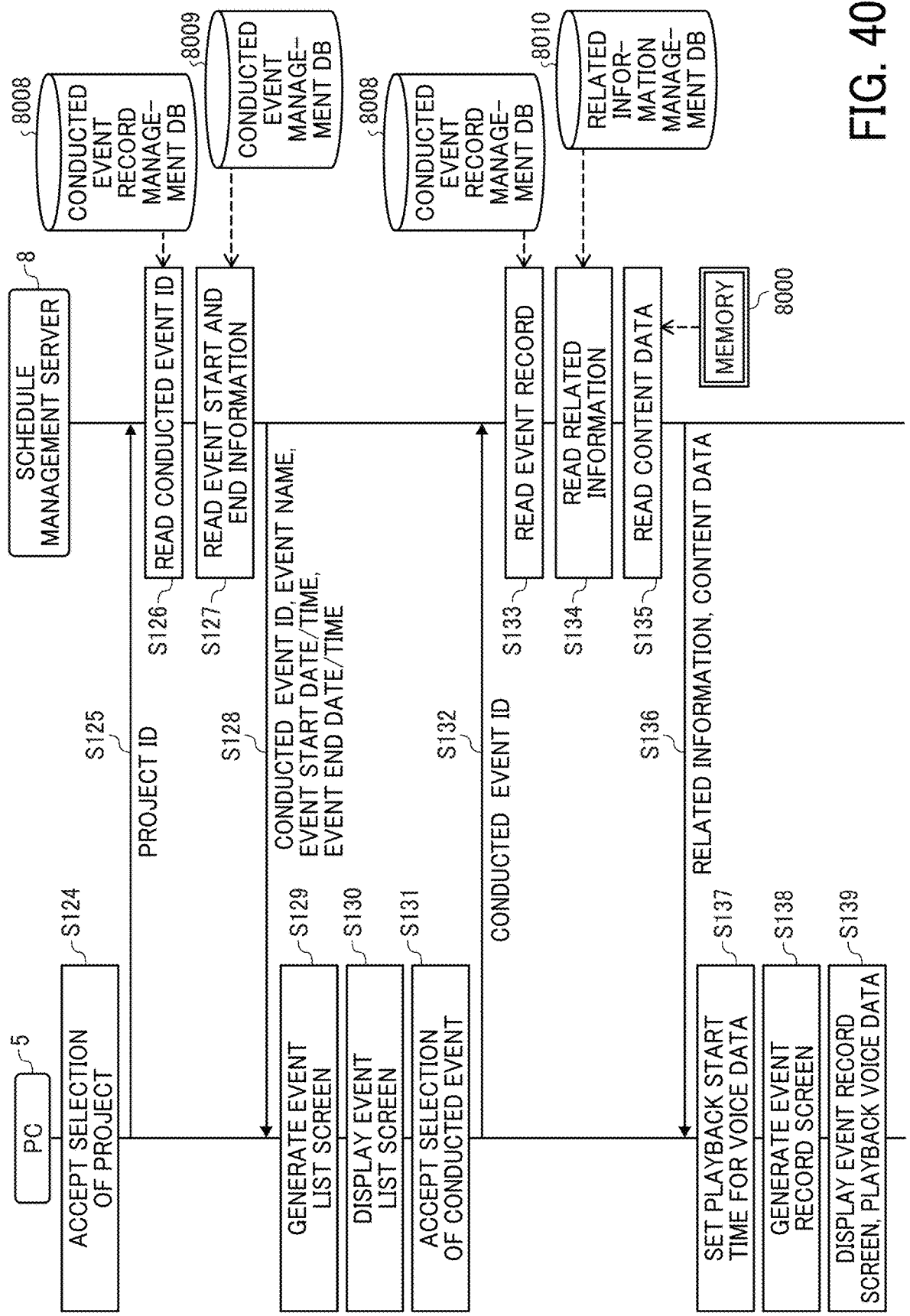
FIG. 40 is a sequence diagram illustrating operation of controlling processing to output a record of the event, according to an embodiment.
Figure 41:
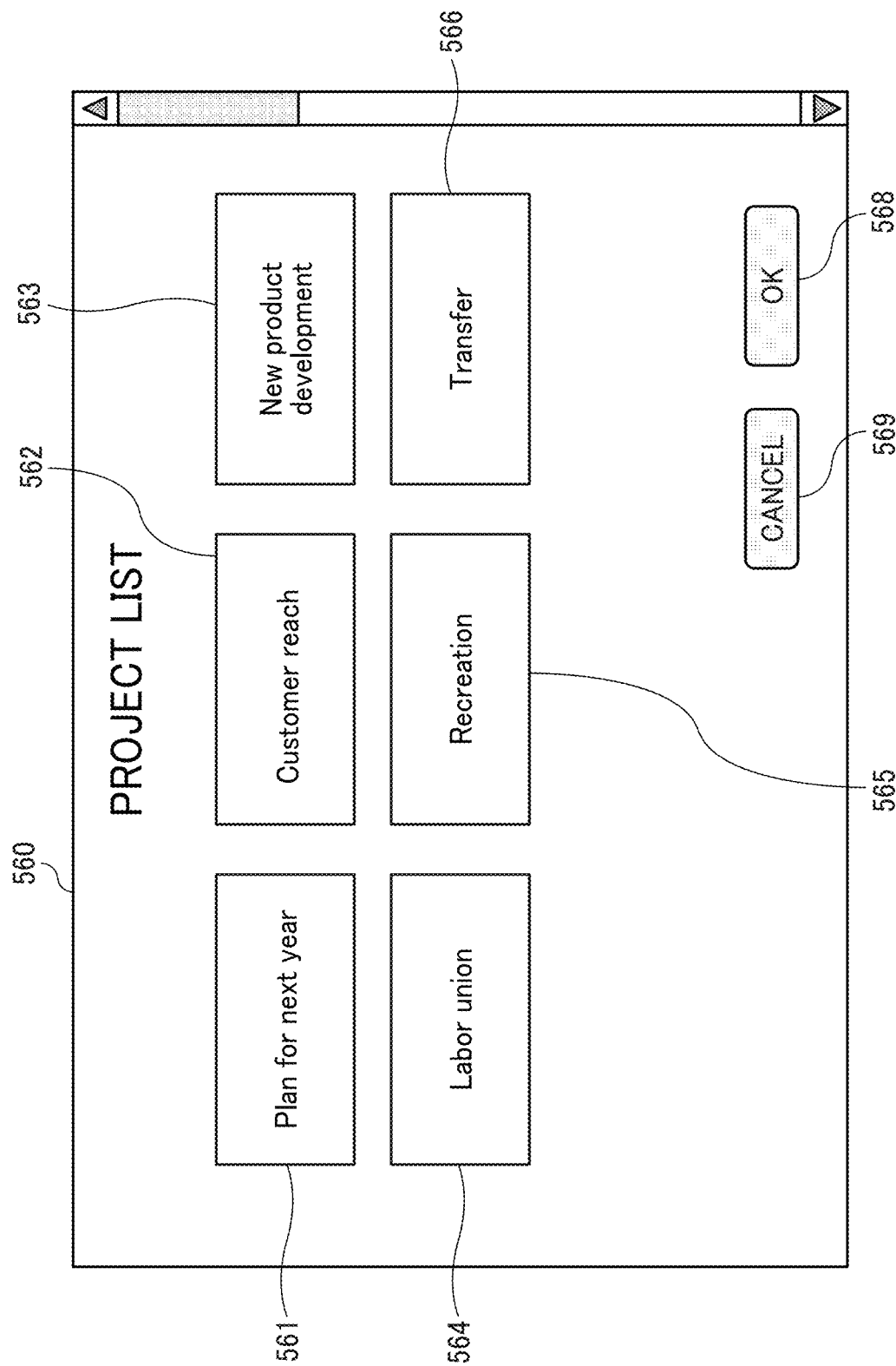
FIG. 41 is an illustration of an example project list screen, displayed by the PC.
Figure 42:
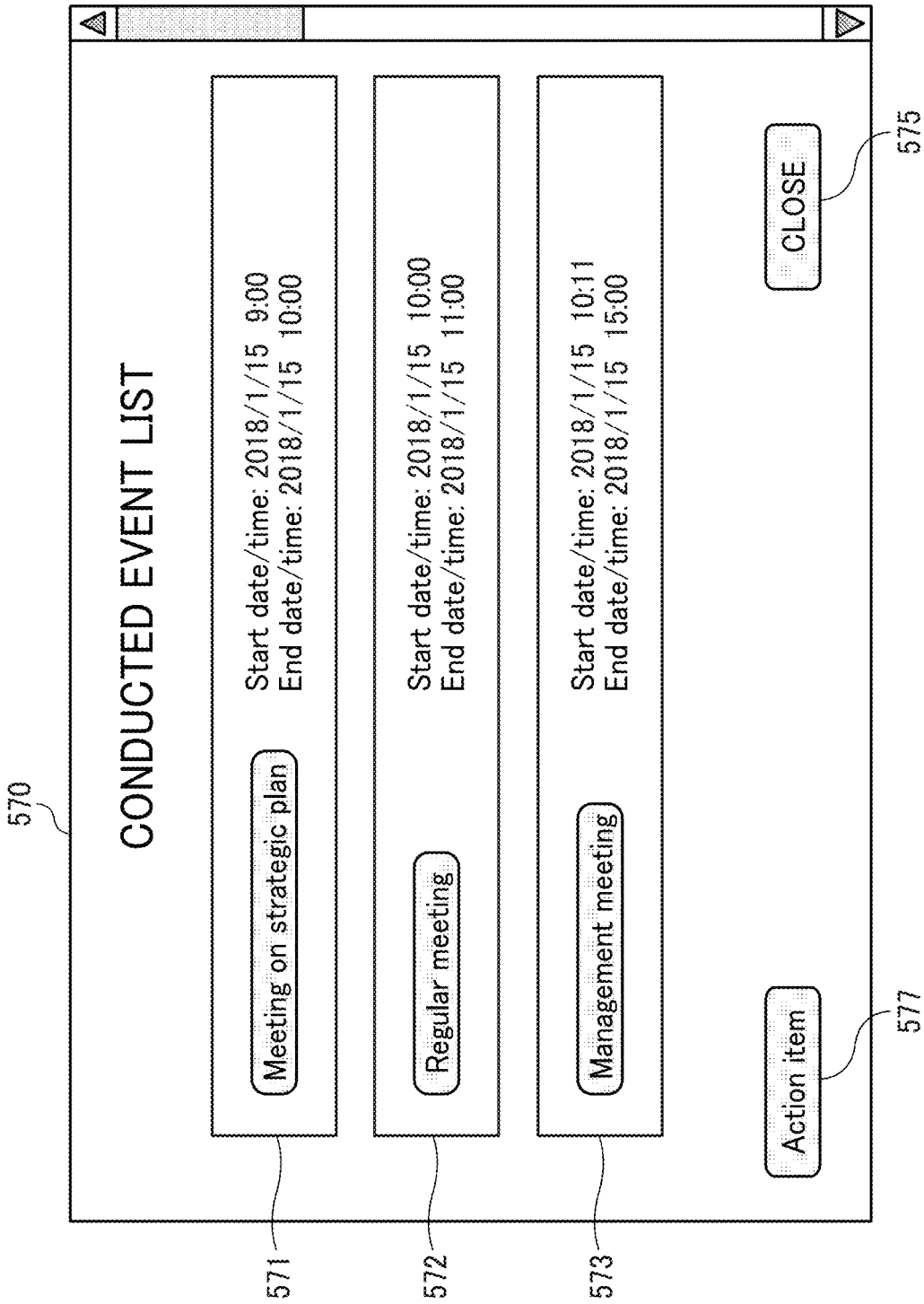
FIG. 42 is an illustration of a conducted event list screen, displayed by the PC.
Figure 43:
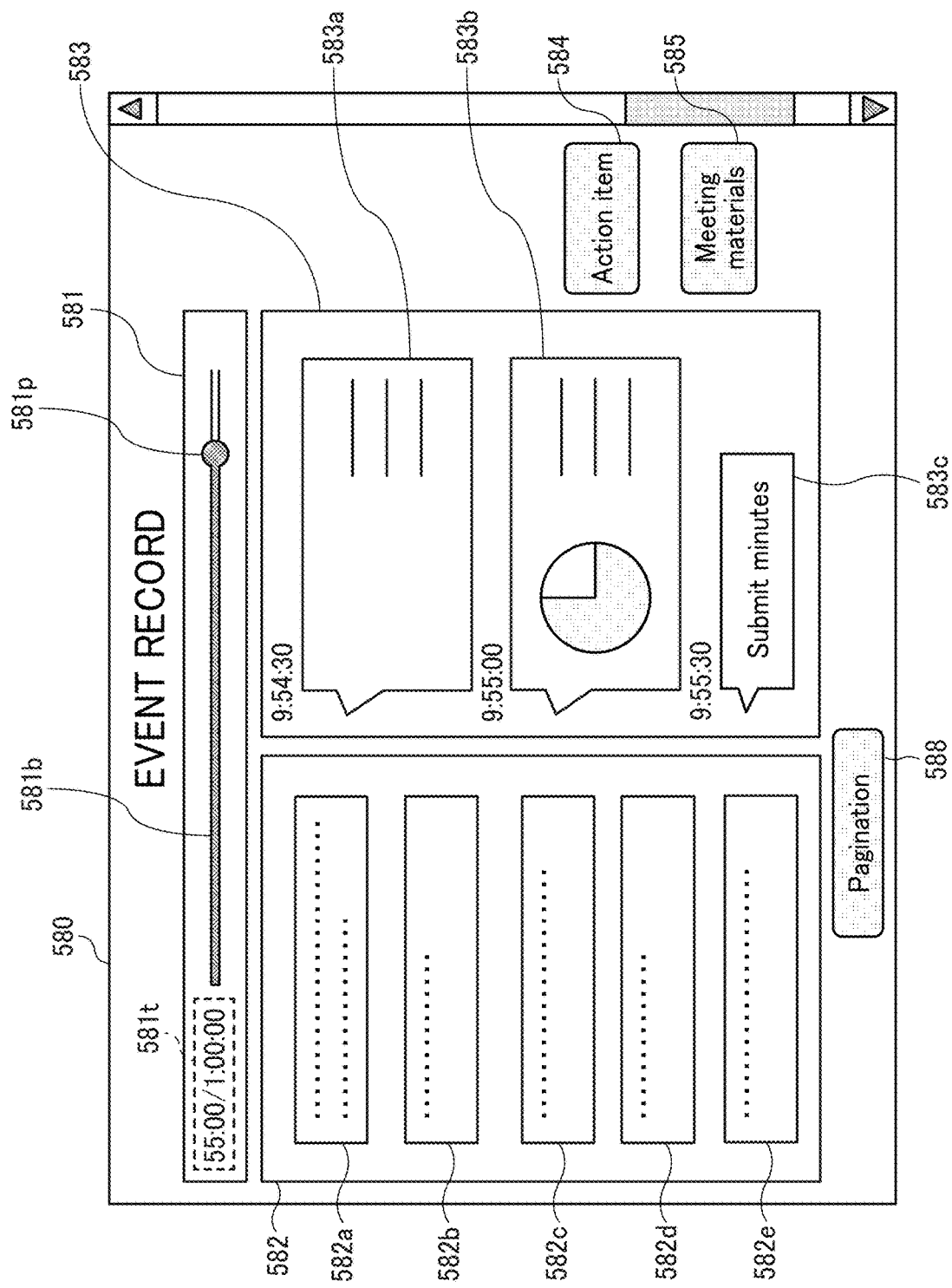
FIG. 43 is an illustration of an example event record screen, displayed by the PC.
Figure 44:
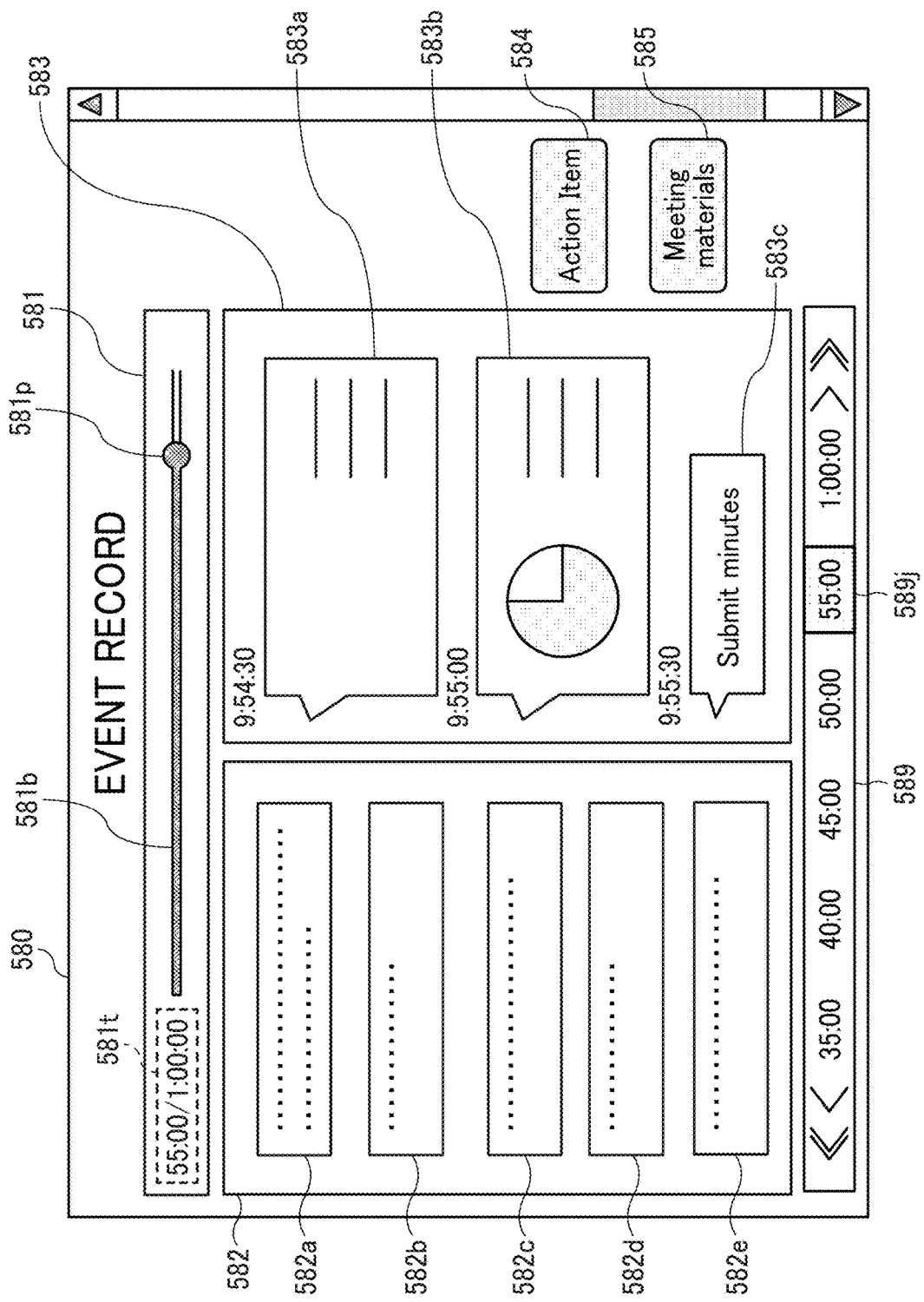
FIG. 44 is an illustration of an example event record screen, displayed by the PC.
Figure 45:
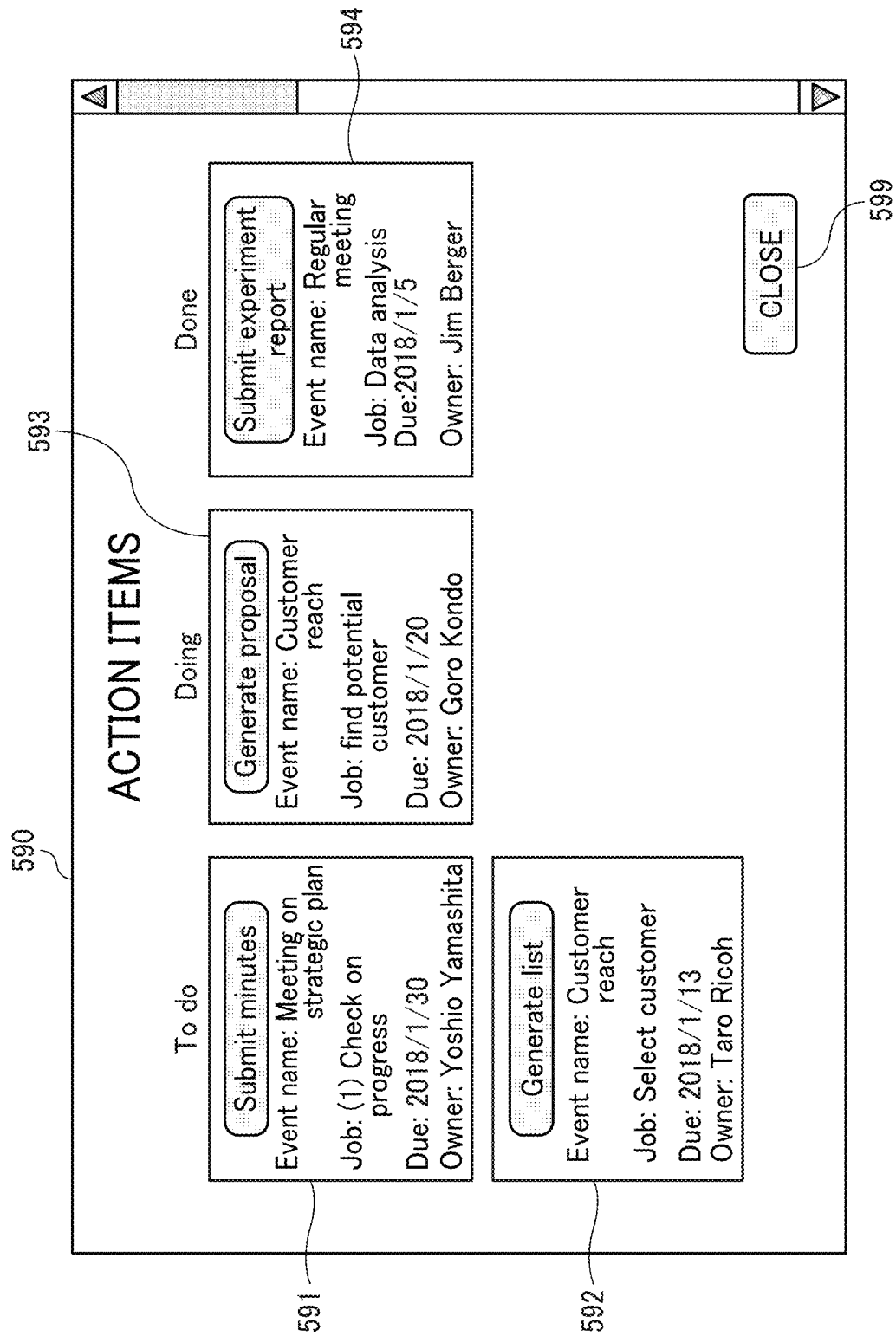
FIG. 45 is an illustration of an action item screen, displayed by the PC.

Referring to FIGS. 39 to 45, operation of processing viewing of an event record is described according to an embodiment. FIGS. 39 and 40 are a sequence diagram illustrating operation of outputting a record of the event, according to an embodiment. FIG. 41 is an illustration of an example project list screen, displayed by the PC 5. FIG. 42 is an illustration of a conducted event list screen, displayed by the PC 5. FIGS. 43 and 44 are each an illustration of an example event record screen, displayed by the PC 5. FIG. 45 is an illustration of an action item screen, displayed by the PC 5. Referring now to FIGS. 39 and 40, example operation of outputting a record of the event to be viewed by a user is described. S111 to S117 of FIG. 39 are performed in a substantially similar manner as described above referring to S11 to S17 of FIG. 16, and description thereof is omitted.

In response to pressing of the "View event record" button 543 in the menu screen 540 of FIG. 18, the acceptance unit 52 of the PC 5 accepts a request for viewing the event record (S118).

The transmitter and receiver 51 of the PC 5 transmits an event record viewing request, which indicates a request for viewing the event record, to the schedule management server 8 (S119). Accordingly, the transmitter and receiver 81 of the schedule management server 8 receives the event record viewing request.

Next, the storing and reading processor 89 of the schedule management server 8 searches the project member management DB 8007 (FIG. 13B) using the user ID and the organization ID received at S113 as a search key, to obtain the project ID and the project name of all projects, which correspond to the user ID and the organization ID (S120). The transmitter and receiver 81 transmits the project ID and the project name of each project to the PC 5 (S121).

The generator 56 of the PC 5 generates a project list screen 560 as illustrated in FIG. 41, using the project ID and the project name of all projects that are received at S121 (S122). The display control 54 of the PC 5 controls the display 508 to display a project list screen 560 generated by the generator 56 (S123). The project list screen 560 includes contents that are substantially the same as contents included in the project list screen 240 illustrated in FIG. 24. The project icons 561 to 566 and buttons 568 and 569 in FIG. 41 correspond to the project icons 241 to 246 and buttons 248 and 249 in FIG. 24, respectively.

For example, referring to FIG. 40, when the user A presses the project icon 561 with the mouse 512 or the like, the acceptance unit 52 accepts a selection of the project indicated by the project icon 561 (S124).

The transmitter and receiver 51 of the PC 5 transmits the project ID of the project selected at S124 to the schedule management server 8 (S125). Accordingly, the transmitter and receiver 81 of the schedule management server 8 receives the project ID.

The storing and reading processor 89 of the schedule management server 8 searches the event record management DB 8008 (FIG. 14A) using the project ID received at S125 as a search key, to obtain the corresponding conducted event ID (S126). The storing and reading processor 89 reads all conducted event IDs associated with the project ID received at S125. The storing and reading processor 89 further searches the conducted event management DB 8009 (FIG. 14B), using each conducted event ID read at S126 as a search key, to read the event start and end information corresponding to the conducted event ID (S127). The event start and end information includes the conducted event ID, the event name, the event start date and time, and the event end date and time.

The transmitter and receiver 81 transmits the conducted event ID, event name, event start date and time, and event end date and time, read at S127 for each conducted event of the selected project, to the PC 5 (S128). The transmitter and receiver 51 of the PC 5 receives the conducted event ID, event name, start date and time, and end date and time.

The generator 56 of the PC 5 generates a conducted event list screen 570 as illustrated in FIG. 42, using various data (or information) received at S128 (S129). The display control 54 of the PC 5 controls the display 508 to display the conducted event list screen 570 generated by the generator 56 (S130). As illustrated in FIG. 42, the conducted event list screen 570 includes event information 571, 572, and 573, etc., each indicating an event that was held. For example, the event information 571 to 573 each include a name of the conducted event, and start date and time and end date and time of the conducted event. The event information 571 to 573 is an example of record information selection area for receiving a selection of a conducted event subjected to viewing the event record. The conducted event list screen 570 further includes a "CLOSE" button 575 to be pressed to close the conducted event list screen 570, at its lower right. The conducted event list screen 570 further includes a "Action Item" button 577 to be pressed to view the action item, at its lower left. The "Action Item" button 577 is an example of an action item selection area for receiving an instruction to display an action item.

The acceptance unit 52 of the PC 5 accepts selection of a conducted event in the conducted event list screen 570 (S131). Specifically, when the user selects the event information for a particular conducted event, from the conducted event list screen 570, the acceptance unit 52 receives a selection of the particular conducted event. The transmitter and receiver 51 of the PC 5 transmits the conducted event ID of the conducted event selected at S131 to the schedule management server 8 (S132). Accordingly, the transmitter and receiver 81 of the schedule management server 8 receives the conducted event ID.

The storing and reading processor 89 of the schedule management server 8 searches the event record management DB 8008 (FIG. 14A) using the conducted event ID received at S132 as a search key, to obtain event record information associated with the conducted event ID (S133). The event record information includes the content processing ID, type of content processing, start date and time of content processing, and end date and time of content processing.

The storing and reading processor 89 of the schedule management server 8 searches the related information management DB 8010 using the conducted event ID received at S132 as a search key, to obtain related information associated with the conducted event ID (S134). The related information includes the content generation time, content processing ID, and type of content processing, by type of content data. In case the content type is text data or image data, the related information further includes a sequence number. The content generation time included in the related information is an example of time information.

The storing and reading processor 89 reads out content data, from a storage destination of the content data, using information indicating the storage destination of the content data, which can be obtained from the event record information read at S133 (S135). The transmitter and receiver 81 transmits, to the PC 5, the related information and the content data (S136). The transmitter and receiver 51 of the PC 5 receives the related information and the content data.

Next, the audio control 58 of the schedule management server 8 sets a playback start time of voice data (S137). The voice data is an example of content data received at S136. In such case, the audio control 58 sets a playback start time of voice data, which is associated with the content generation time "00:00" in the related information, as the playback start time of voice data.

The generator 56 of the PC 5 generates an event record screen 580 as illustrated in FIG. 43, using the related information and the content data received at S136 (S138). More specifically, the generator 56 generates the event record screen 580 such that images of text data (voice text data) are displayed in a text data display area 582 in an order of sequence number in the related information. Further, the generator 56 generates the event record screen 580 such that images of image data (screenshot) are displayed in a screenshot data display area 583 in an order of sequence number in the related information. Further, the generator 56 generates the event record screen 580 such that a playback point 581p (an example of a playback point selector, which is a graphical control region used for selecting the point where playback starts) is displayed in a playback display area 581, specifically, at a location determined by the playback start time that is set at S137.

The display control 54 of the PC 5 controls the display 508 to display the event record screen 580 generated by the generator 56 (S139). Further, the audio control 58 of the PC 5 starts to playback the voice data from the playback start time that is set at S137. As illustrated in FIG. 43, in the event record screen 580, content data, each generated during the event, are displayed, side by side, while being classified by type of content processing. Specifically, the event record screen 580 includes the playback display area 581 for displaying a playback start time of voice data, the text data display area 582 for displaying text data converted from voice data, and the screenshot data display area 583 for displaying image data of screenshot. The event record screen 580 further includes an "action item" button 584 to be pressed to check the action item, a "meeting materials" button 585 to be pressed to check the meeting materials, and "pagination" button 588 to be pressed to display a pagination display area 589 illustrated in FIG. 44.

The playback display area 581 includes the playback point 581p, which is an example of a playback point selector that can be selected by the user to set the current location in the duration of voice data. The playback point selector further indicates a point where playback of voice data starts, which could be any point of a total playback time. The playback point selector, which may be draggable by the user, may be implemented by a seekbar thumb or a slider. While the playback point 581p is displayed as a point in this example, the playback point selector may have any desired graphical representation. For example, the playback point selector may be displayed as having any shape such as a circle, square, etc., or may be displayed as any graphical component such as an icon or a thumbnail image.

The playback display area 581 further includes a slider bar 581b. Similarly to a progress bar, the slider bar 581b keeps track of the current location in the duration of voice data. With this function, the slider bar 581b is able to show a playback progress.

With the playback point 581p and the slider bar 581b, the user can instantly know which part of voice data has been reproduced. The playback display area 581 further includes a playback time indicator 581t, which indicates a numeral value of the current playback time point with respect to the total playback time. With the playback time indicator 581t, the user can instantly know, which part of voice data is currently output, out of the total playback time. In this example, the playback point 581p and the slider bar 581b may be collectively referred to as a seek bar. The seek bar is an area for receiving designation on a playback start time of recorded data, while displaying the playback point of the recorded data. The user is able to instantly know which part of the recorded data is being reproduced, from the beginning to the end, by referring to the position of the playback point 581p on the slider bar 581b. The user can move the playback point 581p using any desired input device such as the mouse 512, to instruct to playback the recorded data from any desired playback point. The playback point 581p is an example of a playback point selector. The seek bar, that is, the playback point 581p and the slider bar 581b, are an example of a playback progress display image.

While the seek bar is represented as a horizontal bar, the seek bar may be represented as a vertical bar. Further, the seek bar may have any desired graphical representation, such that the seek bar may be represented as a circle, semi-circle, or ellipse. In such case, the slider may be replaced by a spinner.

Still referring to FIG. 43, in the text data display area 582, text data 582a, 582b, 582c, 582d, and 582e are displayed in an order determined by the content generation time. In this example, text data 582a, 582b, 582c, 582d, and 582e are displayed, from the top to the bottom, in an order determined by the content generation time. Similarly, in the screenshot display area 583, screenshot (captured) images 583a, 583b, and 583c are displayed in an order determined by the content generation time. In this example, screenshot images 583a, 583b, and 583c are displayed, from the top to the bottom, in an order determined by the content generation time. Thus, the text data display area 582 and the screenshot display area 583 are displayed, side by side, in time series. As the user moves the playback point 581p with the mouse, for example, the acceptance unit 52 detects such movement. The display control 54 changes text data displayed in the text data display area 582 and screenshot image data displayed in the screenshot display area 583, to text data and screenshot image data each corresponding to a point of time that is indicated by the moved position of the playback point 581p. For example, if the user is looking for some information on a particular topic, the user can easily find out a time period during when such topic has been discussed, using the image data of screenshot or the text data of voice. For example, with the image 583b showing a circle graph, the user is able to recognize more easily a time during when the circle graph has been discussed. Once the image 583b of the circle graph is found, the user can easily find the text images 582c and 582d, which are displayed side by side with this screenshot image 583b, to check details of discussion. In this example, the images 583a and 583b are each a screenshot image of the entire screen of the display 220. Still referring to FIG. 43, the image 583c is an image of an action item, which has been detected at S71-2. As described above, the generator 56 generates the event record screen 580, such that, each type of content (text data, screenshot, etc.) is displayed on a display area for that content type (text data display area, screenshot display area, etc.) in an order determined by the content generation time.

FIG. 44 is an illustration of an example image, which is displayed on the display 508, in response to pressing of the "pagination" button 588 illustrated in FIG. 43. In this disclosure, "pagination" functions as a navigator, which assists a user in moving between pages in case contents are displayed in more than one page. For example, for the webpage, "pagination" corresponds to processing to divide display contents into a plurality of pages, and providing a link to each page. Using the "pagination", the user can easily access a desired content, while the content provider can easily know which content the user is viewing. "Pagination" is also referred to as "page division", "page feed", "paging", or "pager".

When the user presses the "pagination" button 588, the acceptance unit 52 receives the pressing of the "pagination" button 588. As illustrated in FIG. 44, the display control 54 controls the display 508 to display a pagination display area 589 at a lower part of the event record screen 580. In this pagination display area 589, for example, a total event time (such as a total meeting time) is divided into a plurality of time slots (here, every 5 minutes), while the time slot having a point of time indicated by the playback point is displayed differently (Elapsed time display area 589j). In this example, such time slot is bounded by a bold line.

With the sharing system 1, records on one or more events related to the same project can be easily shared between project members of the project.

When the acceptance unit 52 of the PC 5 receives selection of the "Action Item" button 577 of the conducted event list screen 570 at S131, the generator 562 displays an action item screen 590 as illustrated in FIG. 45. The display control 54 controls the display 508 to display the action item screen 590 generated by the generator 56. As illustrated in FIG. 45, the action item screen 590 includes action item information 591 to 594. For example, the action item information 591 includes an image representing details of the action item identified as described above referring to FIG. 31, the user name selected from the candidate list of FIG. 32, and the due date entered via the screen of FIG. 33. The action item screen 590 further includes a "CLOSE" button 599 to be pressed to close the action item screen 590, at the lower right. The action item screen 590 illustrated in FIG. 45 displays all action items associated with the project ID that has been selected at S124. When the acceptance unit 52 receives pressing of the "action item" button 584 on the conducted event record screen 580 illustrated in FIG. 43, the display control 54 controls the display 508 to display the action item screen 590 in a substantially similar manner.

<Selecting Content from Event Record>

Figure 46:
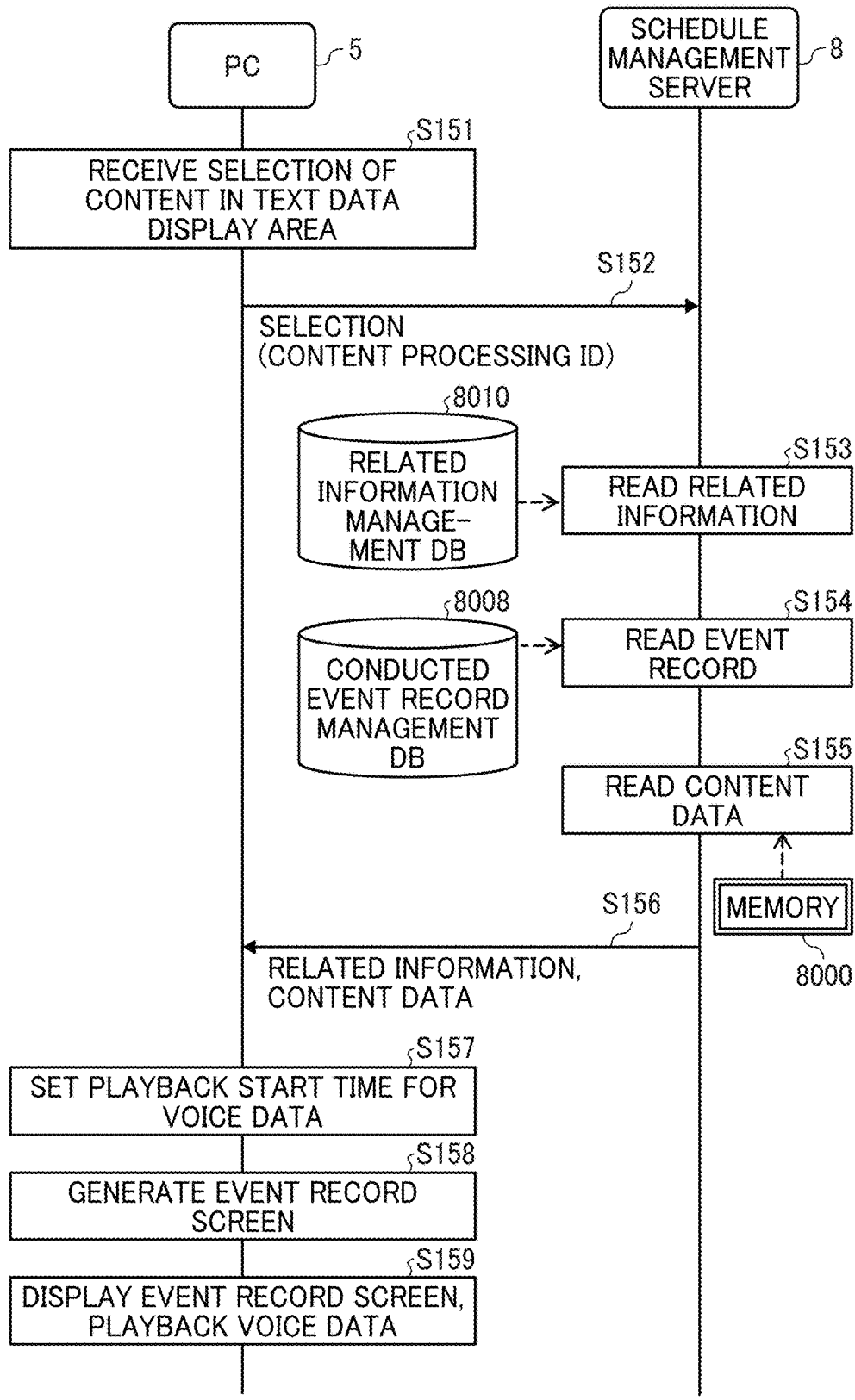
FIG. 46 is a sequence diagram illustrating operation of controlling selection of a content in an event record, according to an embodiment.
Figure 47:
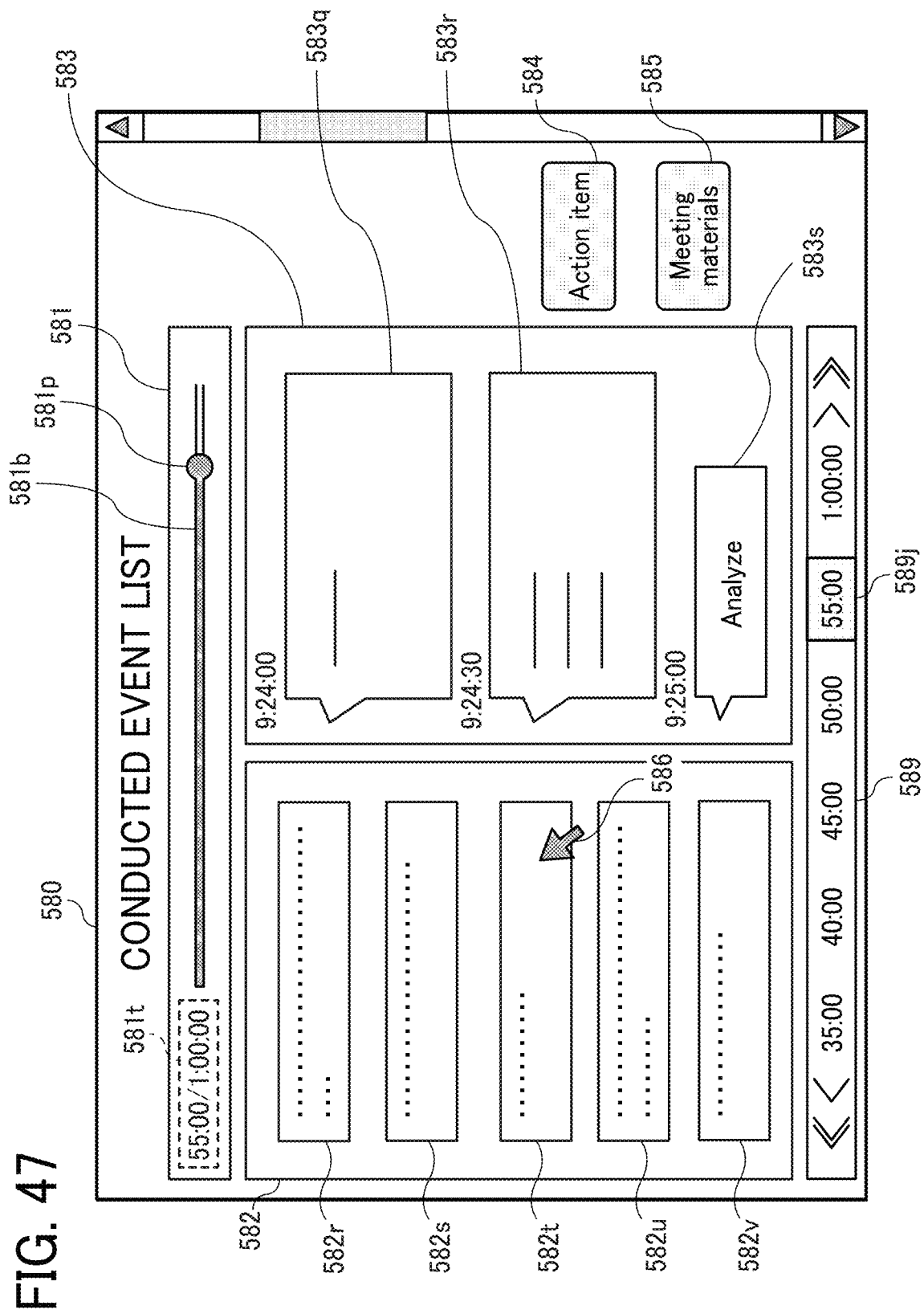
FIG. 47 is an illustration of an example event record screen, displayed by the PC.
Figure 48:
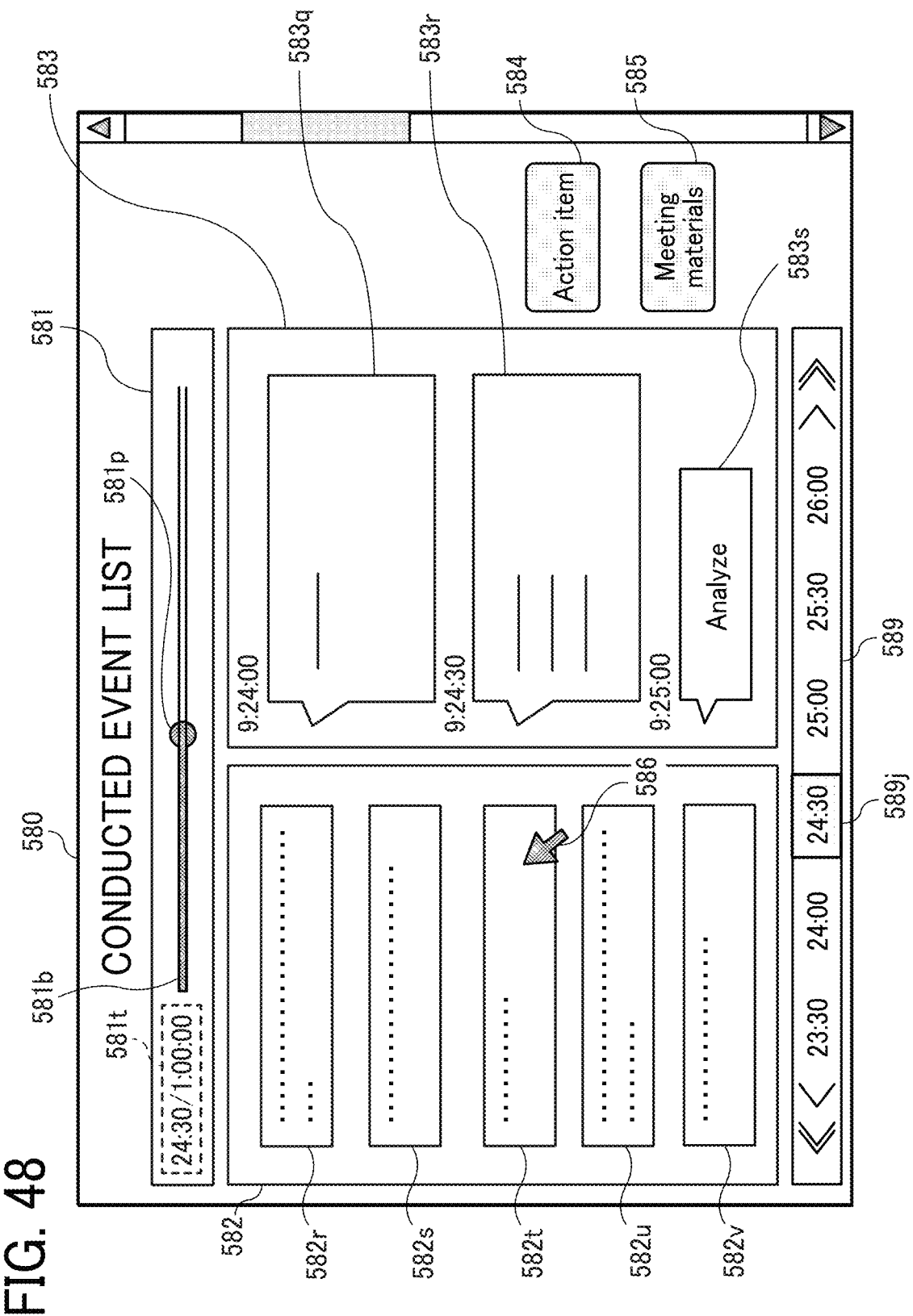
FIG. 48 is an illustration of an example event record screen, displayed by the PC.

Referring now to FIGS. 46 to 51, operation of controlling display of an event record screen according to selection of content from an event record is described according to examples. FIGS. 46, and 49 to 51 are each a sequence diagram illustrating example operation of selecting content from an event record, according to an example. FIGS. 47 and 48 are each an illustration of an example event record screen, displayed by the PC 5.

As described above referring to FIG. 43, for example, using images of text data displayed in the text data display area 582 or images of screenshot data displayed in the screenshot display area 583, each corresponding to a point of time indicated by the playback point 581p, the user is able to find content of user's interest more quickly. In alternative to selecting content by moving the playback point 581p, the user may select specific content from any one of the text data display area 582 (illustrated in FIG. 46), and screenshot display area (illustrated in FIG. 49). Further, when selecting content using the pagination display area 589 (illustrated in FIG. 50) or the playback display area 581 (illustrated in FIG. 51), the PC 5 uses information for identifying content selected by the user, to display the selected content.

Referring to FIG. 46, the acceptance unit 52 of the PC 5 accepts selection of an image representing particular text data in the text data display area 582, on the event record screen 580 (S151). For example, as illustrated in FIG. 47, the user selects a particular image (in this example, the text image 582t) representing particular text data, in the text data display area 582 on the event record screen 580, with the mouse pointer 586. In response to user selection, the acceptance unit 52 accepts selection of the particular image representing the particular text data (in this example, the text image 582t) in the text data display area 582.

The transmitter and receiver 51 of the PC 5 transmits information on the selected text data (referred to as "selection information"), accepted at the acceptance unit 52, to the schedule management server 8 (S152). The selection information includes a content processing ID identifying the particular text data, which is represented by the selected image (in this example, the text image 582t). The transmitter and receiver 81 of the schedule management server 8 receives the selection information, from the PC 5.

For example, as described above referring to FIG. 28C, the text data, each represented by an image of text data displayed in the text data display area 582, is associated with the content processing ID. The storing and reading processor 59 reads out the content processing ID, associated with the particular text data.

In another example, the storing and reading processor 59 may obtain the content processing ID, from the related information received at S136.

Next, the storing and reading processor 89 of the schedule management server 8 searches the related information management DB 8010 using the content processing ID, included in the selection information received at S152, as a search key to obtain related information associated with the content processing ID (S153). Specifically, the storing and reading processor 89 reads related information associated with the content processing ID, included in the received selected information, from the related information management DB 8010. As described above referring to FIG. 15, the related information includes the content generation time, content processing ID, and type of content processing, by type of content data. In case the content type is text data or image data, the related information further includes a sequence number. The content generation time included in the related information is an example of time information. Using the content processing ID of the text data selected at S151, the schedule management server 8 is able to obtain content data that was generated at substantially the same time when the selected text data was generated, from the related information management table of FIG. 15.

The storing and reading processor 89 of the schedule management server 8 further searches the event record management DB 8008 (FIG. 14A) using the content processing ID included in the related information obtained at S153, as a search key, to obtain event record information associated with the content processing ID (S154). The event record information includes the content processing ID, type of content processing, and information on content data such as information indicating a storage destination of the content data.

The storing and reading processor 89 reads out content data, from the memory 8000, using information indicating the storage destination of the content data, included in the event record information read at S154 (S155). The transmitter and receiver 81 transmits the related information read at S153 and the content data read at S155, to the PC 5 (S156). The transmitter and receiver 51 of the PC 5 receives the related information and the content data.

Next, the audio control 58 of the PC 5 sets a playback start time of voice data, which is the content data received at S156, as the playback start time of voice data (S157).

The generator 56 of the PC 5 generates an event record screen 580 as illustrated in FIG. 48, based on information on the content data received at S156 (S158). More specifically, the generator 56 generates the event record screen 580 such that images of text data (voice text data), as the received content data, are displayed in the text data display area 582 in an order of sequence number in the related information. Further, the generator 56 generates the event record screen 580 such that images of image data (screenshot) are displayed in the screenshot data display area 583 in an order of sequence number in the related information. Further, the generator 56 generates the event record screen 580 such that the playback point 581p (an example of the playback point selector that sets the current location in the duration of voice data) is displayed in the playback display area 581, at a location that corresponds to a duration of a total playback time of voice data as the received content data.

In this example, the playback point 581p is displayed in the playback display area 581, specifically, at a location determined by the playback start time that is set at S157, of the total playback time of voice data.

The display control 54 of the PC 5 controls the display 508 to display the event record screen 580 generated at S158 (S159). FIG. 48 illustrates the event record screen 580, displayed on the display 508 at S159. In the event record screen 580 illustrated in FIG. 48, a location of the playback point 581p in the playback display area 581, is moved to a location that corresponds to the image 582t selected by the user. In response to selection of an image representing particular text data, from among text data converted from voice data being displayed, the PC 5 changes a display position of the playback point 581p, to a position indicated by the content generation time of the selected text data (selected content data). The user only needs to select a particular sentence, or a part of sentence, of user's interest, from sentences displayed as text data in the text data display area 582. Through selecting the particular text data, the PC 5 can start playing voice data corresponding to the text data selected by the user. In this way, the user does not have to look for content of user's interest, by sliding the playback point 581p from the beginning to the end of a duration of playback time for the event. Simply using the text data, the user can easily select a specific point of time that the user wants to start playing. In response to selection of the text data by the user, the PC 5 further moves the position of the playback point 581p (and the slider bar 581b), to the position indicated by the content generation time of the text data selected by the user. Since the position of the playback point 581p (and the slider bar 581b) changes to reflect the content generation time of the text data currently selected by the user, the user can instantly know, from which point of time the content data (voice data) starts playing, out of entire playback time.

Figure 49:
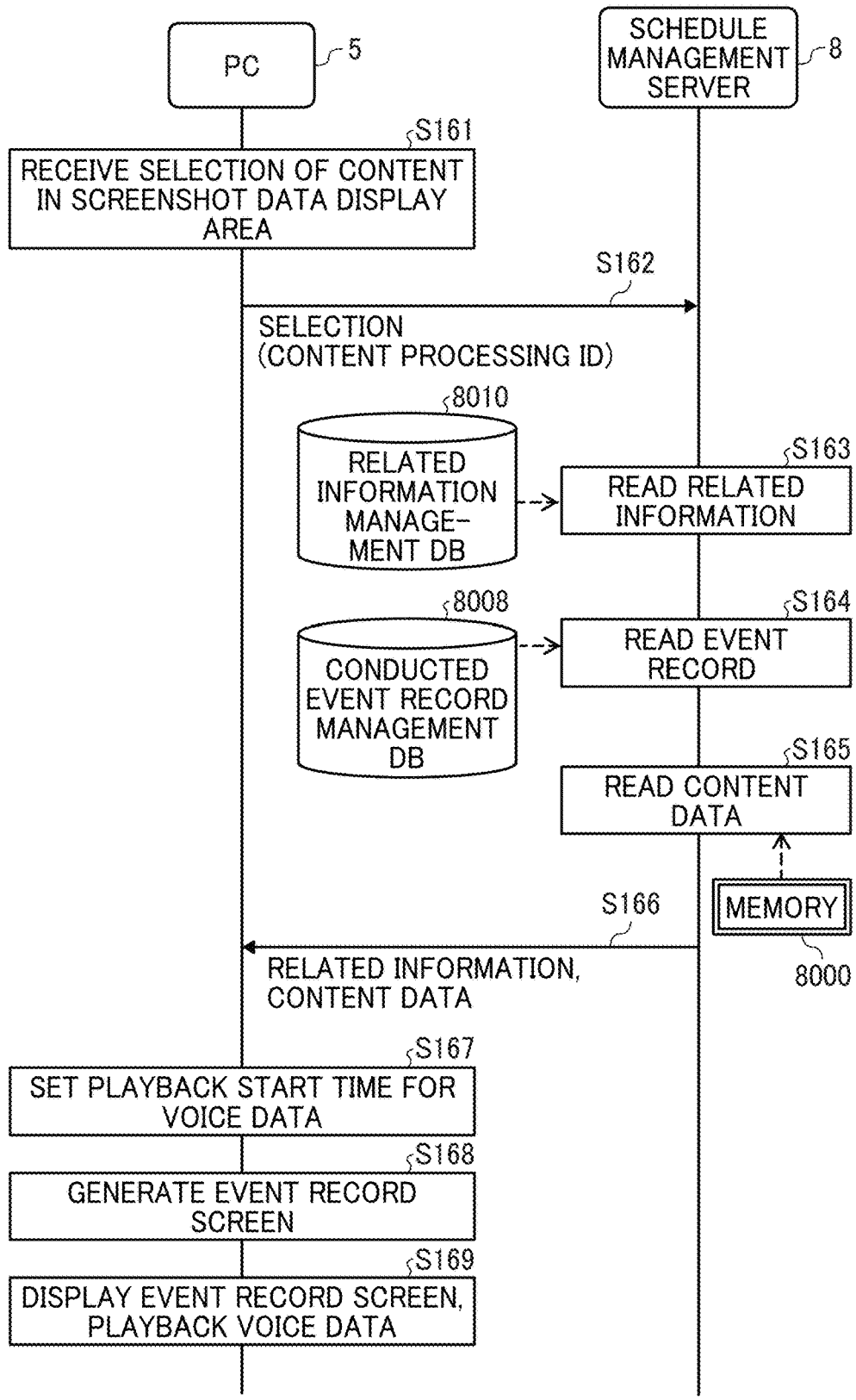
FIG. 49 is a sequence diagram illustrating operation of controlling selection of a content in an event record, according to an embodiment.

Instead of selecting particular text data for the conducted event as illustrated in FIG. 46, the user may select other type of content data as described below referring to FIGS. 49 to 51. FIG. 49 illustrates example operation of controlling display of an event record screen, according to selection of image data displayed in the screenshot display area 583.

Referring to FIG. 49, the acceptance unit 52 of the PC 5 accepts selection of an image representing particular screenshot image data in the screenshot display area 583, on the event record screen 580 (S161). For example, the user selects a particular screenshot image (for example, the screenshot image 583r in FIG. 47), in the screenshot display area 583 on the event record screen 580, with the mouse pointer 586. In response to user selection, the acceptance unit 52 accepts selection of the particular screenshot image (in this example, the screenshot image 583r) in the screenshot display area 583.

The transmitter and receiver 51 of the PC 5 transmits information on the selected screenshot image data (referred to as "selection information"), accepted at the acceptance unit 52, to the schedule management server 8 (S162). The selection information includes a content processing ID identifying the particular screenshot image data, which is represented by the selected image (in this example, the screenshot image 583r). The transmitter and receiver 81 of the schedule management server 8 receives the selection information, from the PC 5.

For example, in a substantially similar manner as described above referring to FIG. 28C, the screenshot data, each represented by an image of screenshot data displayed in the screenshot display area 583, may be associated with the content processing ID, in the form of a data file.

S163 to S169 of FIG. 49 are performed in a substantially similar manner as described above referring to S153 to S159 of FIG. 46, and description thereof is omitted.

Figure 50:
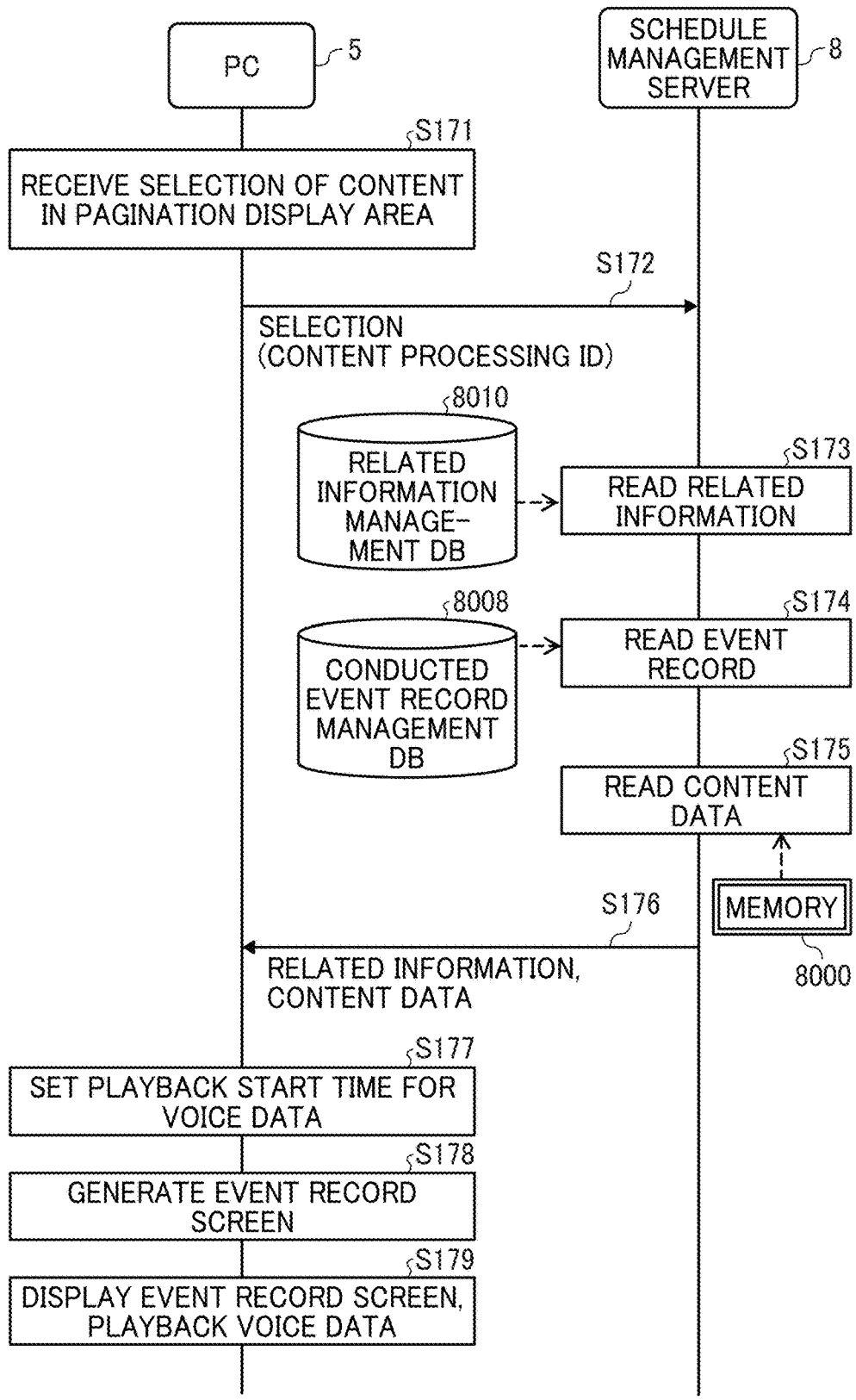
FIG. 50 is a sequence diagram illustrating operation of controlling selection of a content in an event record, according to an embodiment.

FIG. 50 illustrates example operation of controlling display of an event record screen, according to selection of an image displayed in the pagination display area 589.

Referring to FIG. 50, the acceptance unit 52 of the PC 5 accepts selection of an image representing a particular time period in the pagination display area 589, on the event record screen 580 (S171). For example, as illustrated in FIG. 47, the user selects a particular image representing a particular time period (for example, a particular time slot), in the pagination display area 589 on the event record screen 580, with the mouse pointer 586. In response to user selection, the acceptance unit 52 accepts selection of the image representing the particular time period (in this example, the particular time slot 589j) in the pagination display area 589.

The transmitter and receiver 51 of the PC 5 transmits information on the selected time period (referred to as "selection information"), accepted at the acceptance unit 52, to the schedule management server 8 (S172). The selection information includes information on the selected time period, which may be indicated by the selected time slot in this example. The transmitter and receiver 81 of the schedule management server 8 receives the selection information, from the PC 5. The information on the selected time period may indicate any point of time during a time period indicated by the selected time period. For example, if a unit of time slot is previously set, as long as either the start time and the end time is available, the selected time period can be obtained.

Next, the storing and reading processor 89 of the schedule management server 8 searches the related information management DB 8010 using the selected time period, in the selection information received at S172, using a search key to obtain the related information corresponding to the selected time period (S173). Specifically, the storing and reading processor 89 reads out, from the related information management DB 8010, the related information that was generated during the selected time period, by referring to the content generation time of each content. The related information includes the content generation time, content processing ID, and type of content processing, by type of content data. In case the content type is text data or image data (screenshot), the related information further includes a sequence number. Using the time period selected at S171, which indicates a time period of content generation time, the schedule management server 8 is able to obtain content data that was generated at substantially the same time during the selected time period, from the related information management table of FIG. 15.

S174 to S179 of FIG. 50 are performed in a substantially similar manner as described above referring to S154 to S159 of FIG. 46, and description thereof is omitted.

In alternative to transmitting information on the selected time period at S172, the transmitter and receiver 51 of the PC 5 may transmit the content processing ID. For example, the storing and reading processor 59 of the PC 5 refers to the related information, which is obtained at S136 from the schedule management server 8, to obtain one or more content processing IDs of content data associated with the content generation time that falls within the selected time period. In such case, since the content processing ID is obtained, S173 is performed in a substantially similar manner as described above referring to S153 of FIG. 46.

Figure 51:
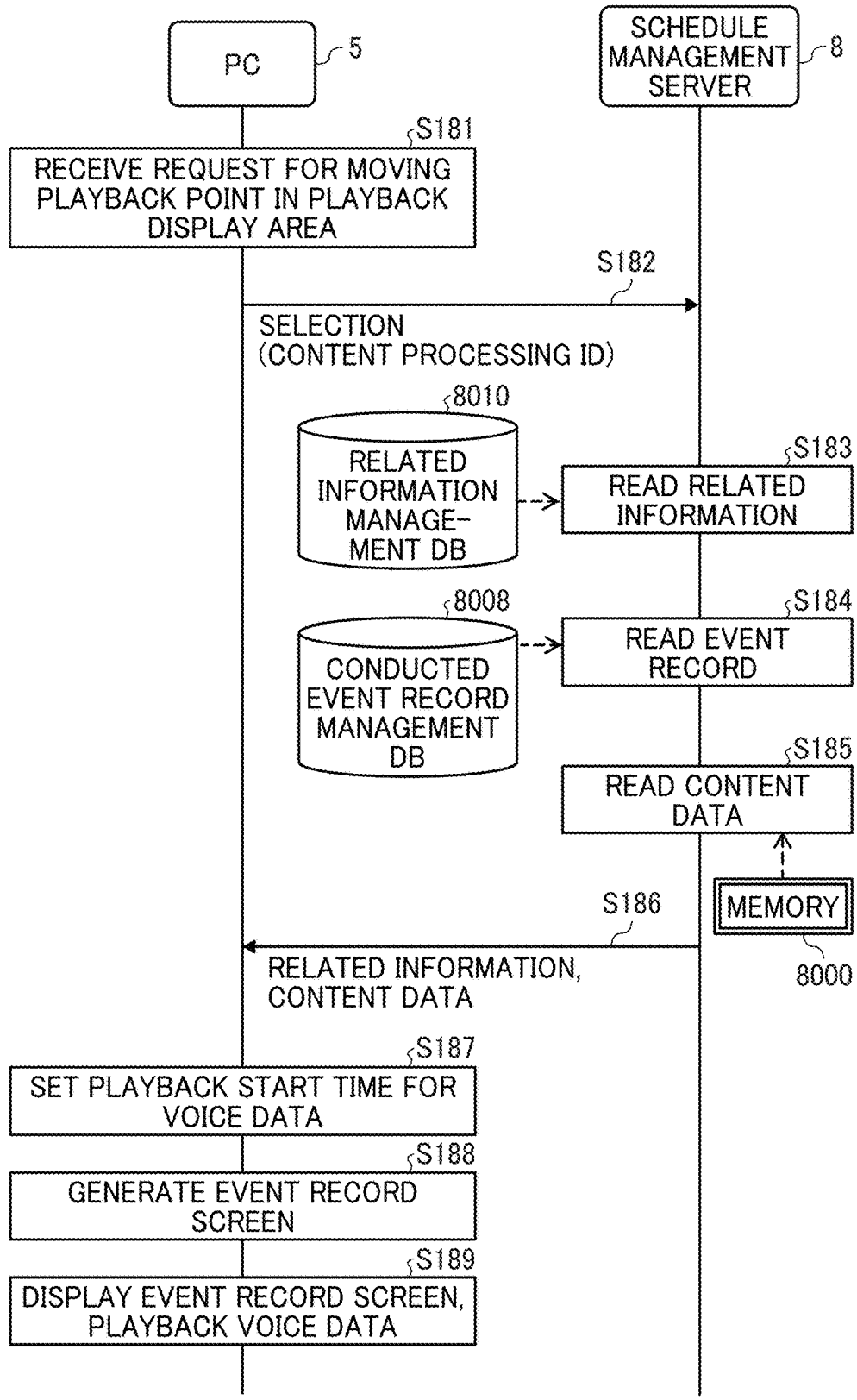
FIG. 51 is a sequence diagram illustrating operation of controlling selection of a content in an event record, according to an embodiment.

FIG. 51 illustrates example operation of controlling display of an event record screen, according to selection of the playback point 581p in the playback display area 581.

Referring to FIG. 51, the acceptance unit 52 of the PC 5 accepts movement (that is, a change in the location) of the playback point 581p in the playback display area 581, on the event record screen 580 (S181). For example, the user drags the playback point 581p with the mouse pointer 586, to slide the playback point 581p left or right through the slider bar 581b, in the playback display area 581 on the event record screen 580. In response to user selection, the acceptance unit 52 accepts a selection of a location caused by movement of the playback point 581p in the playback display area 581.

The transmitter and receiver 51 of the PC 5 transmits information on the selected location (referred to as "selection information"), accepted at the acceptance unit 52, to the schedule management server 8 (S182). The transmitter and receiver 81 of the schedule management server 8 receives the selection information, from the PC 5.

The information on the selected location may be represented by information on a point of time selected by the user.

Alternatively, the information on the selected location may be represented by content processing ID. In such case, as described above referring to FIG. 50, the storing and reading processor 59 of the PC 5 refers to the related information, which is obtained at S136 from the schedule management server 8, to obtain one or more content processing IDs of content data associated with the content generation time indicated by the selected time, or any duration of time including the selected time.

S183 is performed in a substantially similar manner as described above referring to S173 of FIG. 50.

S184 to S189 of FIG. 51 are performed in a substantially similar manner as described above referring to S154 to S159 of FIG. 46, and description thereof is omitted.

As described above referring to FIGS. 39 to 51, the event record screen including content recorded during an event is displayed using the PC 5. Alternatively, the user may select the icon r2 illustrated in FIG. 26, to cause the electronic whiteboard 2 to display the event record screen at any desired time. Any example operation, or any screen processed during such operation, illustrated in FIGS. 39 to 51, is performed or displayed by the PC 5. In a substantially similar manner, the above-described operation or screen may be performed or displayed at least in part using any other device such as the electronic whiteboard 2, videoconference terminal 3, car navigation system 4, or any other device operable by the user. In other words, any apparatus capable of displaying may be used to display an event record screen.

The image data for display at the PC 5 (such as an event record screen), as described above referring to FIGS. 39 to 51, is generated by the generator 56 of the PC 5. Alternatively, such image data may be generated by the schedule management server 8. In such case, in one example, at the schedule management server 8, the generator 83 generates image data, and the transmitter and receiver 81 transmits the generated image data to the PC 5 for display.

In one or more embodiments, as illustrated in FIGS. 46 to 48, an apparatus for controlling display is provided. The display control apparatus may be implemented by, for example, an information processing apparatus (PC 5) capable of displaying, and communicable with a server that manages content generated during an event (for example, the schedule management server 8). The transmitter and receiver 51 of the display control apparatus receives content data (such as voice data and text data), and time information indicating a time when content was generated, from the server. The display control 54 controls the display 508 to display the text data in an order based on generation time of the text data. The display control 54 further controls the display 508 to display a graphical control region (playback point 581p) that sets playback position in a total playback time of the voice data. The acceptance unit 52 accepts selection of particular text data, from text data being displayed. The display control 54 of the PC 5 controls the display 508 to display the graphical control region, at a location determined based on a time when the particular text data was generated. Accordingly, the user only needs to select particular text data being displayed, to start playback of voice data from a time desired by the user that corresponds to the selected text data. In this way, the user can easily select a specific point of time that the user wants to start playing.

While the above-described example assumes that the display control apparatus, such as the PC 5, receives the content data and time information of the content data from the server, the display control apparatus does not have to receive the content data and the time information, as long as the display control apparatus is capable of displaying a screen based on screen data generated and received from the server, and reproducing voice recorded during the event. In such case, text data is provided in a format described above referring to FIG. 28C, such that at least a content processing identifier can be obtained from the text data. In response to selection of particular text data, the display control apparatus obtains the content processing ID from the particular text data, and transmits the content processing ID to the server to receive information on the particular text data, such as the time when the text data was generated, from the server. Based on the received time information, the display control apparatus determines the current position of the graphical control region (the playback point 581p) that sets the current position in the total playback time of the voice data.

In another example, the display control apparatus may receive information on content generated during the event (such as related information), from the server, when displaying information on the content. In such case, the display control apparatus does not have to transmit the content processing ID, obtained from the particular text data, to the server. Instead, the display control apparatus is able to refer to the information on content, which is stored in its memory, to obtain the time when the particular text data was generated.

In one or more embodiments, as illustrated in FIGS. 46 to 51, the schedule management server 8 further manages screenshot image data, in association with the text data and the voice data. The transmitter and receiver 51 of the PC 5 receives content data (such as voice data and screenshot image data), and time information on content generation time, from the schedule management server 8. The display control 54 controls the display 508 to further display the screenshot image in an order based on generation time of the screenshot image. The acceptance unit 52 accepts selection of particular screenshot image data, from screenshot image data being displayed. The display control 54 of the PC 5 controls the display 508 to display the graphical control region, at a location determined based on a time when the particular screenshot image data was generated. Accordingly, the user only needs to select particular content-related image (screenshot image) being displayed, to start playback of voice data from a time desired by the user that corresponds to the selected screenshot image. In this way, the user can easily select a specific point of time that the user wants to start playing.

As illustrated in FIGS. 46 to 51, the audio control 58 starts reproducing voice, based on voice data that was generated during a time period when the selected content (text data or screenshot image data) was generated. The display control 54 further controls the display 508 to display the graphical control region, such as the playback point 581p, which sets playback position. The user only needs to select a particular content (such as a text or an image representing the content) being displayed on a screen. Through selecting the content, the PC 5 can start playing voice data corresponding to the content selected by the user.

As described above referring to FIGS. 46 to 51, the display control 54 of the PC 5 displays the text data and the screenshot image data, side by side, in an order determined based on the content generation time. As long as the user can recognize a screenshot image (for example, the image 583*b*) that represents a topic that the user is looking for, the user is able to easily identify text data (for example, the text data 582*c* and 582*d*), which are displayed side by side with the recognized screenshot image, to obtain detailed information on the desired topic.

As illustrated in FIGS. 46 to 51, the graphical control element further indicates a playback progress by tracking the current location of the playback point 581*p* in the duration of voice data. The graphical control region (the playback point 581*p* and the slider bar 581*b*) may be implemented as a seek bar, which allows the user to change the point where playback starts in the total playback time of voice data. In response to selection of the text data by the user, the PC 5 further moves the position of the playback point 581*p*, to the position indicated by the content generation time of the text data selected by the user, on the slider bar 581*b*. Since the position of the playback point 581*p* changes to reflect the content generation time of the text data currently selected by the user, the user can instantly know, from which point of time the content data (voice data) starts playing, out of entire playback time.

Each of the functions of the described embodiments may be implemented by one or more processing circuits or circuitry. Processing circuitry includes a programmed processor, as a processor includes circuitry. For example, the processing circuitry is implemented by one or more microprocessors or microcomputers, super computers, and central processing units. A processing circuit also includes devices such as dedicated hardware, an application specific integrated circuit (ASIC), digital signal processor (DSP), field programmable gate array (FPGA), System on Chip (SOC), GPU (Graphics Processing Unit) programmable logic device, state machine, and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, voice data may be displayed differently for each of the users who are participating in the event such as the videoconference. In such case, voice of the user is analyzed based on characteristics of the voice, and used to identify the user using the analysis result. In this way, a user identifier, such as a user name, may be displayed along with text data converted from voice data of particular user.

The invention claimed is:

1. A display control apparatus, comprising:
   circuitry configured to:
   receive voice data, image data and time information from a server that manages content data generated during an event;
   control a display to:
   display the image data in an order according to the time information, and
   display a graphical control region, at a first display location, that sets a playback position in a total playback time of the voice data;
   receive selection of first image data from the image data being displayed;
   determine, by referring to the time information, a second display location which is different from the first display location, the second display location corresponding to the time information of first voice data associated with the first image data; and
   control the display to display the graphical control region at the second display location.

2. The display control apparatus of claim 1, wherein the image data is screenshot image data.

3. The display control apparatus of claim 1, wherein the circuitry is further configured to start playback of the voice data from a time that the first voice data was collected.

4. The display control apparatus of claim 3, wherein the graphical control region further indicates a playback progress of the voice data.

5. The display control apparatus of claim 4, wherein the uraphical control region is a seek bar.

6. The display control apparatus of claim 1, wherein the circuitry is further configured to:
   receive, from the server that manages content data generated during the event, text data converted from the voice data; and
   control the display to further display the text data, in the order according to the time information.

7. The display control apparatus of claim 1, wherein the circuitry is further configured to:
   in response to selection of the first image data, obtain, from the first image data, a content processing identifier for identifying processing to capture a image to generate image data;
   obtain the time information using the content processing identifier; and
   determine the second display location of the graphical control region based on the time information.

8. The display control apparatus of claim 1, wherein the first image data includes a part of content displayed during the event.

9. A system, comprising:
   the display control apparatus of claim 2; and
   the server which is communicably connected with the display control apparatus, wherein
   the server comprises:
   a memory that stores, for each event, voice data recorded during the event, image data captured during the event, and time information for the event; and
   another circuitry configured to transmit information on the event stored in the memory to the display control apparatus.

10. The system of claim 9, wherein the image data is screenshot image data captured during the event.

11. A system, comprising:
    a memory that stores voice data recorded during an event, image data captured during the event, and time information for the event; and
    first circuitry and second circuitry configured to cooperate together to:
    control a display to:
    display the image data in an order according to the time information, and
    display a graphical control region, at a first display location, that sets a playback position in a total playback time of the voice data;

receive selection of first image data from the image data being displayed;

determine, by referring to the time information, a second display location which is different from the first display location, the second display location corresponding to the time information of first voice data associated with the first image data; and control the display to display the graphical control region at the second display location.

12. The system of claim 11, wherein the image data is screenshot image data.

13. The system of claim 11, wherein the first circuitry and the second circuitry are further configured to start playback of the voice data from a time that the first voice data was collected.

14. The system of claim 13, wherein the graphical control region further indicates a playback progress of the voice data.

15. The system of claim 14, wherein the graphical control region is a seek bar.

16. The system of claim 11, further comprising:
a server including the memory and the first circuitry; and
a display control apparatus including the second circuitry, wherein
the server which is communicably connected with the display control apparatus.

17. The system of claim 16, wherein the second circuitry is further configured to:
receive, from the server that manages content data generated during the event, text data converted from the voice data; and
control the display to further display the text data, in the order according to the time information.

18. The system of claim 16, wherein the second circuitry is further configured to:
in response to selection of the first image data, obtain, from the first image data, a content processing identifier for identifying processing to capture a image to generate image data;
obtain the time information using the content processing identifier; and
determine the second display location of the graphical control region based on the time information.

19. The system of claim 11, wherein the first image data includes a part of content displayed during the event.

20. A display control method, comprising:
receiving voice data, image data and time information from a server that manages content data generated during an event;
controlling a display to:
display the image data in an order according to the time information, and
display a graphical control region, at a first display location, that sets a playback position in a total playback time of the voice data;
receiving selection of first image data from the image data being displayed;
determining, by referring to the time information, a second display location which is different from the first display location, the second display location corresponding to the time information of first voice data associated with the first image data; and
controlling the display to display the graphical control region at the second display location.

* * * * *